United States Patent
Braun et al.

(12) 
(10) Patent No.: US 6,248,153 B1
(45) Date of Patent: *Jun. 19, 2001

(54) DIFFUSIONAL GAS TRANSFER SYSTEM AND METHOD OF USING SAME

(75) Inventors: David Lloyd Braun; Ricardo Lira, both of Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,165

(22) Filed: Jun. 9, 1999

Related U.S. Application Data

(63) Continuation-in-part of application No. 08/762,628, filed on Dec. 9, 1996, now Pat. No. 5,976,220.

(51) Int. Cl.⁷ .................................................. B01D 53/22

(52) U.S. Cl. .................. 95/45; 95/51; 95/54; 55/385.2; 96/4

(58) Field of Search ............................... 96/4; 95/43, 45, 95/51, 54, 289; 55/385.1, 385.2

(56) References Cited

U.S. PATENT DOCUMENTS

| | | |
|---|---|---|
| 3,369,343 | 2/1968 | Robb . |
| 3,426,754 | 2/1969 | Bierenbaum et al. . |
| 3,793,111 | 2/1974 | Judkins . |

(List continued on next page.)

FOREIGN PATENT DOCUMENTS

| | | |
|---|---|---|
| 0 458 598 A2 | 11/1991 | (EP) . |
| 2-263704 | 10/1990 | (JP) . |
| 6-23218 | 2/1994 | (JP) . |
| 1693759C | 8/1995 | (RU) . |
| 1119197 | 12/1981 | (SU) . |
| 1710951 | 5/1989 | (SU) . |
| 1738844A1 | 6/1992 | (SU) . |
| WO 95/35153 | 12/1995 | (WO) . |
| WO 97/20885 | 6/1997 | (WO) . |

OTHER PUBLICATIONS

Benarie, M., *Influence of Pore Structure Upon Separation Efficiencies in Fiber Filters,* Staub. R. Luft 29 (2) p. 37 (1969).

Chen, C.Y., *Filtration of Aerosols by Fibrous Media,* Chem. Rev. 55 (6) pp. 595–623 (1955).

Versapor H Membrane, Brochure of Gleman Sciences, pp. 8–13, and pp. 52–55 (undated).

"Standard Test Methods for Resistance of Nonporous Paper to Passage of Air", ASTM Designation: D726–94, pp. 68–70, (1994).

*Primary Examiner*—Duane S. Smith
(74) *Attorney, Agent, or Firm*—Karl G. Hanson; Philip Y. Dahl; Dean M. Harts

(57) ABSTRACT

A diffusional gas transfer system and method having a membrane disposed between a first gas domain and a second gas domain. The first gas domain includes a first mechanism for directing a first environmental gas flow transversely over and in contact with a first surface of the membrane. The second gas domain includes a second mechanism for directing a second environmental gas flow transversely over and in contact with a second surface of the membrane. The membrane is a diffusional gas transfer medium having a multiplicity of tortuous pathways extending from the first surface of the membrane to the second surface of the membrane. The void volume fraction of the membrane is at least 0.2. The membrane is capable of substantially blocking the transfer of particles from the first gas domain to the second gas domain, while permitting the diffusion of gases between the first and second gas domains, and the first gas domain is maintained at a pressure higher than the second gas domain.

77 Claims, 21 Drawing Sheets

U.S. PATENT DOCUMENTS

| | | |
|---|---|---|
| 3,801,404 | 4/1974 | Druin et al. . |
| 3,801,692 | 4/1974 | Zimmerman . |
| 3,839,240 | 10/1974 | Zimmerman . |
| 3,843,761 | 10/1974 | Bierenbaum et al. . |
| 4,048,993 | 9/1977 | Dobritz . |
| 4,174,955 | 11/1979 | Blackmer et al. . |
| 4,198,213 | 4/1980 | Mannatt . |
| 4,347,844 | 9/1982 | Ohki et al. . |
| 4,449,992 | 5/1984 | Yamada et al. . |
| 4,519,909 | 5/1985 | Castro . |
| 4,539,256 | 9/1985 | Shipman . |
| 4,560,394 | 12/1985 | McDonald et al. . |
| 4,609,039 | 9/1986 | Fushiki et al. . |
| 4,681,602 | 7/1987 | Glenn et al. . |
| 4,726,989 | 2/1988 | Mrozinski . |
| 4,777,073 | 10/1988 | Sheth . |
| 4,867,881 | 9/1989 | Kinzer . |
| 5,013,439 | 5/1991 | Fisher et al. . |
| 5,082,471 | 1/1992 | Athayde et al. . |
| 5,114,447 | 5/1992 | Davis . |
| 5,158,584 | 10/1992 | Tamura . |
| 5,176,953 | 1/1993 | Jacoby et al. . |
| 5,260,360 | 11/1993 | Mrozinski et al. . |
| 5,308,691 | 5/1994 | Lim et al. . |
| 5,317,035 | 5/1994 | Jacoby et al. . |
| 5,490,884 | 2/1996 | Robinson et al. . |
| 5,873,928 * | 2/1999 | Callahan ............................ 95/45 |
| 5,976,220 | 11/1999 | Braun et al. . |

* cited by examiner

DIFFUSIONAL GAS TRANSFER SYSTEM AND METHOD OF USING SAME

This is a continuation-in-part of U.S. Ser. No. 08/762,628, filed Dec. 9, 1996 which issued as U.S. Pat. No. 5,976,220, the disclosure of which is herein incorporated by reference.

TECHNICAL FIELD

This invention pertains to a diffusional gas transfer system that uses a membrane to exchange gas constituents through a diffusion process while substantially blocking particle transfer.

BACKGROUND

Various ventilation systems have been used to control the content of carbon dioxide and oxygen in enclosed spaces. The enclosed space could be for example an automobile, a home, a high rise building, the inside of a respirator, a factory, a clean room, or a hospital room. The ventilation systems remove excess carbon dioxide and replenish depleted oxygen from the enclosed spaces.

In carrying out this type of operation, conventional ventilation systems typically use a filter media to prevent airborne particles from entering the enclosed space from an external environment. The air typically passes normally or perpendicularly through the filter media, and an energy source is used to force the air therethrough. If the air entering the enclosed space is not filtered, the inhabitants may suffer from toxic or allergic reactions to inanimate airborne particles, or may suffer adverse health effects from airborne microorganisms. Air must be purged from the enclosed space through an exhaust port when filtered air is forced into the enclosed space to prevent pressure build up.

Conventional ventilation's systems possess a number of drawbacks.

A first drawback is that it is difficult for particle filters to remove essentially all airborne particulates from the admitted air without using so much filter media that high pressure drops are created when the air passes through the filter media. Consequently, conventional filtration systems typically allow a substantial number of particles to enter the enclosed space in the admitted air stream.

A second drawback is that the admitted air must pass normally or perpendicularly through the filter media. When particle-containing air flows through a filter in such a manner, the filter's pores become filled with the particles and a corresponding increase in pressure drop results. The filter must be frequently replaced if good flow rates are to be maintained.

A third drawback is that significant amounts of energy are needed in conventional systems to force the admitted air through the filter media. Filters whose pores are not plugged nonetheless exhibit significant frictional forces or barriers to air entry. The energy requirements may be substantial in large structures.

Another drawback is that conventional ventilation systems need an exhaust network to allow excess air to be purged from the enclosed space. Otherwise it would be very difficult, if not impossible, to carry out a continuous ventilation operation.

Conventional ventilation filtration systems also are disadvantageous because they require significantly more air flow than is needed for oxygen consumption. Consider an enclosed space surrounded by contaminated air where filtered air is forced into the enclosed space to provide oxygen for the inhabitants and internal ambient air is removed therefrom to avoid increased pressure. Carbon dioxide passes from the enclosed space to the surrounding environment in the exhaust air stream. It is commonplace to supply 20 cubic feet per minute (566 liters per minute) of outside air per building inhabitant. For sedentary office workers, $CO_2$ is generated at a rate of about 0.35 liters per minute (Lpm) per inhabitant. Under these conditions, and at a steady state, the outside air having a $CO_2$ concentration of about 0.03% would have a $CO_2$ concentration of 0.09% when exhausted from the building ((0.35 Lpm/566 Lpm)+0.03%=0.09%). $CO_2$ levels above 0.1% may be uncomfortable or adverse to the inhabitants. Outside air at sea level generally has an $O_2$ concentration of 20.95%. After an inhabitant consumes approximately 0.28 liters per minute of $O_2$, air having an $O_2$ concentration of about 20.0% is exhausted from the enclosed space. This value of exhausted oxygen reflects a dynamic room oxygen concentration that is much higher than needed for safety. $CO_2$ levels, therefore, govern ventilation rates from the standpoint of satisfying the physiological needs of people in enclosed spaces.

U.S. Patent No. 3,369,343 (Robb) discloses the use of a permeable nonporous wall made of materials such as silicone rubber to exchange $CO_2$ or $O_2$ via permeation. Permeation as used in Robb is limited to a solution process in which the gases dissolve in the film and then diffuse through the film in the dissolved state. The film forms a pore free barrier to any solid, liquid or gas which does not chemically dissolve in the silicone rubber. Robb discloses various air purifying systems utilizing the silicone rubber membranes.

Soviet Patent No. SU 1710951 discloses a ventilation device that uses a nuclear membrane as a gas exchange medium to ventilate a closed structure. Partial pressures of $O_2$ and $CO_2$ on opposite surfaces of the nuclear membrane provide a driving force for the gas exchange. Additionally, the membrane is useful in blocking harmful aerosols and micro particles present in the outside air. Nuclear membranes are typically formed by accelerating atomic particles at a polymeric film to form generally parallel holes through the film. The holes in nuclear membranes can become clogged or loaded with particles, rendering the membrane less effective as a gas exchange medium.

Soviet Patent No. SU 1119197 discloses a respirator using a thin elastic porous gas permeable polymeric membrane as a diffusional gas exchange medium. The membrane is disclosed as a nuclear filter type made of polyethyleneterephthalate or polycarbonate film having a porosity of about 10% (at higher porosities the mechanical strength of the filter falls off quickly). It is alleged that protection from aerosols of any size can be provided by the porous polymeric membranes having a pore size from 3 to 0.03 micrometers. Due to the high uniformity of pore sizes, the efficacy of protection from aerosols having sizes equal to or greater than the pores is generally 100%.

SUMMARY OF THE INVENTION

This invention provides a diffusional gas transfer system that comprises a membrane disposed between a first gas domain and a second gas domain. The first gas domain includes a first mechanism that is capable of directing a first environmental gas flow transversely over and in contact with a first surface of the membrane. The second gas domain includes a second mechanism that is capable of directing a second environmental gas flow transversely over and in contact with a second surface of the membrane. The membrane comprises a diffusional gas transfer medium having a multiplicity of tortuous pathways that extend from a first surface of the membrane to a second surface of the membrane. The tortuous pathways define a maximum pore size and a void volume fraction of at least 0.2. The membrane is capable of substantially blocking the transfer of all particles smaller than the maximum pore size from the first gas domain to the second gas domain, while permitting the diffusion of gases between those gas domains.

The present invention also features a diffusional gas transfer system that comprises a membrane disposed between the first and second gas domains as described above where the membrane is structured to be capable of maintaining a gas transfer rate diminished by no more than 2% percent under the Post Particle Challenge Gas Transfer Rate Test described below. A membrane that satisfies this test is capable of maintaining high gas transfer rates even under significant particle loadings.

The present invention also features a method of using the diffusional gas transfer system to block the transfer of substantially all particles from the first gas domain to the second gas domain while permitting the diffusion of gases between the first and second gas domains.

The diffusional gas transfer systems and method of the invention differ from conventional ventilation systems by using a membrane that permits the diffusion of gases across the membrane while substantially blocking the transfer of particles, in conjunction with directing gas flow transversely across the membrane as well as normally therethrough. The present system and method can block the transfer of particles over a very wide range of aerodynamic diameters and are also particularly useful for blocking particles having sizes of 0.2 to 0.3 $\mu$m where conventional filtration systems are most easily penetrated. The invention therefore overcomes the impracticality of using large amounts of filters to ensure that all particles become trapped to ensure a clean supply of oxygen.

Although the membranes may be capable of trapping particles as does a filter, filtration is not needed to get purified gases into the enclosed space. Oxygen can diffuse through the membrane because the partial pressure of oxygen in the external gas domain is greater than in the internal or enclosed gas domain where the inhabitants reside. Similarly excess carbon dioxide can be purged from an enclosed gas domain through diffusion because its partial pressure is greater in there than in the surrounding domain. Filtration is carried out to a less significant degree because the gas streams flow transverse to the membrane as well as normally through the membrane. As a result, the system and method of the invention do not encounter substantial pore plugging experienced by conventional systems. Large increases in pressure drop and frequent membrane replacement are therefore avoided, and gas transfer rates can be maintained even after the membrane has been subjected to substantial particle loading.

The invention also tends to minimize energy requirements because only a portion of the gas flow streams are forced through the membrane. Gas transfer can occur through diffusion as well as through convection. The membrane is capable of maintaining a generally constant gas transfer rate even under conditions of particle loading such that a pressure drop across the membrane at a constant flow rises by about 25% or more.

Further, the invention does not need an exhaust port or system to prevent over pressurizing the enclosed gas domain. Excess quantities of gases like $CO_2$ can be purged from the enclosed domain by diffusion through the membrane itself.

The invention also overcomes the drawback of requiring relatively large airflows into the enclosed space from the environment. Carbon dioxide and oxygen can be removed from and supplied to an enclosed domain, respectively, without the contemporaneous transfer of air and other gases.

In short, the diffusional gas transfer system is a practical alternative to conventional filtration methods for the large scale removal of $CO_2$ from, and replenishment of $O_2$ into, enclosed spaces, without the introduction of airborne environmental particulate contaminants into the enclosed space.

The present invention also provides an air treatment system that comprises:

(a) a first gaseous flow path that extends from an inlet to an outlet, the first gaseous flow path having an upstream portion and a downstream portion and allowing a first gaseous stream to pass from the inlet to the outlet;

(b) a second gaseous flow path through which a second gaseous stream can travel, maintained at lower pressure than the first gas domain;

(c) a membrane having first and second sides and being disposed between the first and second gaseous fluid flow paths, the membrane being capable of blocking the transfer of particles between the first and second flow paths while permitting the diffusion of gases between the first gaseous stream and the second gaseous stream; and (d) a gas impermeable thermal transfer region that allows thermal energy to be transferred between the downstream portion of the first gaseous stream and its upstream portion.

This air treatment system is beneficial because in addition to the aforementioned benefits it offers energy saving advantages combined with air quality management benefits.

DETAILED DESCRIPTION

Figure 1:
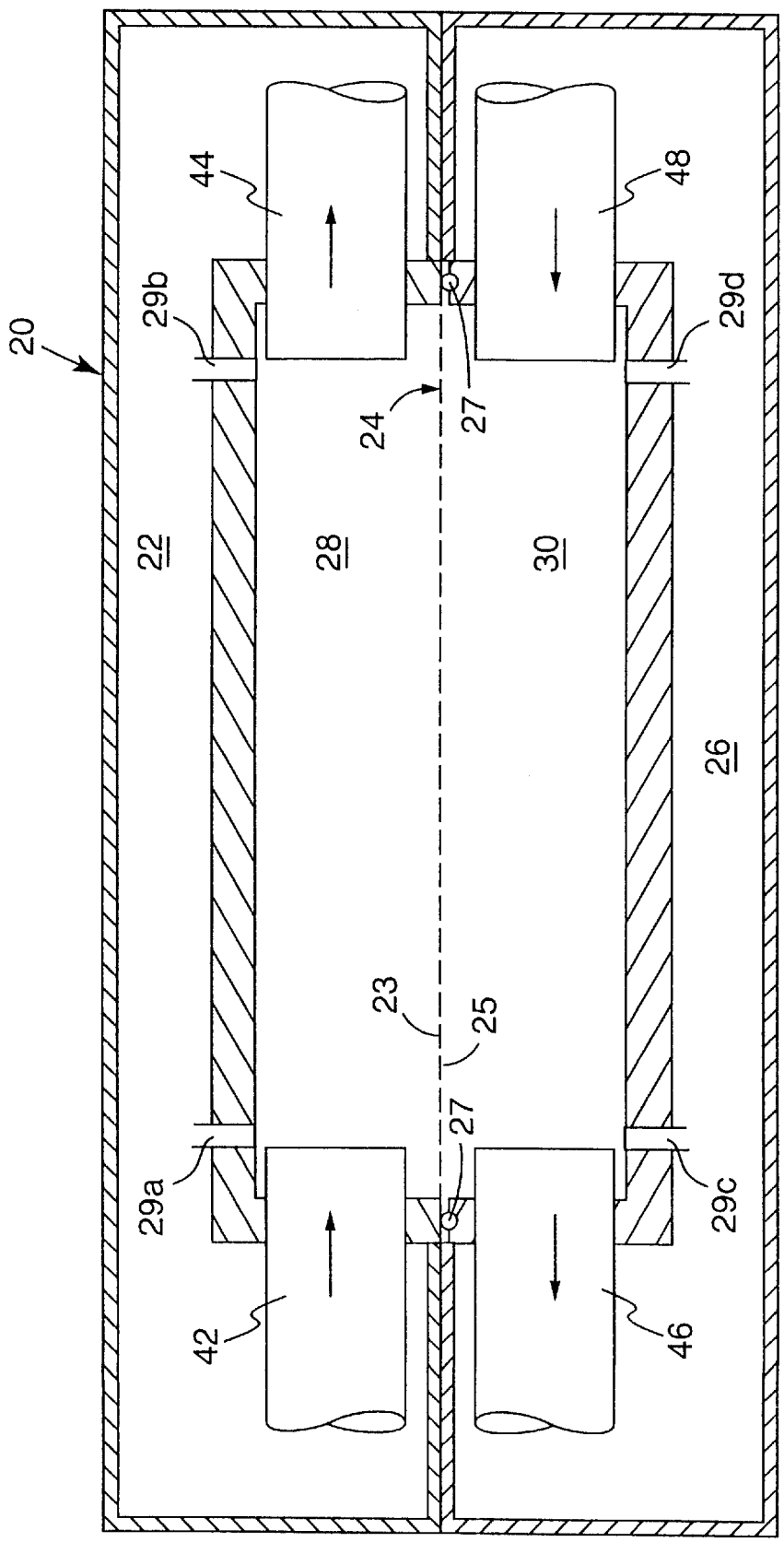
FIG. 1 schematically illustrates an exemplary diffusional gas transfer system in accordance with the present invention.

As used in this document:

"Environmental gas flow" means a flow or stream of gas, commonly air which may contain a suspension of liquids and/or solids.

"Diffusion" means a process where a discrete quantity of liquids, gases, and/or solids in an environmental gas flow, or in still air, intermingle as the result of their spontaneous random movement caused by thermal agitation and collision that leads to a continuous mixing as the volume approaches a uniform composition. In dissolved substances, the discrete items move from a region of higher concentration to one of lower concentration by means of diffusion.

"Diffusion of gases" is the free movement of atoms and molecules of gases in the environmental gas flow, or in still air, which movement tends to make the atoms or molecules distribute themselves equally within the limits of an enclosed space.

"Convection" means a process where a discrete quantity of liquids, gases, and/or solids in an environmental gas flow, or in still air, move as a result of at least one external force.

"Respiratory gases" include oxygen, nitrogen, carbon dioxide, and water vapor.

"Particles" are relatively small and discrete entities, either solid, liquid or some combination thereof that can be suspended or carried in an environmental gas flow. The particles may be about 1.0 millimeter (mm) or more in diameter to less than about 0.01 micrometer ($\mu$m) in diameter. Particles that have a diameter of about 2.0 $\mu$m or greater can generally be removed readily using conventional filtration methods. Particles that are about 0.1 $\mu$m to about 0.5 $\mu$m in diameter, such as tobacco smoke, are typically too small to be removed from air using inertial mechanisms, such as direct impact filters. Particles of these sizes, however, can be blocked by membranes used in this invention. The present diffusional gas transfer system blocks the transfer of substantially all particles of about 1.0 mm in diameter or less, more preferably blocks the transfer of essentially all particles, and still more preferably blocks the transfer of all particles.

"Permeability" is the state or quality in which the mode of transport of a substance such as a liquid, gas or solid is through pores or interstices of another substance.

A "tortuous pathway" is an opening or passageway through a permeable membrane that is not substantially straight.

"Still air" is air that has essentially zero convection and bulk movement.

The inventive diffusional gas transfer system accomplishes results that are superior to those achieved by conventional particle filters. A membrane forms a partition between a first gas domain and a second gas domain. The first and second gas domains are preferably not in significant gaseous communication with each other except across the membrane. The first and second gas domains each include a mechanism capable of directing a first and second environmental gas flow across the opposite surfaces of the membrane. The "mechanism" may be an instrument, process, or other means or combination that causes the environmental gas to flow transversely across and in contact with the membrane. The membrane permits diffusion and forced convection of gases contained in the environmental gas flows between the first and second gas domains, while substantially blocking the transfer of particles. The present invention is particularly suited for conducting the exchange of respiratory gases between the first and second gas domains. Other non-respiratory gases may also be transferred for other useful purposes. Consequently, the second gas domain may be maintained in a life supporting condition or otherwise beneficial condition substantially free of particles originating in or from the first gas domain.

In one embodiment, the membrane is supported. The supported membrane substantially blocks the transfer of particles when a pressure differential across the membrane comprises a pressure greater than a burst pressure of the membrane. The ratio of a diffusion coefficient of a selected gas at a selected temperature and pressure inside the tortuous pathways of the membrane, to a diffusion coefficient of the same gas under the same temperature and pressure in still air, is between 0.002 and 0.970.

The first environmental gas flow is preferably air external to an enclosed space. The second environmental gas flow is preferably air within the enclosed space. The enclosed space may comprise the interior of a clean room, a personal respirator, an automobile compartment, an airplane cabin, a home, a building, a factory, a hospital room, or a variety of other structures. In an alternate embodiment, the diffusional gas transfer system may be utilized to retain airborne particles within the second gas domain. In applications where the second gas domain is the interior of a room, a compartment, a building or another structure, gas exchange primarily occurs across the membrane, while secondary gas exchange may occur in areas other than across the membrane, such as due to leakage around doors and windows. What is meant by "primarily" is that over an extended period of time a significantly larger volume of gas exchange between the domains occurs through the membrane(s) rather than through other areas.

The first and second environmental gas flows or streams may be directed perpendicular, parallel or at various angles relative to each another. In one embodiment, one or more of the environmental gas flows may be in turbulent or laminar flow with respect to the diffusional gas transfer medium.

In this invention, as in conventional ventilation systems, $CO_2$ levels tend to govern air flow rates. For the inventive diffusional gas transfer system, the flow rates can be determined by dividing the internally generated amount of $CO_2$ by the change in the $CO_2$ concentration across the gas transfer system. For example, if a sedentary individual generates 0.35 liters per minute of $CO_2$, and if the change in $CO_2$ concentration across the inside (second environmental gas flow) flow circuit of the gas transfer system is 0.05 percent, the air flow in this flow circuit is 0.35 divided by 0.0005, or 700 liters per minute.

FIG. 1 schematically illustrates a diffusional gas transfer system 20 in which environmental gas flow from a first gas domain 22 flowing through the first chamber 28 is brought into contact with a first surface 23 of a membrane 24. Environmental gas flow from a second gas domain 26 flowing through the second chamber 30 is brought into contact with a second surface 25 of the membrane 24. In the embodiment illustrated in FIG. 1, the first gas domain 22 represents air external to an enclosed space and the second gas domain 26 represents air in an enclosed space. A seal 27 is provided to restrict gas leakage between the domains 22, 26 at the edges of membrane 24. Pressure sampling ports 29a–d are located at various locations in the chambers 28, 30, such as near the inlets and outlets 42, 44, 46, 48. The first and second gas domains 22, 26 are not in fluid communication with each other, except across the membrane 24. In applications where the second gas domain 26 represents a large structure such as a high rise building, the first and second gas domains 22, 26 may not be exclusively separated from one another other than across the membrane because of leakage or temporary openings between the two gas domains.

Due to life processes within the second gas domain 26, environmental gas flow in the second chamber 30 contains elevated levels of $CO_2$ and reduced levels of $O_2$ with respect to environmental gas flow in the first chamber 28. The greater partial pressure of oxygen in the first chamber 28 causes $O_2$ to flow through the membrane 24 and into the second chamber 30. Simultaneously, the greater partial pressure of carbon dioxide in the second chamber 30 causes $CO_2$ to flow through the membrane 24 into the first chamber 28.

The membrane 24 may be sized to provide sufficient diffusional exchange of $O_2$ and $CO_2$ to maintain a healthy environment within the second gas domain 26 while preventing particles from penetrating the membrane 24. Diffusion of oxygen and carbon dioxide across the membrane 24 is controlled by various factors, such as the concentration gradient across the membrane 24 (proportional to the differential partial pressures of $O_2$ and $CO_2$), the diffusional transparency of the membrane, the geometry of the flow conduits on each surface of the membrane 24 in the system 20, the available diffusional surface area of the membrane 24, flow rate in the flow conduits, and other factors. Any oxygen consumption or carbon dioxide production within the second gas domain 26 causes a corresponding transfer of the selected gas across the membrane 24.

Figure 2A:
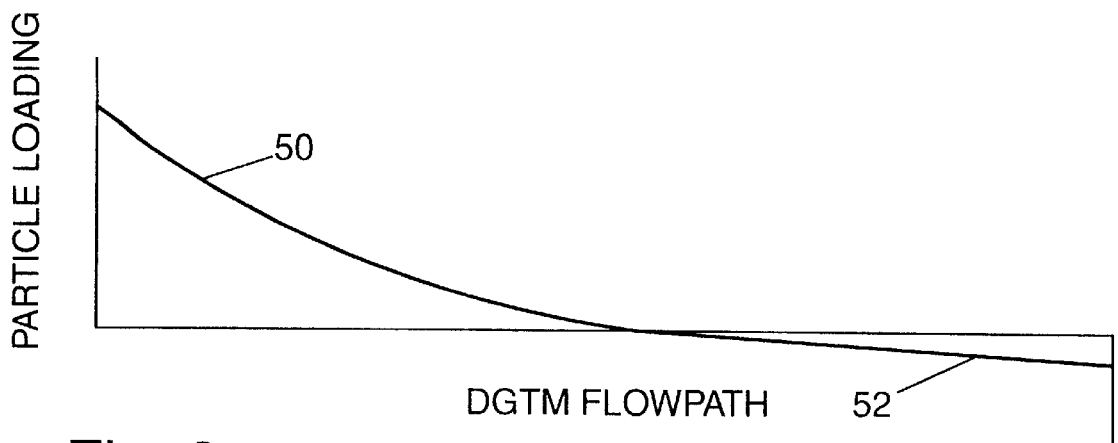
FIG. 2a graphically illustrates particle loading through a diffusional gas transfer system in accordance with the present invention.
Figure 2B:
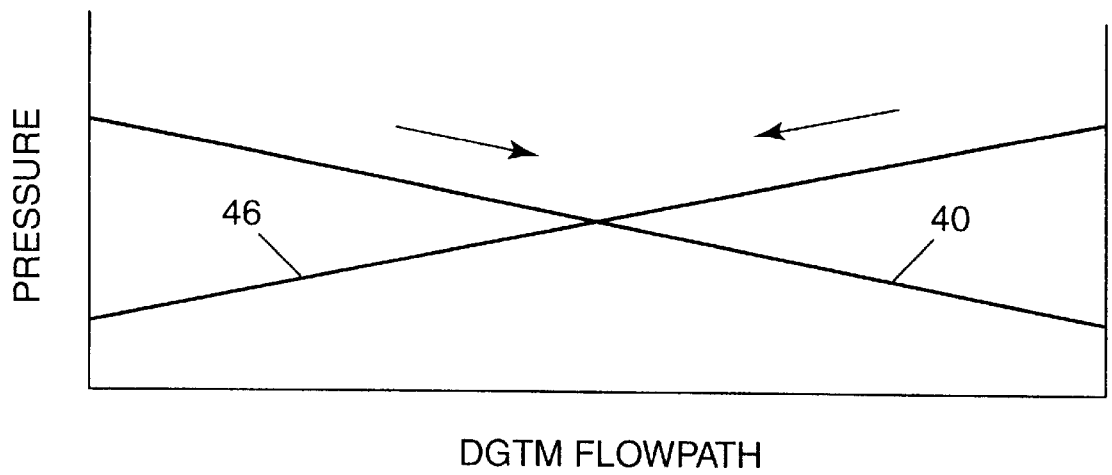
FIG. 2b graphically illustrates the pressure differential across a membrane in one embodiment of a diffusional gas transfer system.

FIGS. 2a and 2b graphically illustrate the theoretical particle loading and pressure differential, respectively, across a membrane 24 along the diffusional gas transfer membrane (DGTM) flow path using the diffusional gas transfer system such as illustrated in FIG. 1. Curve 40 corresponds to the static air pressure within the first chamber 28 Environmental gas flow enters the first chamber 28 from the first domain 22 through inlet port 42 designated by the left vertical axis. The static pressure within the first chamber 28 drops as the environmental gas flow moves through the first chamber 28 to an exit port 44 designated by the right vertical axis. In the embodiment of FIG. 1, environmental gas flow through the second chamber 30 is in the reverse direction. Consequently, pressure across the membrane is greatest near the inlet 48 as shown by the intersection of the right vertical axis and the curve 46 on the pressure graph of FIG. 2b. At some point near the middle of the diffusional gas transfer system 20, the pressure differential across the membrane 24 is approximately zero at the intersection of the curves 40, 46. The environmental gas flow directions through the system 20 may be parallel or skewed at some angle with respect to each other, rather then counter-flow, although counter-flow generally results in the largest system mass transfer rate. As the pressure drop across the membrane 24 increases, there may also be a pressure driven flow complementing or detracting from the diffusional flow of the gases.

Particle loading of the membrane 24 is driven primarily by pressure differentials between opposite surfaces of the membrane 24. As illustrated in FIG. 2a, the curve 50 corresponds to particle loading at the first surface 23 of the membrane 24. Since pressure differential is greatest across the membrane 24 at the inlet 42 designated by the left vertical axis, particle loading is greatest at that location. Particle loading drops off significantly toward the center of the diffusional gas transfer system 20 where the pressure differential approaches zero across the membrane 24, although particle loading can be above zero due to random motion of the gas and the corresponding Brownian motion of particles. Correspondingly, particle loading on the second surface 25 of the membrane 24 is greatest by the inlet 48. Assuming the environmental gas flow volume on the second surface 25 generally contains less particles, the overall level of particle loading shown in curve 52 is lower. As discussed in connection with the first chamber 28, particle loading drops off significantly as the pressure differential across the membrane 24 is reduced.

Figure 3:
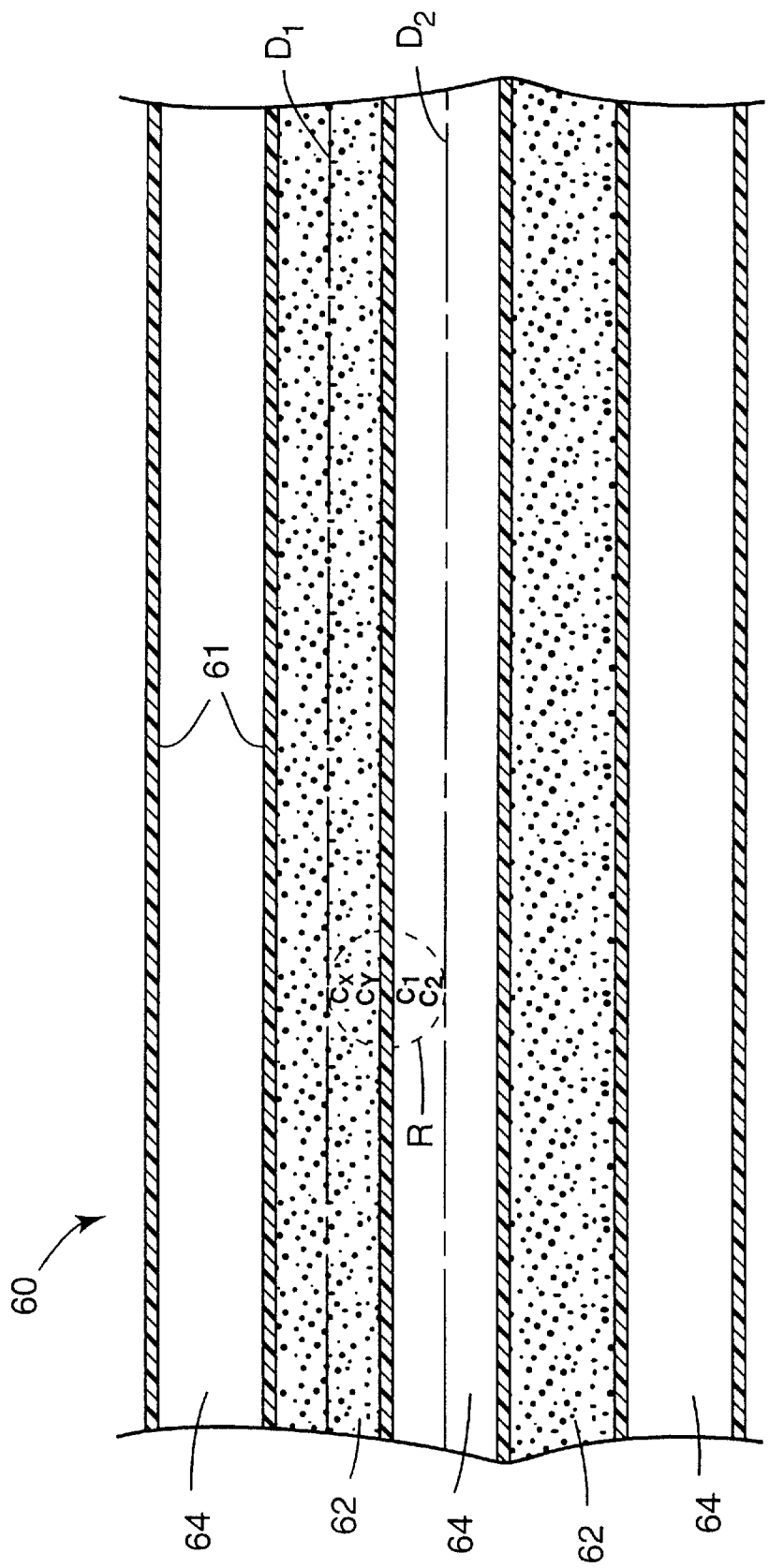
FIG. 3 is a sectional schematic view of a multi-layer diffusional gas transfer system in accordance with the present invention.

FIG. 3 schematically illustrates a multi-layered diffusional gas transfer system 60 designed to maximize the surface area of diffusional membranes 61 between the contaminated environmental gas flow stream 62 and the less contaminated environmental gas flow stream 64. As shown in the region R, the concentration of oxygen, carbon dioxide, water vapor and other gases and vapors diffusing through the membrane 61 vary during active diffusion. For example, in the case of laminar flow, and assuming the concentration of a selected or target gas is greater in the contaminated environmental gas flow stream 62, the concentration $C_x$ of a target gas in the contaminated environmental gas flow stream 62 near the center line $D_1$ is generally greater than the concentration of the target gas $C_y$ due to diffusion through the membrane 61. As the target gas continues to diffuse through the membrane 61, the concentration of oxygen $C_1$ on the opposite surface of the membrane will be greater than the concentration $C_2$. Over a period of time, the concentration $C_x$ will continue to decrease and the concentration $C_2$ will continue to increase, as the environmental gas flow streams 62, 64 continue to flow.

In a laminar flow environment, the velocity of the environmental gas flow is generally greatest along the centerlines $D_1$, $D_2$ of the environmental gas flow streams 62, 64. The velocity tends to be lower closer to the membrane 61.

Conceptually, diffusion through the membrane 61 is limited by three impedances: a first boundary layer between $C_x$ and $C_y$, the membrane 61 and a second boundary layer between $C_1$ and $C_2$. The boundary layer impedance is generally reduced in a turbulent flow environment.

Figure 4:
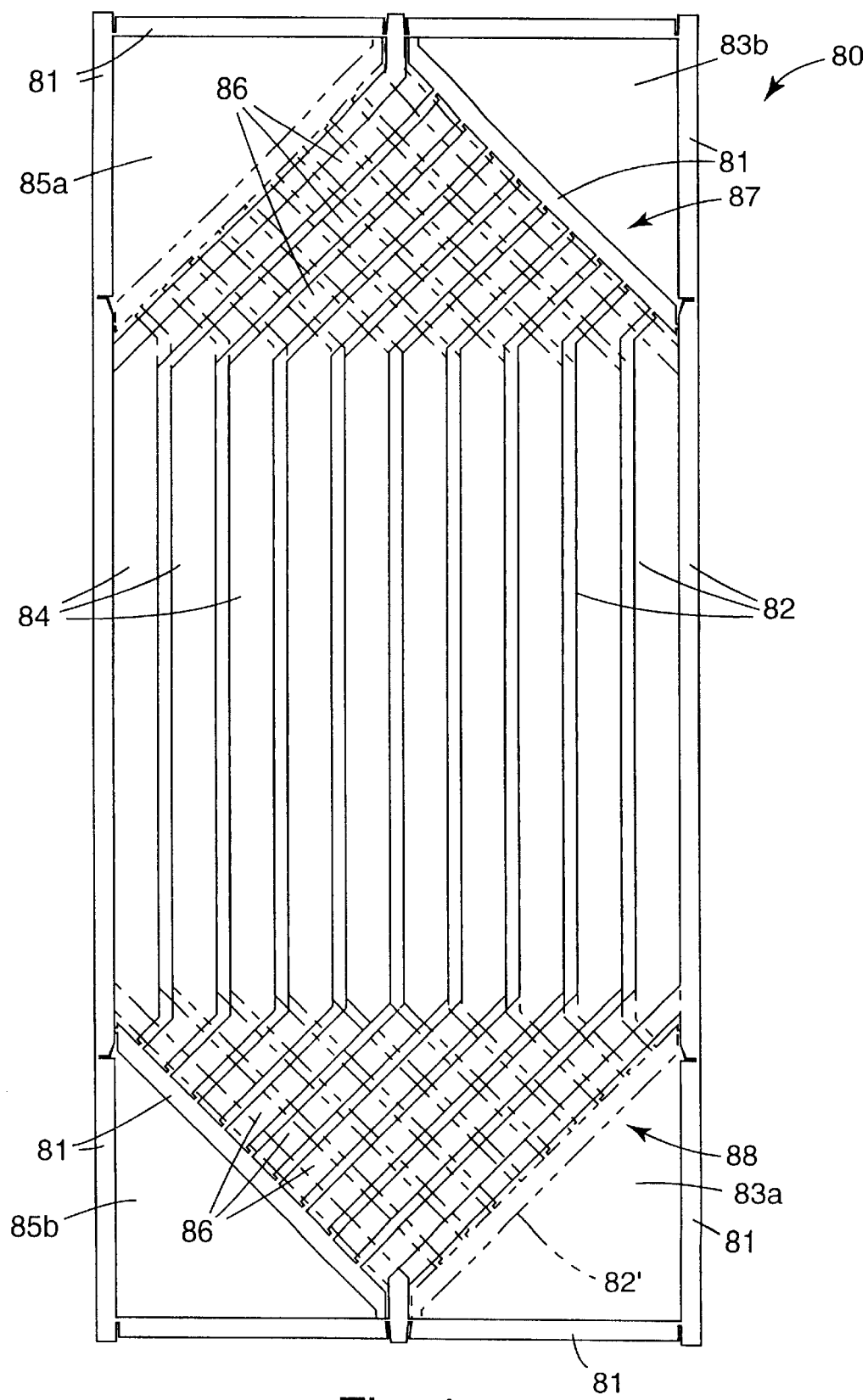
FIG. 4 is a top view of superimposed exemplary co-current or counterflow grids for use in a diffusional gas transfer system of the present invention.

FIG. 4 schematically illustrates a grid layer 80 for use in a layered diffusional gas transfer system. The grid layer 80 has a series of dividers 82 for directing environmental gas flow along discrete flow paths 84 and 86. The dividers 82 also serve as spacers between alternating layers of membranes. The diffusional gas transfer system may be configured by alternating grid layer 80 with sheets of a membrane (not shown). Alternating grid layers 80 may be rotated 180° with respect to each other so that the dividers 82' along the end portions 87, 88 are in a crossflow configuration. Breakaway portions 81 hold the dividers and other components in spaced relation during assembly and are removed after the membrane stack is assembled. In a counter-current flow situation, regions 83 and 83b are inlets whereas 85a and 85b are outlets. For a co-current flow, 83a and 85b are inlets, and 83b and 85a are outlets.

Figure 5:
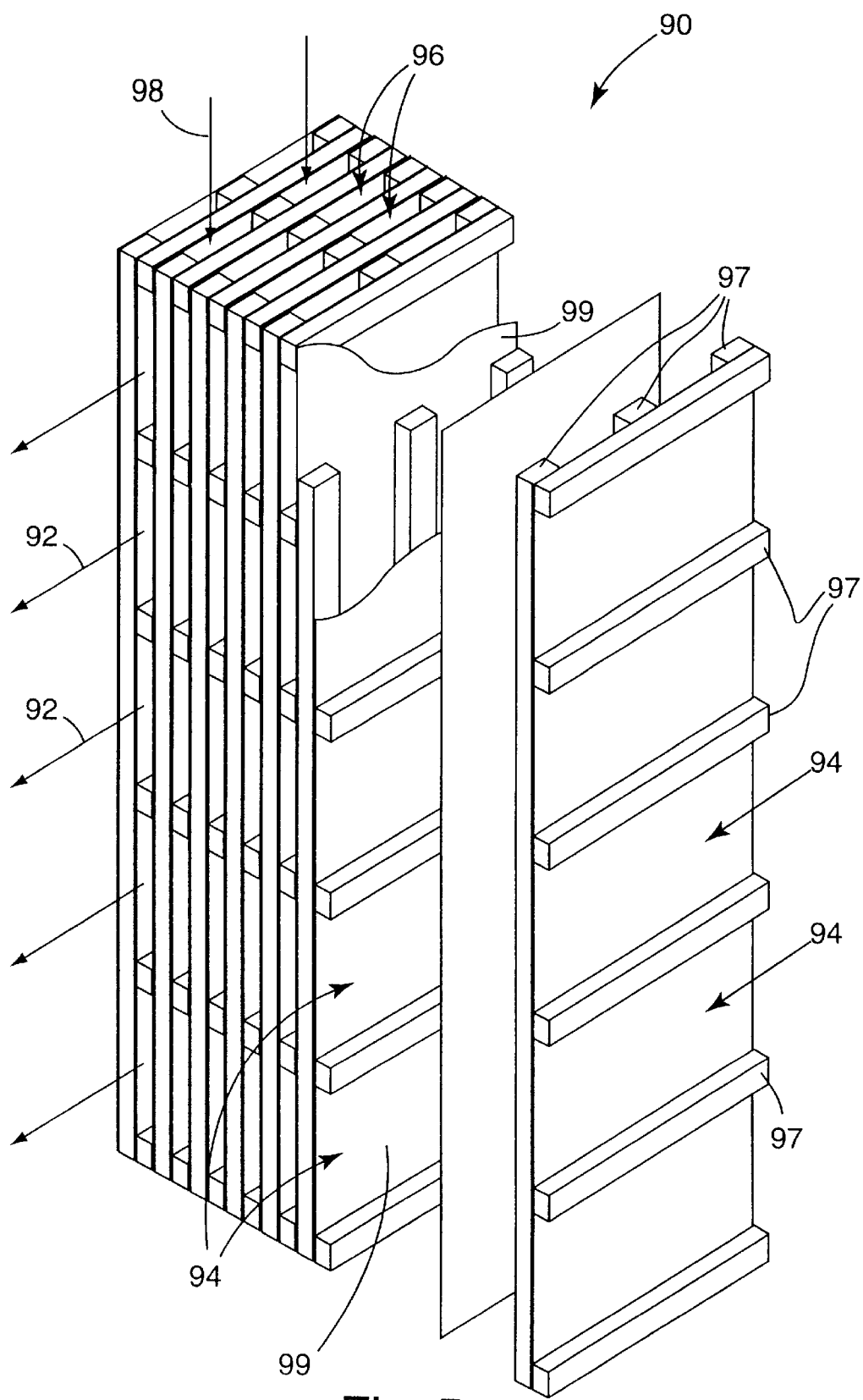
FIG. 5 schematically illustrates a multi-layered cross flow diffusional gas transfer system in accordance with the present invention.

FIG. 5 is a schematic illustration of a multi-layered diffusional gas transfer system 90. A series of membranes 99 are maintained in a spaced-apart configuration by a series of dividers 97. Alternating layers of contaminated environmental gas flow 92 move through channels 94 perpendicular to the less contaminated environmental gas flow 98 in channels 96.

Figure 6:
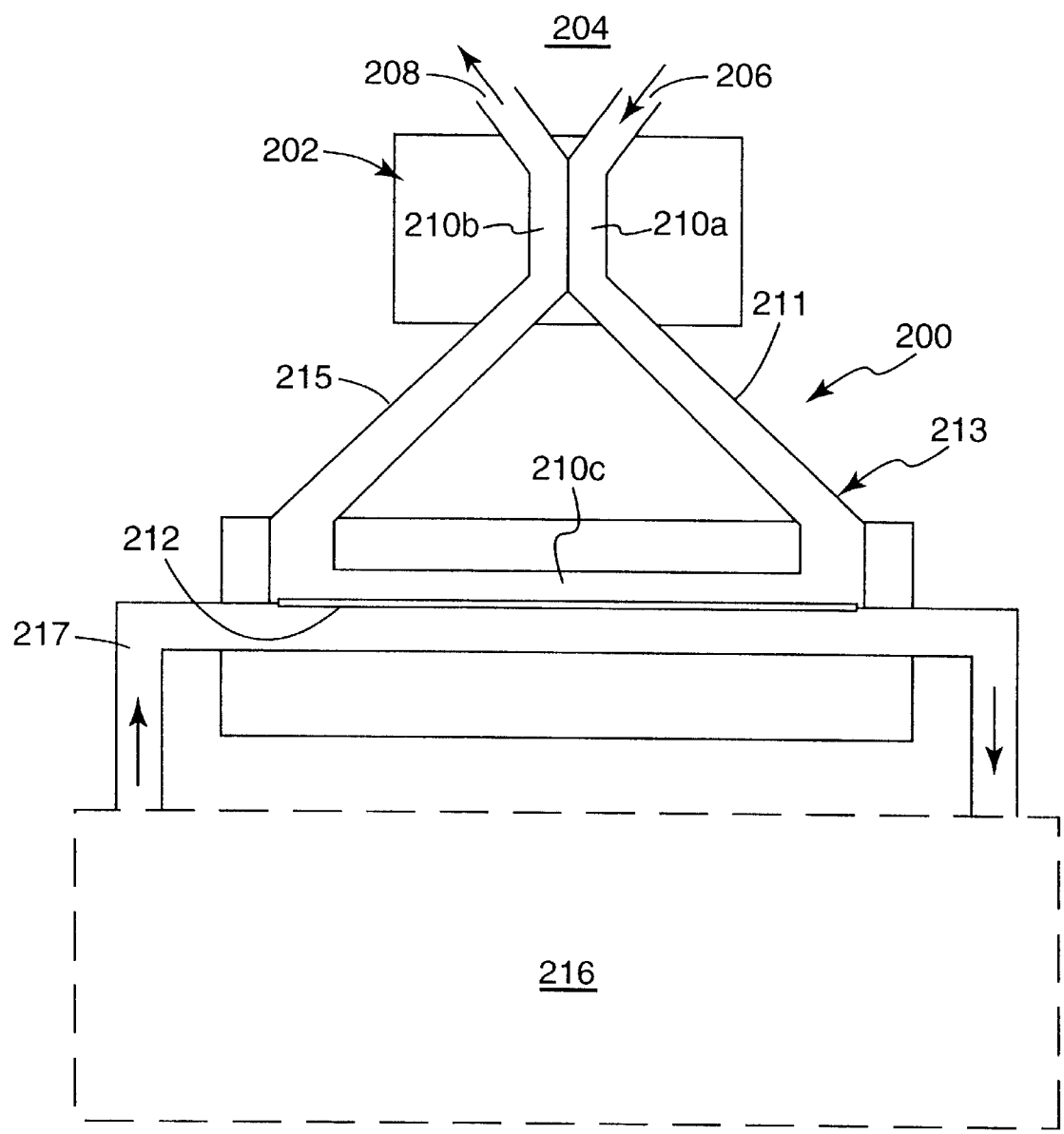
FIG. 6 schematically represents a combination air-to-air heat exchanger and a diffusional gas transfer system in accordance with the present invention.

FIG. 6 schematically illustrates a diffusional gas transfer system 200 arranged in combination with an air-to-air heat exchanger 202. Cool environmental gas flow from a first gas domain 204 enters an inlet port 206 and exits the system at port 208. The gas passes through a first gaseous flow path 213 on the upstream portion 211 under the influence of a suitable driver such as a fan, pump, compressor, bellows or the like. Environmental gas flow entering the inlet port 206 is delivered to a first surface of a diffusional gas transfer membrane 212 in a diffusional gas transfer interface at a portion 210c. The membrane essentially separates what is referred to as the upstream portion 211 of the first gaseous flow path 213 from its downstream portion 215. A second or warmer gaseous fluid 217 from a second gas domain 216 contacts the opposite surface of the membrane 212 to effectuate diffusional transfer between the first gaseous flow path 213 and the second gaseous flow path 217 at portion 210c. Thermal transfer also occurs across the medium 212 so that the cooler gaseous flow 213 at location 210c is warmed. The first, now-oxygen-depleted, warmer gas stream in path 213 at location 210c continues along the downstream portion 215 of the fluid path 213 to a location 210b where it is brought into thermal communication with the cooler environmental gas stream from the upstream portion 211 at the location 210a, thereby warming the incoming gas.

Laminar/Turbulent Mass Diffusion

The performance of the diffusional gas transfer device depends upon pre-selection between the laminar and turbulent flow regimes. In a straight channel configuration, laminar flow occurs at a Reynolds number of less than approximately 2300. Turbulent flow tends to begin to occur above about 2300. The Reynolds number is defined as the ratio of inertial effects to viscous effects, this is, $$Re = \frac{(D)(V)(\rho)}{\mu}$$

where $\rho$ is the fluid density, D is the equivalent diameter of the channel, V is the flow velocity, and $\mu$ is the fluid viscosity.

For a gas that moves through a channel, a boundary layer is defined by the part of the moving gas that is influenced by the presence of a solid boundary such as a porous membrane. For a given membrane, the boundary layer thickness determines the amount of gas transferred from one surface of the membrane to the other. Thicker laminar boundary layers promote less gas transfer across the membrane compared to thinner turbulent boundary layers (viscous sublayers) that are closer to and attached to the diffusional membrane. At the same time, laminar flow rates produce higher concentration profiles across the length of the channel due to a larger fluid residence time.

For a given channel configuration, there exists an optimum combination of flow rate, flow path, channel width and channel length and channel gap at which the mass transfer from an inlet to an outlet is a maximum value, bearing in mind that high pressure drops at very high flow rates may be detrimental because of the possibility of membrane distortion and fan energy cost.

To analyze the effect that laminar or turbulent flow has on mass transfer, a set of experiments was developed to determine the relationship between mass transfer and flow regime under conditions of co-current flow.

Laminar/Turbulent Diffusion Test

The experiment device used in this test consisted of two single horizontal flow channels separated from each other by a membrane (material used in Example 5 below). Dimensions of each channel were: ⅛ inch thickness (3.175 mm), 0.3125 inch in width (7.9375 mm) and 4 inch in length (10.16 cm). The experimental device resembled the flow configuration described in FIG. 1 except that the inlets and the outlets were oriented at 90° with respect to the flow path axis and the flow was co-current rather than counter-current.

The flow path in the first chamber 28 contained ultra pure nitrogen (0% oxygen) and the bottom flow in the second chamber 30 contained pre-filtered laboratory air (20.9% oxygen). The diffusional analysis was made by transferring oxygen from the air-containing chamber 30 into the nitrogen-containing chamber 28. The amount of oxygen transferred into the nitrogen stream was monitored and measured at the outlet 44 of the nitrogen path. The instrumentation used to detect oxygen concentration was the same utilized in diffusional tests described below.

Pressure drops and flow rates were monitored at each flow path inlet/outlet with the aid of magnahelic gages and flow rotameters respectively. Table 1 shows the percentage of oxygen transferred into the nitrogen stream measured at the flow path outlet for co-current flow. The difference in pressure drop values between the two streams is due to the different values in viscosity and density for each gas (air and nitrogen). Note that flows were incremented in steps of 5 cubic feet per hour (cfh), 2.36 liters per minute (Lpm) for the laminar cases and flows were incremented in steps of 10 cfh (4.72 Lpm) for the turbulent cases.

Laminar/Turbulent Diffusion Model

The experimental analysis conducted above was very useful in obtaining a reference line of levels of gas transfer in this test cell.

To reduce the experimental iterative process of trial and error, a computational fluid dynamics (CFD) model was developed to verify some of the experimental runs and to help select some more preferred modes. Once the model is built, the computing process has the advantage of changing and varying parameters that otherwise could not be executed in the experiment.

The computational model developed makes use of the governing equations of Navier-Stokes that describe the fluid dynamics and mass transfer occurring in the actual process. The model consists of a discretized mesh domain that resembles the actual geometry (except at inlets and outlets) where the numerical equations are solved to approximate a solution equal to the one found in the experiment. Since the model is an approximation to the real system, once a solution is obtained it is possible to extract information at any location of the physical domain. Information such as pressure gradients, velocity (including flow direction), concentration gradients, total mass transferred, etc., can be obtained anywhere in the domain of the discretized solution. The model developed included laminar and turbulent effects coupled to the mass transfer of species.

To develop a comparative analysis of the process, the physical parameters and dimensions of the experiment were incorporated into the model. The percentage of oxygen transferred into the nitrogen stream was the main parameter used to compare experimental values versus calculated values.

Figure 7A:
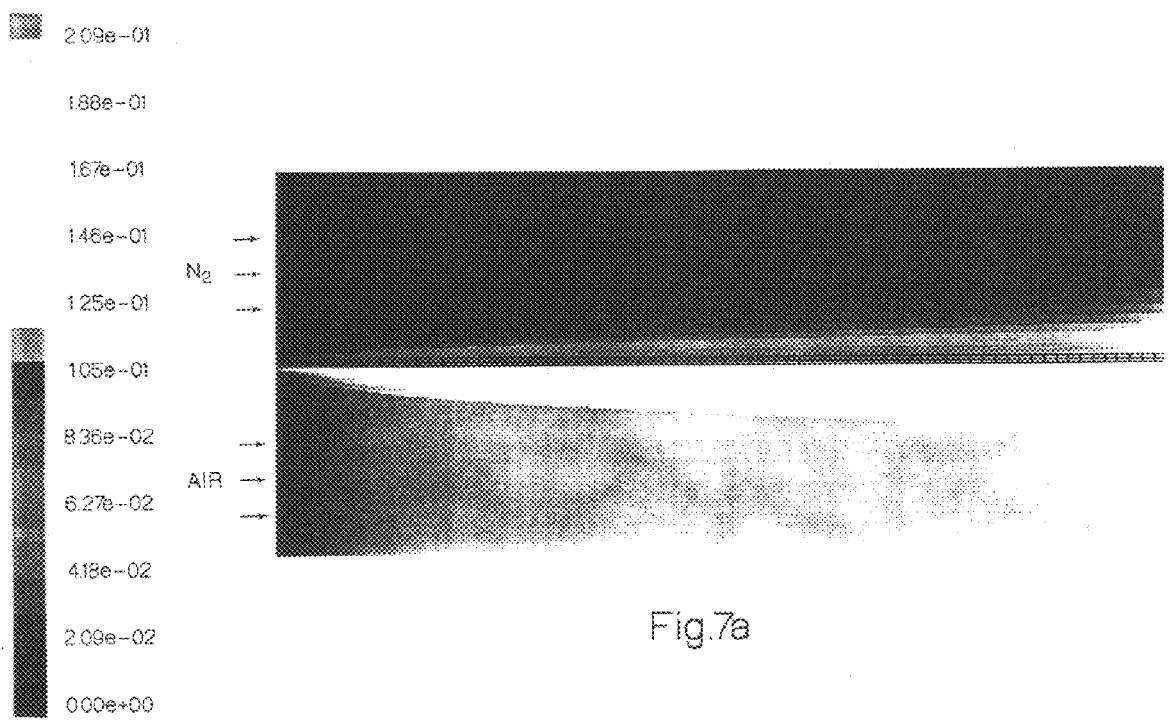
FIG. 7a illustrates a contour of oxygen concentration at channel inlets using flow rates of about 2.36 liters per minute (Lpm).

FIG. 7a shows a side view of the concentration of oxygen for the co-current flow for a small portion at the air (20.9% oxygen) and nitrogen (0.0% oxygen) inlets. Both inlets are shown in this figure, with the air stream on the bottom and the nitrogen stream on top and a membrane separating the gas flows from left to right in both flow paths. It is important to note how the linear growth of oxygen concentration can be captured right at the entrance of this small flow path section. The model computed was run at 5 cubic feet per hour (cfh) (2.36 Lpm) using laminar flow, and integration of the concentration values at the top outlet yielded 3.57% oxygen (versus 4.62% experimental). The total volume amount of oxygen transferred for each case can be calculated by multiplying the actual flow rate times the percentage of oxygen transferred for that case from Table 1.

Figure 7B:
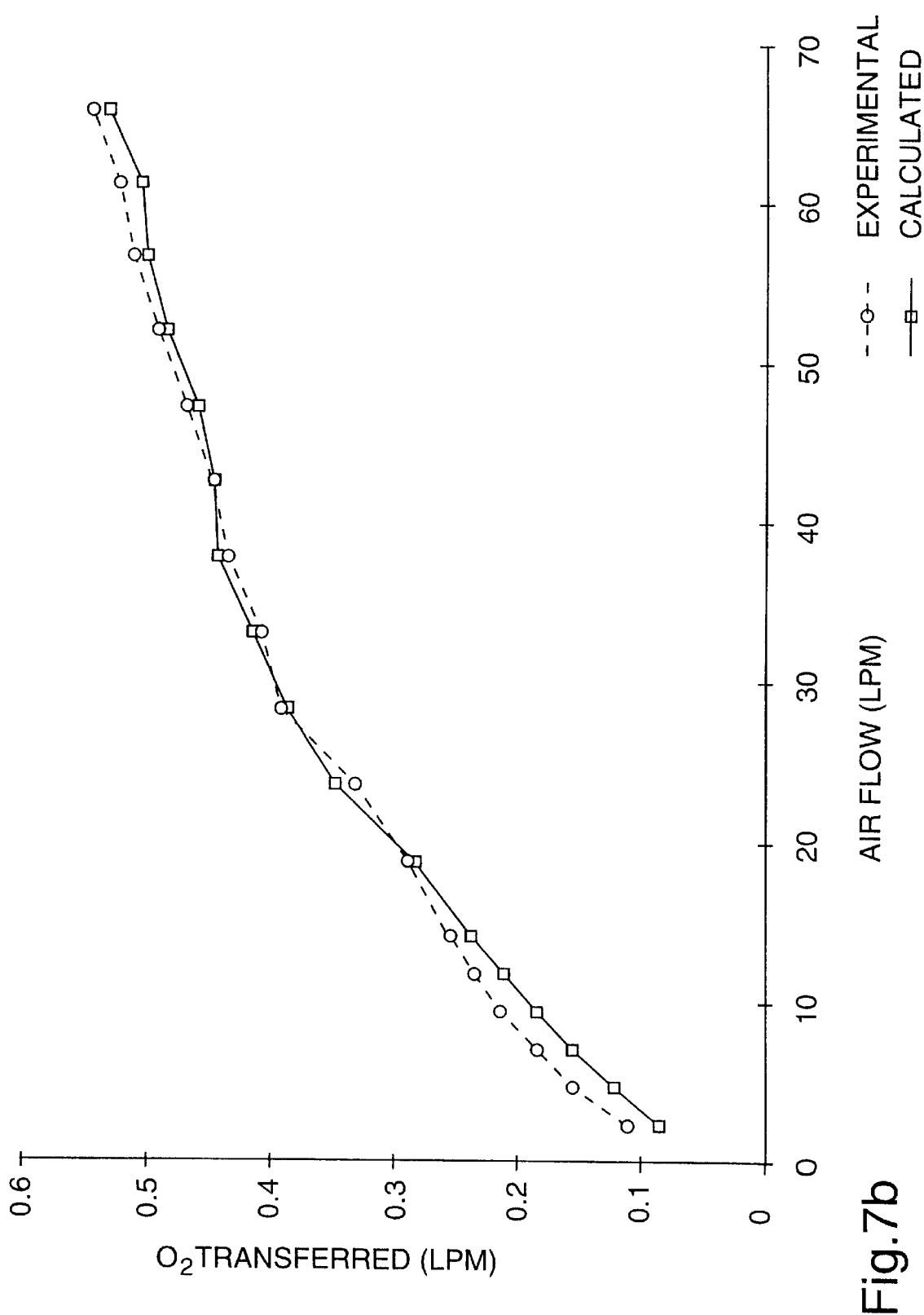
FIG. 7b shows the total volume amount of oxygen transferred (experimental versus calculated) from the oxygen stream into the nitrogen stream at various flow rates.

FIG. 7b shows the comparison of calculated values versus experimental values for the total volume of oxygen transferred in the co-current flow mode. An important finding from this comparative analysis is the fact that better mass transfer rates occur at higher flow rates (turbulent flow).

Figure 7C:
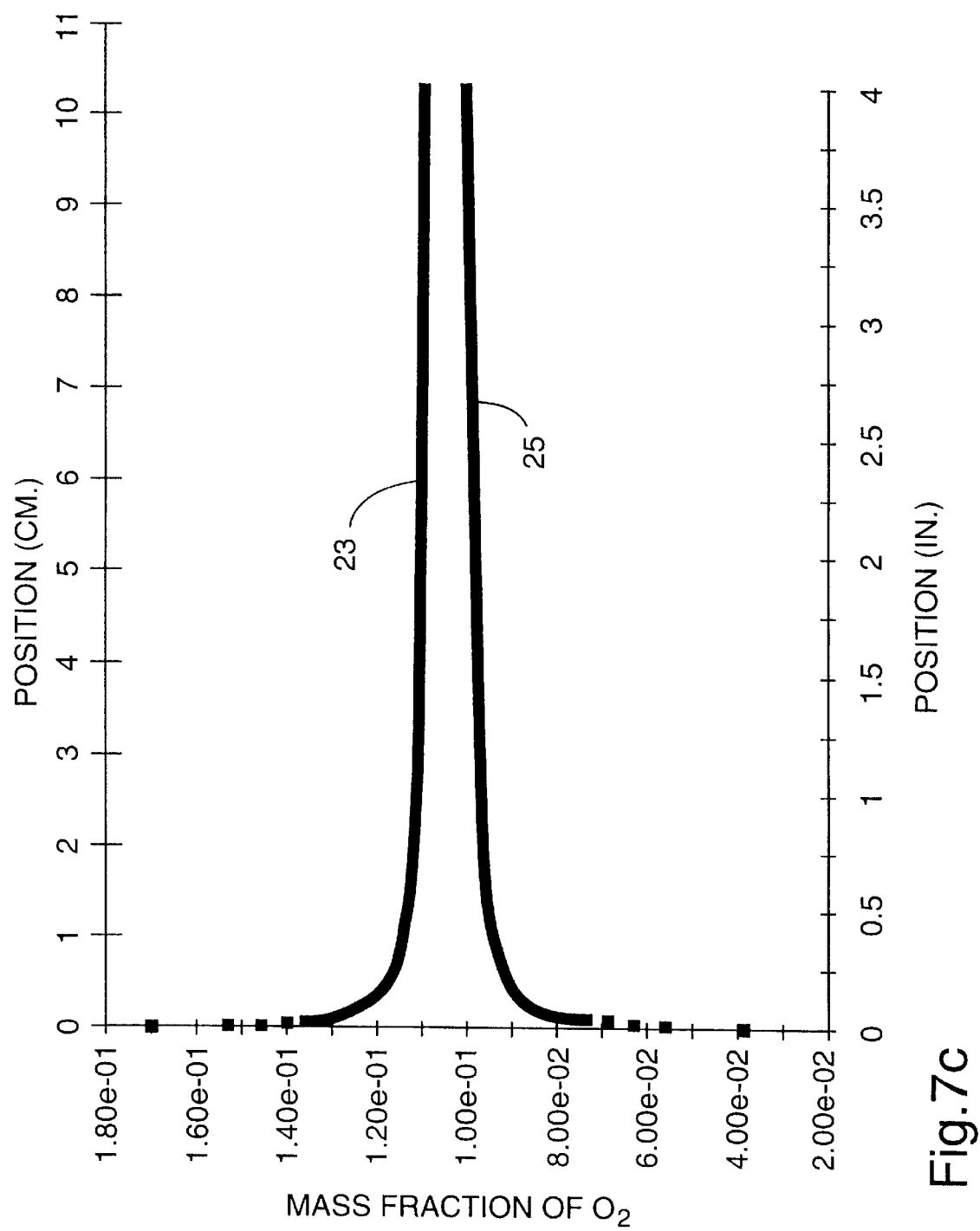
FIG. 7c shows oxygen concentration across the channel length on each side of a membrane in laminar flow.
Figure 7D:
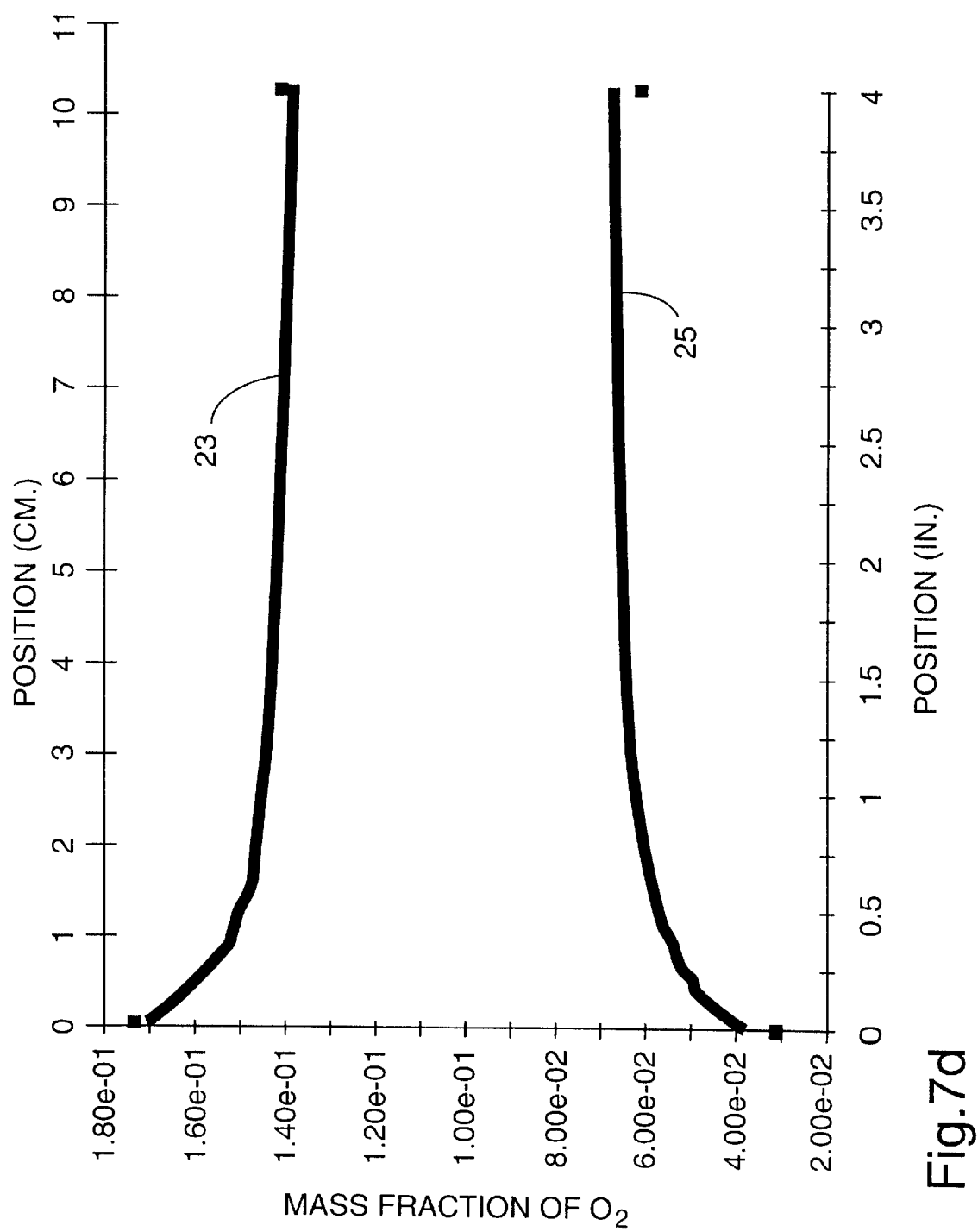
FIG. 7d shows oxygen concentration across the channel length on each side of a membrane in turbulent flow.

The effect of mass transfer can be also quantified from the concentration variations across the length of the flow path. FIG. 7c shows the oxygen concentration variation from the inlet (x=0) to outlet (x=10.16 cm) along each surface 23, 25 of the membrane (near at the solid/gas interface) in the co-current flow mode for a laminar flow rate of 5 cfh (2.36 Lpm). FIG. 7d shows the same oxygen concentration variation but for a turbulent flow rate of 140 cfh (66 Lpm). It can be observed that the concentration difference ($\Delta C$) for the laminar case is about 1.5% across the membrane while for the turbulent case the concentration difference ($\Delta C$) across the membrane is about 8%.

TABLE 1

| | | | | Co-Current Flow | | | |
| --- | --- | --- | --- | --- | --- | --- | --- |
| Flow Rate (cfh) | Flow Rate (Lpm) | Reynolds No. | % $O_2$ in Nitrogen | $\Delta P$ Nitrogen (kPa) | $\Delta P$ Air (kPa) | $\Delta P$ Nitrogen (inches $H_2O$) | $\Delta P$ Air (inches $H_2O$) |
| 5 | 2.36 | 328 | 4.62 | 0.02 | 0.02 | 0.08 | 0.07 |
| 10 | 4.72 | 656 | 3.27 | 0.03 | 0.04 | 0.14 | 0.15 |
| 15 | 7.08 | 984 | 2.58 | 0.07 | 0.06 | 0.27 | 0.24 |
| 20 | 9.44 | 1312 | 2.25 | 0.10 | 0.09 | 0.42 | 0.38 |
| 25 | 11.80 | 1640 | 1.98 | 0.16 | 0.14 | 0.64 | 0.57 |
| 30 | 14.16 | 1968 | 1.78 | 0.21 | 0.18 | 0.83 | 0.73 |
| 40 | 18.88 | 2624 | 1.52 | 0.37 | 0.37 | 1.50 | 1.50 |
| 50 | 23.60 | 3280 | 1.37 | 0.50 | 0.52 | 2.00 | 2.10 |
| 60 | 28.32 | 3936 | 1.26 | 0.65 | 0.60 | 2.60 | 2.40 |
| 70 | 33.04 | 4592 | 1.14 | 0.90 | 0.75 | 3.60 | 3.00 |
| 80 | 37.75 | 5248 | 1.03 | 1.12 | 0.90 | 4.50 | 3.60 |
| 90 | 42.47 | 5904 | 0.95 | 1.42 | 1.14 | 5.70 | 4.60 |
| 100 | 47.19 | 6560 | 0.89 | 1.87 | 1.44 | 7.50 | 5.80 |
| 110 | 51.91 | 7216 | 0.82 | 2.34 | 1.69 | 9.40 | 6.80 |
| 120 | 56.63 | 7872 | 0.79 | 2.51 | 1.99 | 10.10 | 8.00 |
| 130 | 61.35 | 8528 | 0.76 | 2.74 | 2.24 | 11.00 | 9.00 |
| 140 | 66.07 | 9184 | 0.73 | 3.23 | 2.61 | 13.00 | 10.50 |

Figure 8A:
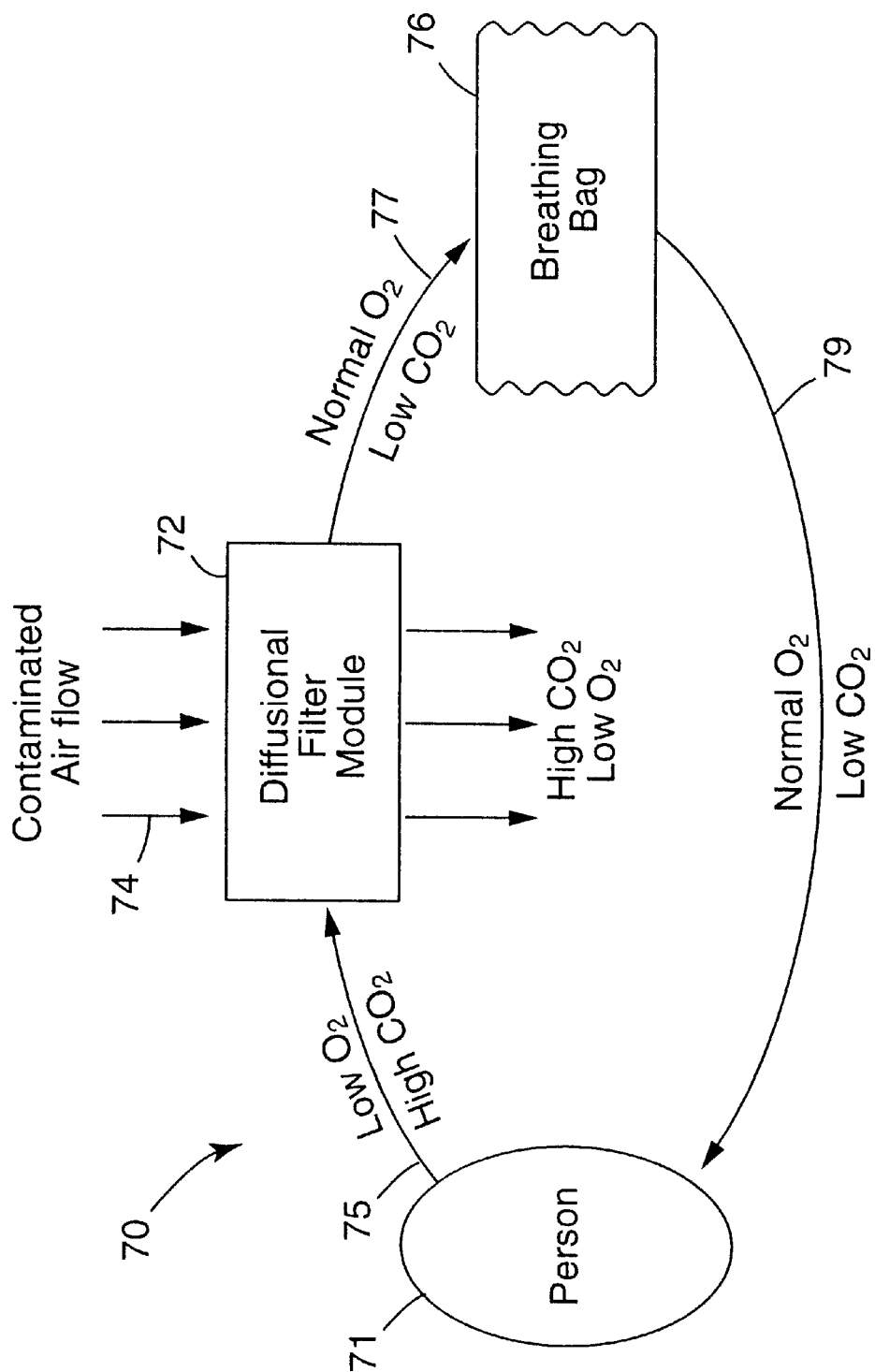
FIG. 8a schematically illustrates a personal particle filtration system in accordance with the present invention.
Figure 8B:
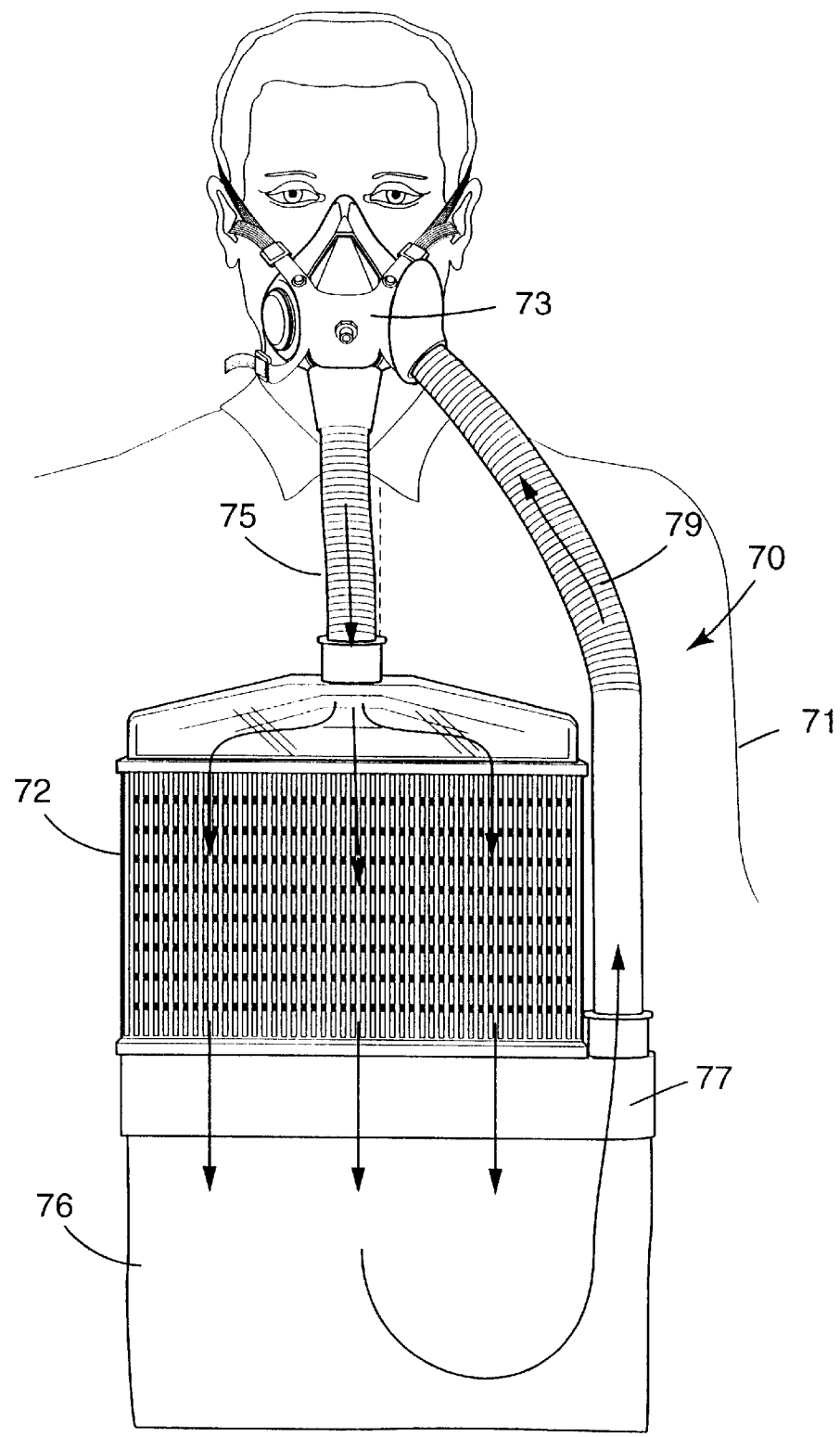
FIG. 8b is a front view of a personal particle filtration system in accordance with the present invention.

FIGS. 8a and 8b relate to a personal diffusional gas transfer system 70. The operator 71 breathes through a face piece 73 from which exhaled breath is conducted through an exhalation tube 75 into a diffusional gas transfer module 72. The air exhaled from the operator 71 contains lower concentrations of $O_2$ and higher concentrations of $CO_2$ relative to the external air. External (particle containing) air flow 74 is brought into engagement with the diffusional gas transfer module 72 so that the oxygen content in the plenum space 77 is increased and the $CO_2$ content is reduced. The oxygen enriched return air in plenum space 77 is passed to a breathing bag 76. Inhalation of breath from the breathing bag 76 occurs through an inhalation tube 79 to the operator 71. It will be understood that the external air may optionally be forced into engagement with the diffusional gas transfer module 72 by a fan or some other mechanism.

Figure 9:
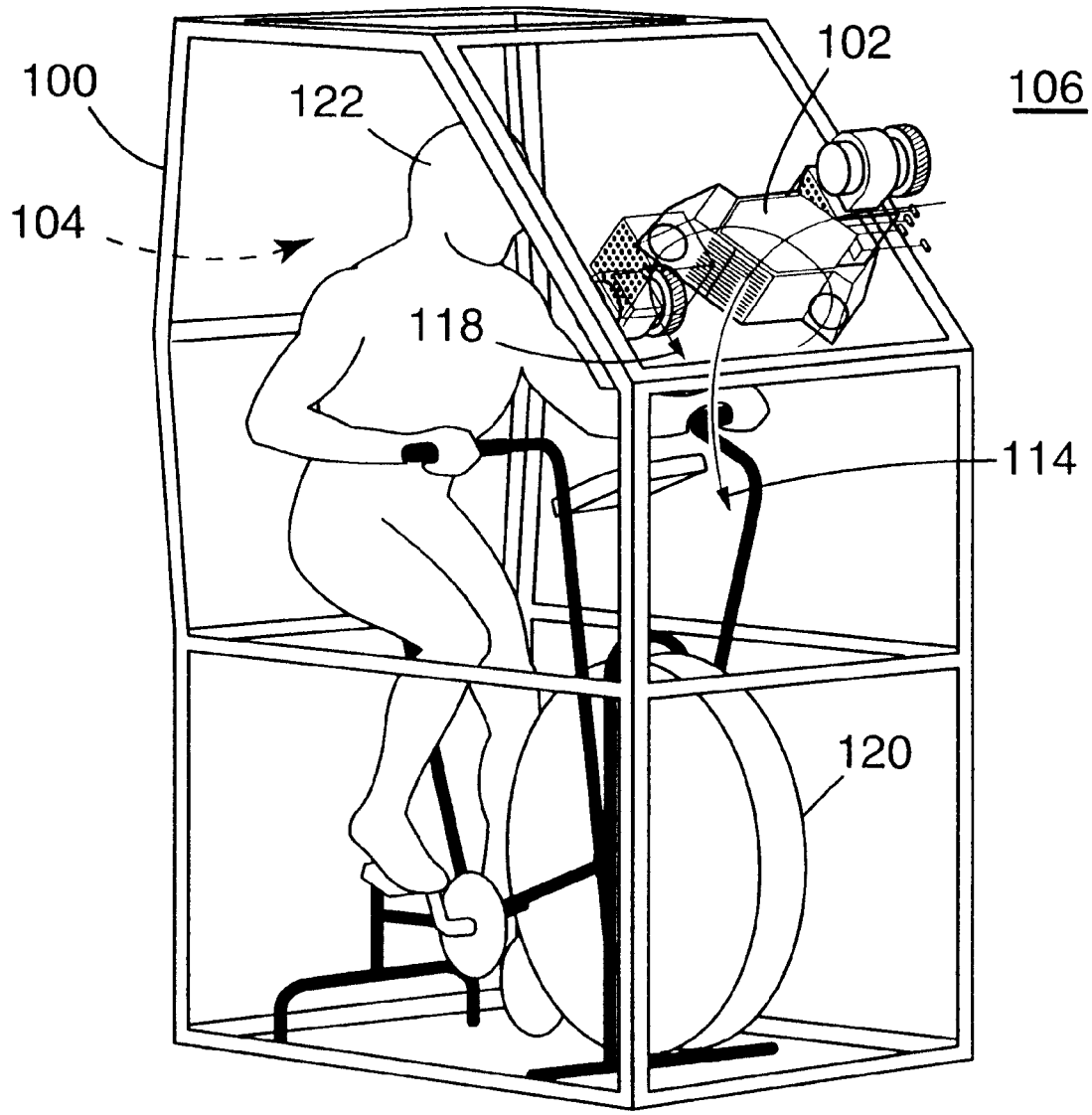
FIG. 9 is an isometric view of a test chamber for evaluating a diffusional gas transfer system in accordance with the present invention.

FIG. 9 is an isometric illustration of a test chamber 100 for evaluating a diffusional gas transfer system 102. The test chamber 100 is hermetically sealed forming an internal gas domain 104. Air in an external gas domain 106 does not mix with the air in the internal gas domain 104. A piece of exercise equipment 120 is provided within the test chamber 100 for accelerating the consumption of oxygen by the operator 122.

Figure 10A:
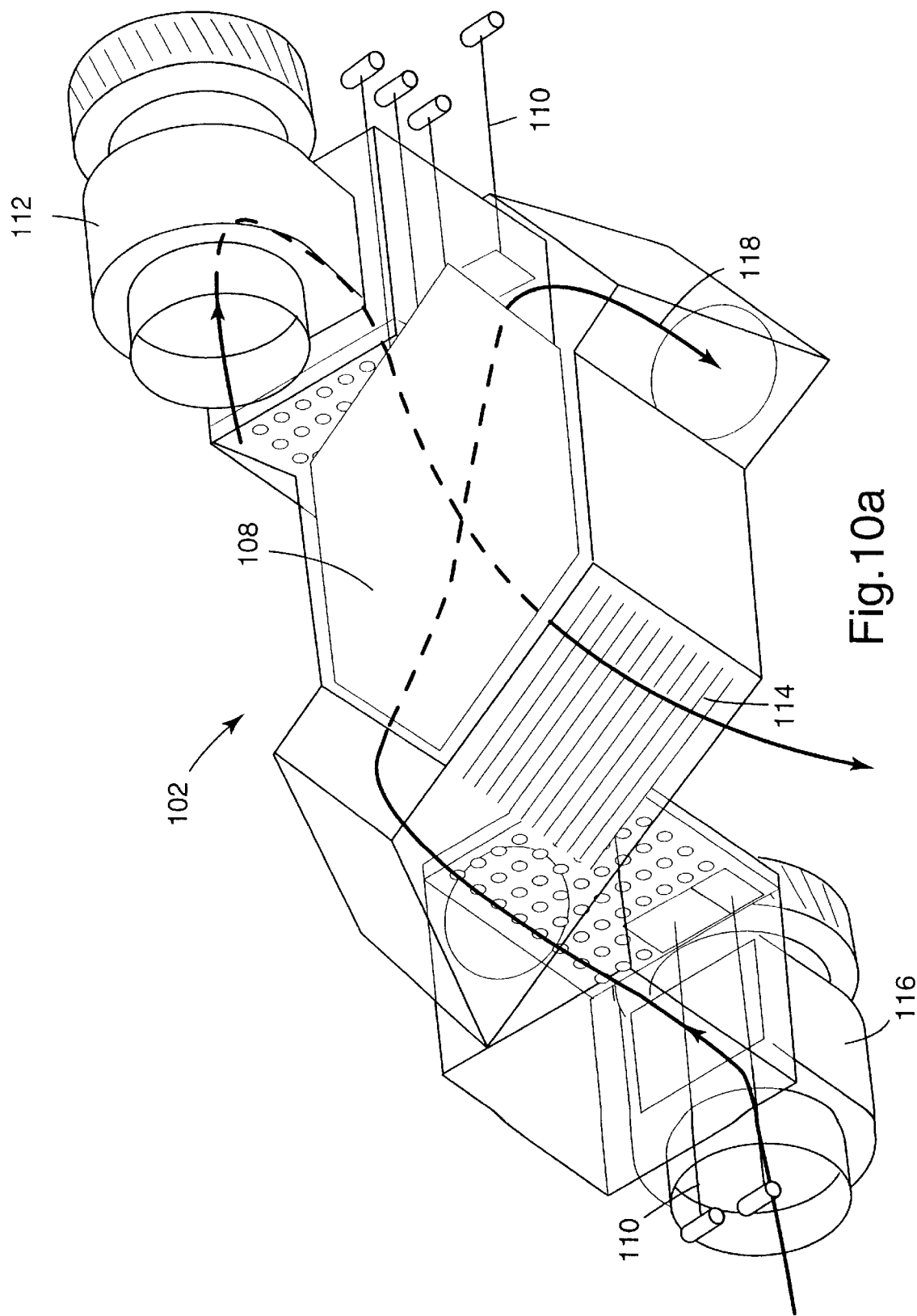
FIG. 10a is an isometric view of the diffusional gas transfer system of FIG. 9.

The diffusional gas transfer system 102, as best illustrated in FIG. 10a includes a multi-layered diffusional gas transfer module 108 having generally the configuration of FIG. 4 with a plurality of spaced membranes. Air in the external gas domain 106 is driven across the membranes by a fan 112. The air returns to the external gas domain through port 114. Similarly, a fan 116 circulates air within the internal gas domain 104 across the membranes. The air returns to the internal gas domain 104 through port 118. The test chamber 100 and diffusional gas transfer system 102 are discussed in further detail in connection with Example 42. Air flow is controlled by a series of pull rods 110, which are described in connection with Example 42.

Figure 10B:
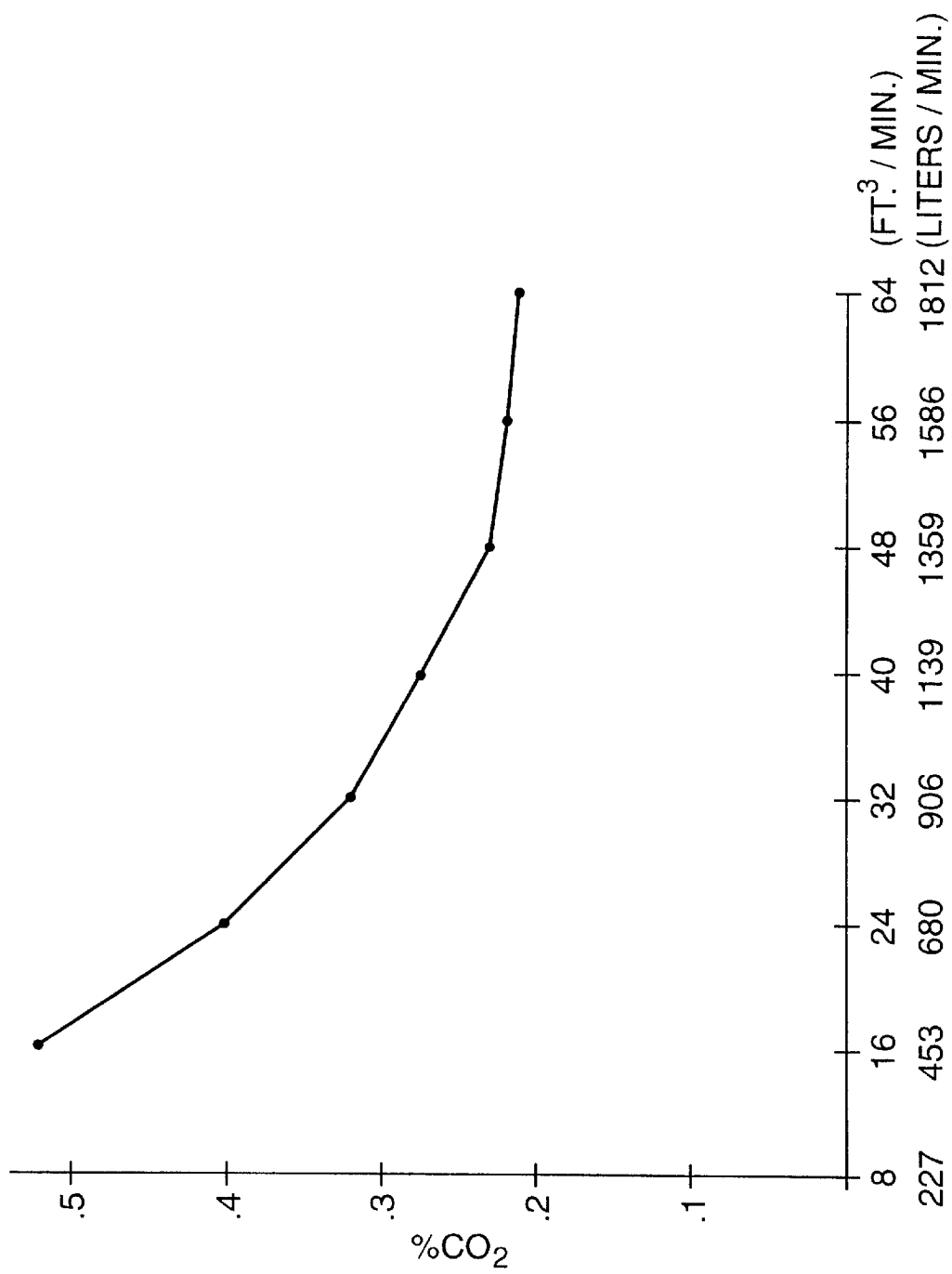
FIG. 10b is a graph showing $CO_2$ levels at various flow rates through the diffusional gas transfer system of FIG. 9.

FIG. 10b is a graphical illustration of the equilibrium concentration of $CO_2$ inside the test chamber 100 of FIG. 9 for a variety of air flow rates through the diffusional gas transfer system 102. The horizontal axis shows flow rate in both liters per minute and cubic feet per minute. FIG. 10b further shows equilibrium $CO_2$ concentration within the test chamber at various airflows through the DGTM. $CO_2$ levels were measured with a Model 3600 $CO_2$ meter available from Mine Safety Appliance Co., Pittsburgh, Penn. Note that the equilibrium $CO_2$ level initially falls rapidly as the flow of air through the DGTM is increased. Reductions in $CO_2$ level reach a level of diminishing return at about 48 CFM (1360 Lpm). The $CO_2$ was generated at a constant rate of about 1.55 Lpm, a value determined by applying the teaching of the Wasserman reference noted below to a 255 lb. (115.77 kg) male subject exercising at 100 watts. Because the concentrations are equilibrium values, the DGTM is transferring about 1.55 Lpm of $CO_2$ for each of the flow levels shown in FIG. 10a. Increases in flow through the DGTM have the beneficial effect of reducing the enclosure $CO_2$ concentration.

Figure 10C:
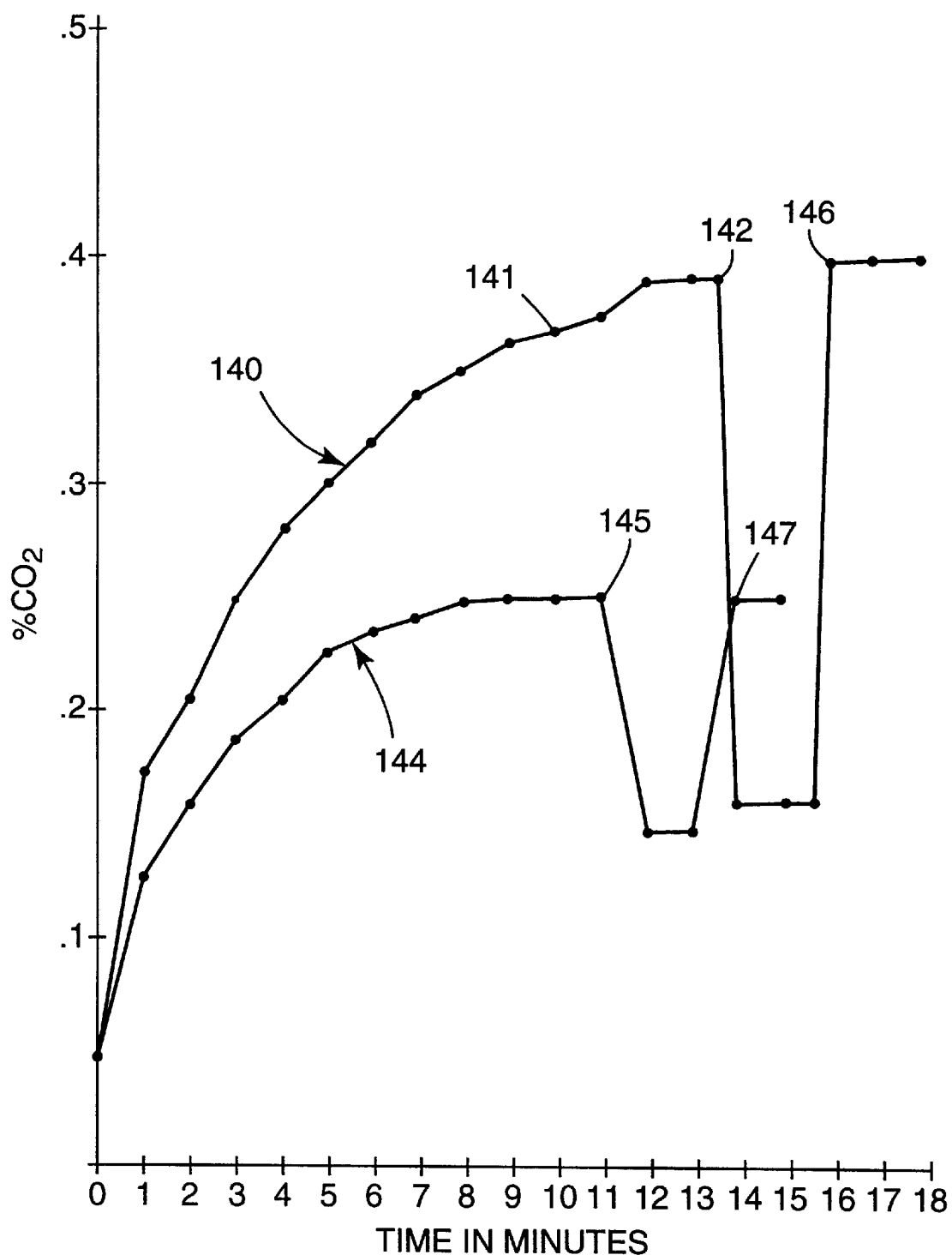
FIG. 10c graphically shows various $CO_2$ concentrations at constant subject work rates for two different flow rates through a diffusional gas transfer system of FIG. 9.

FIG. 10c is a graphical representation of two sequentially conducted exercise experiments shown superimposed. The upper curve 140 shows $CO_2$ concentration in the internal gas domain 104 at a flow rates through both flow circuits of the diffusional gas transfer system of 680 liters/minute (24 ft$^3$/minute). The rising portion 141 of the upper curve 140 shows the increase in $CO_2$ concentration to an equilibrium value of about 0.38%. At time 142 on the curve 140 the sampling probe was moved to measure the $CO_2$ concentration at the outlet 118 of the diffusional gas transfer system 102. The $CO_2$ concentration at the outlet 118 is substantially lower than within the internal gas domain 104.

FIG. 10c further shows $CO_2$ concentrations versus time for a second male subject weighing 190 lbs (86.26 kg) exercising at 100 watts in two separate experiments both shown. The upper curve is for an airflow level of 24 CFM (680 Lpm) through the DGTM and the superimposed lower curve is for a 48 CFM (1360 Lpm) flowrate. In both curves, the rapid change in concentration was due to switching the suction probe of the instrument from the chamber to the air being recirculated from the DGTM back into the chamber. For the 680 Lpm curve, the reduction is 0.23% of $CO_2$ for a 1.56 Lpm transfer of $CO_2$ through the DGTM. For the 1360 Lpm curve, the reduction is 0.1% of $CO_2$ for a 1.36 Lpm transfer of $CO_2$ through the DGTM.

Similarly, the lower curve 144 shows the reduced concentrations of $CO_2$ brought about by raising the flow through the diffusional gas transfer system to 1360 Lpm. At time 145 the sample probe was moved to measure the $CO_2$ concentration at the outlet 118 of the diffusional gas transfer system 102. At times 146 and 147, the sample probe was moved to once again measure the $CO_2$ concentration within the internal gas domain 104.

Membrane Evaluation

The membranes that are used in the present invention possess properties that allow oxygen to be extracted from outside air without the transfer of particulate matter. Oxygen, of course, is useful to support life within an enclosed space. When oxygen is being extracted from outside air through the membrane, the excess carbon dioxide from life processes in the enclosed space is ejected into the outside air. Membranes suitable for use in the present invention also substantially block the transfer of particulate contamination.

The membrane is preferably a polymeric material having a fibrous or globular structure. The void volume fraction of the membrane is at least 0.2 and preferably is at least 0.5, and more preferably 0.7 or greater. Typically, the upper end of void volume fraction is 0.95, more typically 0.9. The tortuous pathways in the membrane may be characterized by pores in the membrane having an apparent maximum pore size. The membrane preferably blocks the transfer of particles even when the particles are much smaller than the actual pore size defined by the tortuous path. The maximum pore size for substantially complete blockage of particles of 0.1 micrometers or less can be as large as 3.0 micrometers depending upon the pressure encountered across the membrane. Maximum pore sizes of 0.05 to 2 micrometers can substantially block particle transfer, even at high operating differential pressures across the membrane.

The present membrane can be supported to increase its mechanical rupture or burst pressure. In one embodiment, the membrane substantially blocks the transfer of particles when a pressure differential across the membrane is greater than the burst pressure of the membrane.

The membranes preferably block particles and still maintain high rates of diffusional exchange of gases. The membranes of the present invention have a structure such that there are tortuous pathways between the upper and lower surfaces of the membrane that are open and filled with air. Membrane parameters relevant to the selection process include:

1. Membrane material. In applications where the humidity is high or where the membrane surface is at a low temperature such that condensation can occur, it is desirable to use a material having low surface energy so that condensed water does not wick into the pores to wet them. The thermal properties of the material preferably withstand application temperatures, even when the membranes have fine microporous structures (less than 1.0 microns). If the membrane material does not have sufficient mechanical strength in various applications, it may be supported by layering it with an open macroporous supporting scrim layer. The interfacial bond between the membrane and the support layer should be strong enough to avoid delamination during use without interfering with the gas transfer processes.

2. Thickness. Thin membranes of the order of a few microns to several hundred microns are useful and thicker membranes may be needed in applications where pressures are high or where physical abuse is likely.

3. Void volume fraction and solidity. Control and selection of solidity or solids fraction of the membrane is relevant to diffusional properties. When the solidity, expressed either as a fraction or a decimal is subtracted from the number 1.0, the void volume fraction results. The void volume fraction is the sum of all pore spaces within the membrane between the two membrane surfaces divided by the total membrane volume. From the view point of flow or gas exchange, the void volume fraction is also the space in which such flow or exchange processes can occur.

4. Flow resistance. Flow resistance may be measured by the time needed for a given quantity of gas to flow through the membrane when under a given constant pressure according to the Gurley Test Method. Flow resistance may also be found by measuring the pressure that results from a given constant flow. Knowledge of the flow resistance, when combined with knowledge of the membrane thickness, solidity, and solid polymer density, leads to an approximation of both the Rubow effective fiber diameter (EFD) and the Benarie-Chen effective pore diameter. (see Rubow, K.: *Submicron Aerosol Filtration Characteristics of Membrane Filters*, Ph.D. Thesis, Univ. of Minn., p. 37–38 (1981); Benarie, M.: *Influence of Pore Structure Upon Separation Efficiencies in Fiber Filters*, Staub. R. Luft 29 (2) p. 37 (1969); Chen, C. Y.: *Filtration of Aerosols by Fibrous Media*, Chem. Rev. 55 (6) pp. 595–623 (1955)).

5. Effective fiber diameter. The effective fiber diameter (EFD) is a strong factor in determining the particle blocking membrane characteristics. It is more relevant to the particulate barrier properties of the membrane than it is to the gas transfer properties. Along with pore diameter, knowledge of EFD is useful in visualizing the membrane structure.

6. Pore diameter. The effective pore diameter (EPD) approximates the average pore diameter. The bubble point pore diameter (BPPD) is representative of the largest set of actual capillary pores extending from one surface of the membrane to the other, whether along a tortuous path or not. BPPD is the size of the set of pores that first allow ejection of a wetting liquid from the membrane by a gas. Both these pore diameters are set forth in Table 1.

Membrane Thickness Tests

Tests for membrane thickness were done at two different surface compressive stress levels. Membranes have differing degrees of hardness so that the amount of compaction from applied compressive stress will vary with the stress applied and the hardness of the membrane. Compaction needs to be avoided in order to obtain true measurements. It is also important to provide enough stress to flatten out wrinkles in the membrane so as to measure the membrane thickness without having an air gap between the sample and the measuring surfaces. To improve accuracy, samples under 25.4 microns in thickness were stacked 5 layers or in some cases 10 layers deep and the average thickness per membrane was determined.

The thicknesses of the membranes of Examples C1 through C8 were tested using the ONO-SOKKI EG 133 Digital Linear Gauge from Ono-Sokki Co. Ltd., Japan. This instrument reads to $4\times10^{-5}$ inches and/or to $1\times10^{-3}$ mm. The factory return spring in the instrument was disconnected to allow the probe of the instrument to rest freely on the sample. The probe weight was 37 grams and to this was added a 100 gram weight. A special measuring attachment whose weight is included in the probe weight and having a 0.508 cm diameter (0.2 inches) flat bottom was made and used to contact the sample. The surface compressive stress acting on the membrane during measurement was 9.6 psi ($6.62\times10^4$ pascals).

The thicknesses of membranes of Examples 1 through 40 were tested using the instrument discussed above. A special aluminum measuring attachment weighing 11.22 grams and having a 2.866 cm (1.128 inches) flat bottom with a 0.2 in. (0.508 cm) diameter recess was used to contact the sample. The total weight acting on the sample was 148.22 grams. The area acting on the sample was 6.24 cm² (0.9679 in²) and the surface compressive stress acting on the membrane during measurement was 0.337 psi (2.32 kPa).

Solid Polymer Density Test

Porous membranes have a bulk density that is determined by dividing the mass of a sample by the product of its thickness and area. Because the membrane has void volume, this value for density was lower than the actual density of the solid polymer portions of the membrane which could be determined as described below.

Samples were weighed in air to 0.00001 grams accuracy. If the weight was below about 0.1 grams, the amount of the membrane being tested was increased until its weight was above 0.1 grams. The weight was recorded. The sample was placed in a small (about 20 mm high and 40 mm dia.) perforated, aluminum, cylindrical container capable of being centrally suspended in the balance. The container preferably had perforated walls, cover, and bottom and was under 20 grams in weight. It has a thin nylon monofilament centrally attached to the cover with a small loop at the opposite end. The weight of the container and monofilament assembly was recorded to 0.00001 grams accuracy.

The sample and container were placed into a 150 mL beaker about one half filled with dearomatized heptane. The sample was vacuum degassed in a glass bell jar capable of being pumped to about 1 mm Hg absolute pressure. The evolution of gas from the sample was observed. The bubbles coming off during pressure reduction were typically air bubbles. Bubbles coming off at the lower pressures indicated boiling of the heptane. The pump down was repeated until only boiling heptane was observed and no bubbles come off during pump down. From this point, the container and sample were kept in the heptane to avoid occlusion of air.

Since the sample cools during the heptane boiling process, it was necessary to allow the sample and heptane to return to room temperature. The beaker and the container were placed in the gram balance and the container was suspended from above on the balance movement using a nylon monofilament. Heptane was added until the container was below the heptane surface by some standard dimension of choice. It works well to make a small knot in the monofilament so that the level of heptane was consistent. The container was weighed suspended in the heptane. It was important that the container hung freely in the heptane. The container weight was subtracted to obtain the weight of the membrane suspended in heptane.

The volume of the membrane solids portion was obtained by first subtracting the weight of the sample in air from the weight of the sample in heptane and dividing this difference by the density of the heptane taken at room temperature. Then, the density of the membrane solids portion was determined by dividing the weight of the membrane sample in air by the volume of the solids portion of the membrane determined above.

Membrane Flow Resistance

The resistance of the membrane to flow of air is measured according to ASTM-D-726-58 Method A. The test equipment used was a Teledyne Gurley Densometer Model 4110 and a Densometer Control Unit 4136/4137 both available from Teledyne Gurley, Troy, N.Y. In the test a 1.0 square inch (6.45 cm²) sample of membrane is subjected to air at a pressure of 4.88 inches of water (1.215 kPa). The number of seconds that elapse during flow of 50 cm³ of air is recorded. These "Gurley seconds" are therefore related to flow resistance in linear fashion because the higher the value, the higher the flow resistance.

Bubble Point Pore Diameter

The bubble point pore diameter test measures effective pore diameters (EPD) in microns. Tests were conducted according to ASTM-F-316-86, Test Method A, which is summarized here since it was discontinued in 1995. Test Method A determines the maximum pore size and is performed by prewetting the sample, increasing the pressure of the gas upstream of the sample at a predetermined rate and watching for gas bubbles downstream to indicate the passage of gas through the set of maximum diameter sample pores. The bubble point test method is based on the principle that a wetting liquid is held in the sample's capillary pores by capillary forces and surface tension, and the minimum pressure required to force liquid from these pores is a function of pore diameter. The pressure at which a steady stream of bubbles appears is called the bubble point pressure. To conduct the test a 47 mm diameter sample was placed on a support disc having a first support layer consisting of 100 mesh or finer screen and a second perforated metal plate layer for rigidity. Argon was used as the gas and the method was calibrated for a wetting fluid consisting of 3M Fluorinert (TM), FC-43 available from 3M Specialty Chemicals Division, St. Paul, Minn. The pressure ramp was generated and controlled by an instrument designated ica-Scan Wet-flow Instrument available from International Consultants Association, Encinitas, Calif. Pressure was measured by an Ashcroft Model K1 pressure transducer available from Ashcroft, subsidiary of Dresser Industries, Instrument Division, Milford, Conn. A Vacuum General Model USX2-11 available from Vacuum General, San Diego, Calif. was used to measure the flow of gas through the wetted membrane calibrated to 10 standard cubic centimeters (cc) of gas flow per minute (steady stream of bubbles). To calculate the maximum pore size, the ASTM-F-316-86 calculation method of paragraph 9.1 was used as follows:

$$d=(C)(y)/(P)$$

where:

d=limiting diameter, μm, y=surface tension, (dynes/cm)

P=pressure in psi or Pa

C=constant (2860 when p is in Pa, 0.415 when p is in psi)

In the case of the Fluorinert (TM) FC 43, the product of C and y is 6.64 dynes/cm.

Membrane Characterization

A variety of membranes satisfy the criteria discussed above. A membrane having a microporous polymeric matrix with desirable diffusional gas transfer properties is described in U.S. Pat. No. 5,260,360 to Mrozinski et al. Mrozinski discloses a membrane having a multiplicity of randomly dispersed, irregularly shaped, thermoplastic particles. A portion of the thermoplastic particles are spaced from one another to provide a network of pathways therebetween. A portion of the spaced thermoplastic particles are connected to each other by fibrils.

A microporous polymeric matrix is any material having generally continuous minute openings having a tortuous pathway through its thickness. While it is preferable that the entire area of a sheet material be microporous, sheets having solid, or non-porous areas and microporous areas may be employed for particular applications. The pore size in a matrix will generally be smaller than the matrix thickness.

Other films with desirable diffusional gas transfer properties include: oriented particle films such as those described in U.S. Pat. Nos. 4,777,073, 4,347,844, 5,176,953, and 5,317,035; cold dense films made porous by hot and cold stretching such as those described in U.S. Pat. Nos. 5,013,439, 3,839,240, 3,426,754, 3,843,761, 3,801,404, and 3,801,692; and other thermally induced phase separated films such as described in U.S. Pat. Nos. 4,867,881, 4,539,256 and 4,519,909. A variety of other membranes not listed here may also be useful in the present invention.

A series of membranes are evaluated using the criteria outlined above, as summarized in Table 2:

TABLE 2

| Example Number | Sample ID | Thickness (microns) | Mass (g) 133.35 mm circle | Solid Polymer Density (g/cc) | Void Volume Fraction | Gurley (sec) | Bubble Point (microns) | EFD (Rubow) (microns) | Effective Pore Diameter (Benaire) (microns) | Solidarity |
|---|---|---|---|---|---|---|---|---|---|---|
| 1 | 3M 839-3B | 14.78 | 0.033 | 0.940 | 0.828 | 20.0 | 0.62 | 0.050 | 0.102 | 64.12 |
| 2 | 3M 1069-1X1 | 39.12 | 0.143 | 0.940 | 0.721 | 28.0 | 0.14 | 0.120 | 0.164 | 116.06 |
| 3 | 3M KN-9400 | 37.08 | 0.366 | 0.929 | 0.240 | 327.50 | 0.18 | 0.262 | 0.115 | 136.93 |
| 4 | 3M 817-8 | 38.10 | 0.247 | 0.929 | 0.500 | 55.0 | 0.11 | 0.205 | 0.158 | 118.24 |
| 5 | 3M 826-4 | 43.94 | 0.206 | 0.929 | 0.640 | 9.0 | 0.46 | 0.347 | 0.378 | 58.05 |
| 6 | 3M 826-8 | 25.91 | 0.119 | 0.929 | 0.648 | 8.0 | 0.46 | 0.265 | 0.295 | 43.84 |
| 7 | 3M 930-2C | 58.93 | 0.191 | 0.929 | 0.750 | 7.0 | 0.50 | 0.282 | 0.426 | 66.35 |
| 8 | 3M 1030-1B | 103.24 | 0.235 | 0.929 | 0.824 | 4.0 | 0.92 | 0.350 | 0.696 | 65.97 |
| 9 | 3M 1213-2D | 108.97 | 0.209 | 0.939 | 0.854 | 1.9 | 1.50 | 0.455 | 1.034 | 44.71 |
| 10 | 3M 1216-9 | 76.96 | 0.617 | 1.154 | 0.502 | 101.0 | 0.37 | 0.214 | 0.166 | 227.40 |
| 11 | 3M BMF-2.7 | 220.32 | 1.007 | 0.875 | 0.626 | 1.2 | 5.75 | 2.831 | 2.970 | 37.05 |
| 12 | Celgard 2400 | 29.97 | 0.216 | 0.907 | 0.430 | 542.5 | 0.05 | 0.065 | 0.043 | 335.74 |
| 13 | Tyvek 10-1056D | 156.97 | 0.775 | 0.960 | 0.632 | 18.1 | 7.00 | 0.500 | 0.532 | 147.17 |
| 14 | Tyvek 10-1073D | 167.89 | 0.990 | 0.960 | 0.560 | 8.5 | 8.30 | 1.108 | 0.986 | 84.79 |
| 15 | Tyvek 10-1079 | 195.07 | 1.240 | 0.960 | 0.526 | 151.0 | 3.02 | 0.264 | 0.216 | 446.51 |
| 16 | Tyvek 10-1085D | 275.08 | 1.537 | 0.960 | 0.583 | 55.5 | 4.43 | 0.450 | 0.423 | 324.62 |
| 17 | Costar MF 0.1 μm | 88.90 | 0.634 | 1.613 | 0.683 | 51.5 | 0.29 | 0.159 | 0.195 | 225.42 |
| 18 | Costar MF 0.2 μm | 135.89 | 0.679 | 1.613 | 0.778 | 11.7 | 0.55 | 0.293 | 0.486 | 131.13 |
| 19 | Gelman 6N-6 0.45 μm | 135.99 | 0.597 | 1.525 | 0.794 | 4.20 | 0.83 | 0.474 | 0.834 | 75.33 |
| 20 | Gelman TF 200 0.2 μm | 127.00 | 0.801 | 1.318 | 0.657 | 8.8 | 0.45 | 0.595 | 0.679 | 93.07 |
| 21 | Gelman TF 450 .45 μm | 134.87 | 0.787 | 1.231 | 0.661 | 3.9 | 0.76 | 0.961 | 1.106 | 60.66 |
| 22 | Gelman TF 1000 1 μm | 92.96 | 0.547 | 1.041 | 0.596 | 1.8 | 4.93 | 1.625 | 1.576 | 29.47 |
| 23 | Gelman Supor 100 0.1 μm | 145.03 | 0.731 | 1.370 | 0.736 | 37.8 | 0.23 | 0.195 | 0.281 | 249.62 |
| 24 | Gelman Supor 450 0.45 μm | 119.13 | 0.669 | 1.370 | 0.706 | 9.40 | 0.70 | 0.440 | 0.577 | 101.26 |
| 25 | Gelman Supor 800 0.8 μm | 135.89 | 0.671 | 1.370 | 0.742 | 3.5 | 1.97 | 0.691 | 1.014 | 64.61 |
| 26 | Gelman Versapor 1200 1.2 μm | 182.12 | 1.120 | 1.171 | 0.624 | 1.0 | 3.83 | 2.847 | 2.970 | 30.63 |
| 27 | Gelman Versapor 3000 3 μm | 187.96 | 0.895 | 1.171 | 0.709 | 0.4 | 5.30 | 3.161 | 4.178 | 22.05 |
| 28 | Gelman HT-450 0.45 μm | 145.03 | 0.724 | 1.280 | 0.721 | 8.1 | 0.71 | 0.499 | 0.684 | 103.44 |
| 29 | Gelman Nylaflo 0.45 μm | 106.93 | 0.377 | 1.167 | 0.784 | 16.5 | 0.50 | 0.206 | 0.349 | 143.03 |
| 30 | Gelman GLA-5000 5 μm | 157.99 | 0.207 | 1.447 | 0.935 | 0.7 | 3.63 | 0.448 | 1.753 | 29.19 |

TABLE 2-continued

| Example Number | Sample ID | Thickness (microns) | Mass (g) 133.35 mm circle | Solid Polymer Density (g/cc) | Void Volume Fraction | Gurley (sec) | Bubble Point (microns) | EFD (Rubow) (microns) | Effective Pore Diameter (Benaire) (microns) | Solidarity |
|---|---|---|---|---|---|---|---|---|---|---|
| 31 | Gelman Thick Glass | 1240.03 | 2.924 | 2.429 | 0.930 | 0.5 | 13.79 | 1.666 | 6.252 | 65.87 |
| 32 | Millipore MF .22 µm | 139.95 | 0.820 | 1.546 | 0.729 | 15.8 | 0.50 | 0.323 | 0.454 | 149.69 |
| 33 | Millipore MF 3 µm | 148.08 | 0.568 | 1.546 | 0.822 | 1.1 | 2.19 | 0.873 | 1.722 | 38.38 |
| 34 | Millipore MF 8 µm | 133.10 | 0.500 | 1.546 | 0.826 | 0.5 | 3.24 | 1.232 | 2.467 | 23.95 |
| 35 | Millipore Durapore 0.45 µm | 124.97 | 1.047 | 1.751 | 0.657 | 5.6 | 0.92 | 0.762 | 0.869 | 71.52 |
| 36 | Millipore Durapore 5 µm | 144.05 | 1.020 | 1.751 | 0.710 | 1.0 | 5.31 | 1.664 | 2.210 | 31.93 |
| 37 | Millipore Mitex 5 µm | 189.99 | 2.091 | 2.176 | 0.638 | 2.3 | 13.28 | 1.734 | 1.877 | 50.52 |
| 38 | Millipore Mitex 10 µm | 132.08 | 1.267 | 2.176 | 0.684 | 1.2 | 17.71 | 1.630 | 2.006 | 32.56 |
| 39 | Akzo Poretics 0.1 µm | 93.98 | 0.379 | 0.885 | 0.674 | 22.9 | 0.22 | 0.269 | 0.322 | 144.63 |
| 40 | Akzo Poretics 0.2 µm | 172.97 | 0.549 | 0.885 | 0.744 | 14.6 | 0.61 | 0.353 | 0.521 | 159.81 |
| C1 | Costar PC 0.015 µm | 5.99 | 0.102 | 1.203 | 0.010 | 2960 | ** | | | |
| C2 | Costar PC 0.05 µm | 5.94 | 0.095 | 1.203 | 0.048 | 59 | 0.11 | | | |
| C3 | Costar PC 0.1 µm | 5.89 | 0.092 | 1.203 | 0.070 | 61.0 | 0.11 | | | |
| C4 | Costar PC 0.2 µm | 10.22 | 0.140 | 1.203 | 0.185 | 11.9 | 0.22 | | | |
| C5 | Costar PC 2 µm | 10.82 | 0.169 | 1.203 | 0.069 | 1.4 | 2.09 | | | |
| C6 | Costar PC 3 µm | 9.80 | 0.144 | 1.203 | 0.124 | 0.4 | 3.28 | | | |
| C7 | Costar PC 12 µm | 10.82 | 0.164 | 1.203 | 0.100 | 0.05 | 13.79 | | | |
| C8 | Thin Silicone | 25.4 | | | | | | | | |

**The sample pore size was too small to be resolved on the instrument used due to pressure limitations.
*C1–C8 are all non-fibrous/globular membranes, thus EFD measurements are not applicable.

For C1, the slightly negative result for void volume indicates that the void volume fraction is probably very low. Because there is a combination of tests that contribute to this number it is probable that the volume calculated from the thickness and area was slightly high making the volume calculated mass higher than the measured mass. The term solidarity in the right-hand column of Table 2 is a measure of the number of layers of structure in the membrane. The solidarity is equal to four times the membrane thickness times the solidity fraction divided by π (3.1416) and the effective fiber diameter (EFD). This value is helpful in visualizing the number of encounters a particle or gas molecule will experience in going from one side of the membrane to the other side.

Diffusional Gas Transfer Tests

Two interrelated tests are used to determine the diffusional gas transfer properties of membranes. The first is a single membrane layer test to measure the amount of gas diffusion or permeation across the membrane. The second is a test involving multiple layers of selected membranes conducted to determine the actual diffusional properties of the membranes.

The diffusion rate of $O_2$ in air is about 0.20 $cm^2$ per second. The theoretical maximum diffusion rate of oxygen through a membrane is less than or equal to the diffusion rate of oxygen through air.

Single Membrane Layer Test

Figure 11:
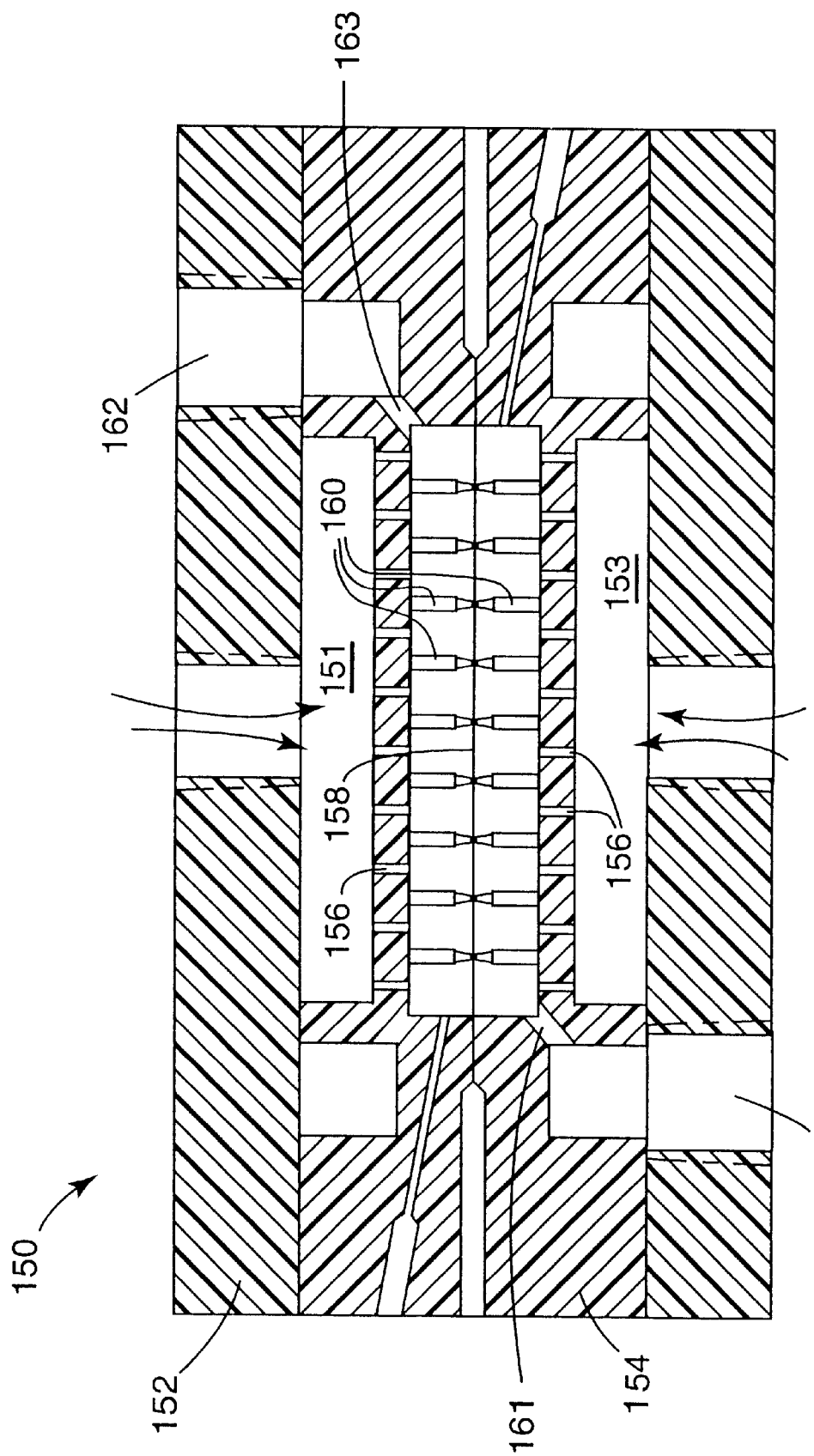
FIG. 11 schematically illustrates a test cell for evaluating the diffusional gas transfer properties of membranes.

FIG. 11 shows a diffusional gas transfer test cell 150 having identical upper and lower portions 152, 154. Controlled 5.00 liters per minute (Lpm) flows are sent to upper plenum 151 and lower plenum 153, respectively, and then through 100 uniformly spaced holes 156 that are 0.10 cm (0.04 inches) in diameter by 0.32 cm (0.125 inches) long. These holes convert the flow of gas to small flow jets that impinge perpendicular to the membrane surface. Jets impinge identically on upper and lower surfaces of the membrane 158. An array of eighty one support posts 160 (9 units×9 units square) are arranged between the jet holes to keep the membrane centered. The support posts also apply light contact to the membrane 158, but do not alter the membrane dimensions.

Flow streams from the jets 156 supply the first diffusing gas mixture to each surface of the membrane 158 and also receive the second diffusing gas that is coming through the membrane. Gases then flow away from the membrane 158 through a total of forty holes 161, 163 of 0.125 in. (0.32 cm) diameter that are uniformly spaced ten per side around the equal length sides of the cell 150 on each side of the membrane 158. The flow on each side of the membrane 158 then proceeds to the side plenums for collection and transfer to the exit ports 162, 164, respectively.

A gas mixture of known percent oxygen or carbon dioxide with the balance nitrogen was supplied to the upper cell portion and 100 percent nitrogen was supplied to the lower cell portion. Flows were measured by special flow meter described in the section labeled Gas Flow Test. Oxygen concentrations were measured using a Series 1100, Model No. 1100A0103110002000000, (603) Servomex Analyzer Control, available from Servomex of Norwood, Mass. When carbon dioxide was used, the concentration was measured using a Model aq-501 air quality monitor available from Metrosonics, Inc. of Rochester, N.Y. A pressure meter having a zero center scale and capable of showing pressure differences as small as 0.01 inches of water (2.49 pascals) was attached to the upper and lower cells to make certain pressure was balanced between upper and lower cells.

The amount diffused, for example of oxygen, is the product of the concentration of oxygen found in the nitrogen (lower) flow stream times the lower cell portion output flow. The exact output flows may be determined by oxygen or nitrogen mass balance calculations using algebra. Because the amounts of oxygen and nitrogen diffused are close to equal, the output flows are very close to the 5.00 Lpm input flows and using 5.00 Lpm for output flows does not appreciably detract from determining the amount of gas diffused. For example, Example 19 of the Gelman GN-6 0.45 µm membrane transferred 6.74% $O_2$ into a 5.0 Lpm flow for a total of 0.337 Lpm of $O_2$ transferred.

Table 3 provides diffusion results for membranes tested in the Single Layer Membrane Test using oxygen and carbon dioxide as test gases. The higher the value, the better the diffusional properties of the membrane.

TABLE 3

| Example Number | Sample ID | Oxygen Transfer Trough Single Membrane Layer (% of $O_2$ found in $N_2$ out) | Carbon Dioxide Transfer Through Single Membrane Layer (ppm of $CO_2$ found in $N_2$ out) |
|---|---|---|---|
| 1 | 3M 839-3B | 7.11 | 1435 |
| 2 | 3M 1069-1X1 | 6.48 | 1335 |
| 3 | 3M KN-9400 | 3.33 | 587 |
| 4 | 3M 817-8 | 6.27 | 1269 |
| 5 | 3M 826-4 | 6.86 | 1420 |
| 6 | 3M 826-8 | 6.96 | 1460 |
| 7 | 3M 930-2C | 6.93 | 1446 |
| 8 | 3M 1030-1B | 6.77 | 1456 |
| 9 | 3M 1213-2D | 6.83 | 1424 |
| 10 | 3M 1216-9 | 5.10 | 992 |
| 11 | 3M BMF-2.7 | 6.05 | 1181 |
| 12 | Celgard 2400 | 4.20 | 1053 |
| 13 | Tyvek 10-1056D | 2.36 | 412 |
| 14 | Tyvek 10-1073D | 2.43 | 475 |
| 15 | Tyvek 10-1079 | 0.91 | 207 |
| 16 | Tyvek 10-1085D | 1.46 | 250 |
| 17 | Costar MF 0.1 $\mu$m | 6.60 | 1340 |
| 18 | Costar MF 0.2 $\mu$m | 6.74 | 1377 |
| 19 | Gelman GN-6 0.45 $\mu$m | 6.74 | 1405 |
| 20 | Gelman TF 200 0.2 $\mu$m | 6.11 | 1265 |
| 21 | Gelman TF 450 0.45 $\mu$m | 6.15 | 1233 |
| 22 | Gelman TF 1000 1 $\mu$m | 6.28 | 1278 |
| 23 | Gelman Supor 100 0.1 $\mu$m | 6.39 | 1330 |
| 24 | Gelman Supor 450 0.45 $\mu$m | 6.72 | 1361 |
| 25 | Gelman Supor 800 0.8 $\mu$m | 6.77 | 1362 |
| 26 | Gelman Versapor 1200 1.2 $\mu$m | 6.27 | 1219 |
| 27 | Gelman Verspor 3000 3 $\mu$m | 6.61 | 1297 |
| 28 | Gelman RT-450 0.45 $\mu$m | 6.57 | 1329 |
| 29 | Gelman Nylaflo 0.45 $\mu$m | 6.40 | 1267 |
| 30 | Gelman GLA-5000 5 $\mu$m | 5.72 | insufficient sample |
| 31 | Gelman Thick Glass | 4.90 | 934 |
| 32 | Millipore MF 0.22 $\mu$m | 6.61 | 1317 |
| 33 | Millipore MF 3 $\mu$m | 6.86 | 1368 |
| 34 | Millipore MF 8 $\mu$m | 6.85 | 1363 |
| 35 | Millipore Durapore 0.45 $\mu$m | 6.53 | 1295 |
| 36 | Millipore Durapore 5 $\mu$m | 5.69 | 1121 |
| 37 | Millipore Mitex 5 $\mu$m | 3.75 | 724 |
| 38 | Millipore Mitex 10 $\mu$m | 5.57 | 1060 |
| 39 | Akzo Poretics 0.1 $\mu$m | 6.56 | 1321 |
| 40 | Akzo Poretics 0.2 $\mu$m | 6.44 | 1281 |
| C1 | Costar PC 0.015 $\mu$m | 1.77 | 285 |
| C2 | Costar PC 0.05 $\mu$m | 6.63 | 1288 |
| C3 | Costar PC 0.1 $\mu$m | 6.77 | 1447 |
| C4 | Costar PC 0.2 $\mu$m | 6.91 | 1446 |
| C5 | Costar PC 2 $\mu$m | 6.71 | 1383 |
| C6 | Costar PC 3 $\mu$m | 6.95 | 1442 |
| C7 | Costar PC 12 $\mu$m | 6.91 | 1419 |
| C8 | Thin Silicone | 0.01 | 0 |

Multiple Layer Membrane Test

The multiple layer membrane test utilizes the equipment and procedure of the Single Layer Membrane Test discussed above. The multiple layer test allows the determination of effective diffusion coefficients of gases inside membrane structures.

To determine the diffusional transfer properties of membranes it is necessary to separate what is happening inside the membrane from boundary layer effects on and near both membrane faces. The membrane contributions can be found by a series of experiments in which increasing layers of membranes are stacked on top of each other in intimate contact. The support posts 160 shown in FIG. 11 serve to keep individual membranes 158 in the stack of membranes in intimate contact. To perform a stack test, first one membrane is tested, then two, then four, and finally eight membranes are tested. For each of these four tests, the "L" term in the following equation based on Fick's Law is determined.

$$\text{Amount Diffused} = \frac{(D)(A)(C)}{L}$$

Diffused is in (cm$^3$/sec)
D is the Diffusion Coefficient (cm$^2$/sec)
A is the test area (39.44 cm$^2$)
C is the average concentration gradient (decimal)
L is the diffusion path length (cm)

The diffusion coefficient D is taken from Perry's Chemical Engineers' Handbook, Fourth Edition (McGraw-Hill). The test area A was determined by subtracting the total area of the 81 support posts 160 described above from the total area of the membrane 158 exposed. The average concentration gradient was calculated from input and output oxygen concentrations. For example, if cylinder air containing oxygen at 20.90 percent and nitrogen at 79.10 percent is introduced on the upper surface of the membrane stack and an equal flow of nitrogen at 0.00 percent oxygen on the lower surface of the membrane stack, and if the output from the upper surface contains 14.59% $O_2$ and the lower surface 6.27% $O_2$, the average upper surface concentration is (20.90+14.59) divided by two or 17.745. The average lower surface concentration is (6.27−0.0) divided by two or 3.135. The average concentration gradient of $O_2$ across the membrane is then (17.745−3.135) or 14.61%. In the diffusion equation this is expressed as a decimal 0.1461. The term on the left, the amount diffused, is determined as in the Single Layer Membrane Test. With the information discussed above, the L term can be computed.

The L term has three components. If the flows that are carrying the gases to the regions above and below the membranes are equal, the boundary layers of gas above and below the membrane are equal and each contributes an equal component of L. To these two parts of L is added the membrane stack contribution for a given test. As the number of layers is increased, the boundary layer contributions to L stay constant and the increase in L is due to the added membranes only. Thus it is possible to separate what happens inside the membranes from any boundary effects.

Table 4 provides results for the Multiple Layer Membrane Test. By subtracting the membrane effective diffusional thickness from the single layer total effective transfer thickness, the equivalent still air boundary layer thickness is obtained. When the results of this calculation are averaged for the membranes of Table 4, the result is 0.176 cm. This value is the total equivalent still air film boundary layer thickness for the upper and lower boundary layers at the conditions used. In performing these tests, it is permissible to use slightly different total equivalent still air film boundary layer thicknesses between 0.17 and 0.18 cm, however, this value must be held constant from one comparative test to another.

TABLE 4

| Membrane I.D. | Layer Count | $O_2$ Conc. at Output (Upper Cell) (dec.) | $O_2$ Conc. at Output (Lower Cell) (dec.) | Conc. Gradient (dec.) | $O_2$ Transfer (Lpm) | Total Effective Transfer Thickness (cm) | Membrane Effective Diffusional Thickness Based on the 5, 6, 7 & 8th membranes (microns) | Thickness of a Single Membrane Layer from Table 2 (microns) | The Ratio of the membrane Effective Diffusional Thickness to the Actual Thickness (dimensionless) |
|---|---|---|---|---|---|---|---|---|---|
| 3M 817-8 (Example 4) | 1 | 0.1458 | 0.0634 | 0.1457 | 0.317 | 0.2175 | | | |
| | 2 | 0.1542 | 0.0552 | 0.154 | 0.276 | 0.2641 | | | |
| | 4 | 0.1649 | 0.0441 | 0.1649 | 0.2205 | 0.3539 | | | |
| | 8 | 0.1769 | 0.0323 | 0.1768 | 0.1615 | 0.5181 | 410.4 | 38.1 | 10.8 |
| 3M 826-4 (Example 5) | 1 | 0.1396 | 0.0698 | 0.1394 | 0.349 | 0.189 | | | |
| | 2 | 0.1439 | 0.0655 | 0.1437 | 0.3275 | 0.2077 | | | |
| | 4 | 0.1506 | 0.0588 | 0.1504 | 0.294 | 0.2421 | | | |
| | 8 | 0.1598 | 0.0492 | 0.1598 | 0.246 | 0.3074 | 163.3 | 43.9 | 3.2 |
| 3M 1213-2D (Example 9) | 1 | 0.1407 | 0.0683 | 0.1407 | 0.3415 | 0.195 | | | |
| | 2 | 0.1465 | 0.0627 | 0.1464 | 0.3135 | 0.221 | | | |
| | 4 | 0.1523 | 0.0566 | 0.1524 | 0.283 | 0.2548 | | | |
| | 8 | 0.16 | 0.049 | 0.16 | 0.245 | 0.3091 | 135.7 | 109.0 | 1.2 |
| 3M 839-3B (Example 1) | 1 | 0.138 | 0.0711 | 0.138 | 0.3555 | 0.1837 | | | |
| | 2 | 0.1453 | 0.0638 | 0.1453 | 0.319 | 0.2155 | | | |
| | 4 | 0.1532 | 0.0557 | 0.1533 | 0.2785 | 0.2604 | | | |
| | 8 | 0.1605 | 0.0485 | 0.1605 | 0.2425 | 0.3132 | 132.0 | 14.8 | 8.9 |
| Celgard 2400 (Example 12) | 1 | 0.1506 | 0.0523 | 0.1537 | 0.2615 | 0.2781 | | | |
| | 2 | 0.1688 | 0.0403 | 0.1688 | 0.2015 | 0.3964 | | | |
| | 4 | 0.1815 | 0.0277 | 0.1814 | 0.1385 | 0.6199 | | | |
| | 8 | 0.1919 | 0.0172 | 0.1919 | 0.086 | 1.0558 | 1089.8 | 30.0 | 36.4 |
| Tyvek 10-1073D (Example 14) | 1 | 0.1824 | 0.0263 | 0.1826 | 0.1315 | 0.657 | | | |
| | 2 | 0.1953 | 0.0136 | 0.1964 | 0.068 | 1.3596 | | | |
| | 4 | 0.202 | 0.0069 | 0.2021 | 0.0345 | 2.7718 | | | |
| | 8 | 0.2051 | 0.0039 | 0.2054 | 0.195 | 4.9779 | 5515.4 | 167.9 | 32.0 |
| Gelman Versapor 3000 3.0 (Example 27) | 1 | 0.1428 | 0.0663 | 0.1428 | 0.3315 | 0.2038 | | | |
| | 2 | 0.1504 | 0.0585 | 0.1505 | 0.2925 | 0.2434 | | | |
| | 4 | 0.1604 | 0.0487 | 0.1604 | 0.2435 | 0.3117 | | | |
| | 8 | 0.1722 | 0.0366 | 0.1723 | 0.183 | 0.4456 | 334.9 | 188.0 | 1.8 |
| Millipore Durapore 0.45 (Example 35) | 1 | 0.1438 | 0.0653 | 0.1438 | 0.3265 | 0.2084 | | | |
| | 2 | 0.151 | 0.0581 | 0.151 | 0.2905 | 0.2459 | | | |
| | 4 | 0.1611 | 0.0479 | 0.1611 | 0.2395 | 0.3184 | | | |
| | 8 | 0.173 | 0.036 | 0.173 | 0.18 | 0.4549 | 341.3 | 125.0 | 2.7 |
| Corning Costar 0.015 (Comparative Example C1) | 1 | 0.1915 | 0.0117 | 0.1914 | 0.0885 | 1.0236 | | | |
| | 2 | 0.199 | 0.0104 | 0.1988 | 0.052 | 1.8094 | | | |
| | 4 | 0.2038 | 0.0055 | 0.2037 | 0.0275 | 3.5049 | | | |
| | 8 | 0.2064 | 0.003 | 0.2062 | 0.015 | 6.506 | 7502.9 | 6.0 | 1250.5 |
| Corning Costar 0.05 (Comparative Example C2) | 1 | 0.143 | 0.0663 | 0.1429 | 0.3315 | 0.2039 | | | |
| | 2 | 0.1502 | 0.0591 | 0.1501 | 0.2955 | 0.2403 | | | |
| | 4 | 0.161 | 0.0481 | 0.161 | 0.2405 | 0.3167 | | | |
| | 8 | 0.1722 | 0.0371 | 0.1721 | 0.1855 | 0.439 | 305.6 | 6.0 | 51.0 |
| Corning Costar 0.10 (Compara- | 1 | 0.1395 | 0.0694 | 0.1396 | 0.347 | 0.1903 | | | |
| | 2 | 0.1458 | 0.063 | 0.1459 | 0.315 | 0.2192 | | | |
| | 4 | 0.153 | 0.0557 | 0.1532 | 0.2785 | 0.2603 | | | |

TABLE 4-continued

| Membrane I.D. | Layer Count | O$_2$ Conc. at Output (Upper Cell) (dec.) | O$_2$ Conc. at Output (Lower Cell) (dec.) | Conc. Gradient (dec.) | O$_2$ Transfer (Lpm) | Total Effective Transfer Thickness (cm) | Membrane Effective Diffusional Thickness Based on the 5, 6, 7 & 8th membranes (microns) | Thickness of a Single Membrane Layer from Table 2 (microns) | The Ratio of the membrane Effective Diffusional Thickness to the Actual Thickness (dimensionless) |
|---|---|---|---|---|---|---|---|---|---|
| tive Example C3) | 8 | 0.1635 | 0.0453 | 0.1636 | 0.2265 | 0.3418 | 204.0 | 5.9 | 34.6 |

Selected membranes taken from the group of Examples 1–40 exhibit superior diffusional transfer properties compared to the membranes from comparative Examples C1 through C8. For a given thickness, a lower value of membrane effective diffusional thickness indicates superior gas transfer properties. The ratio of diffusion coefficients is numerically equivalent to the ratio of the membrane effective diffusional thickness to the actual thickness. The ratio of a diffusion coefficient of a selected gas such as oxygen at a selected temperature and pressure in still air to an effective diffusion coefficient of the same gas inside the membrane under the same temperature and pressure is from 1.03 to 500.

Gas Flow Test

Accurate measurement of the volume flow of gas is critical to the diffusion flow measurements used to characterize the diffusion properties of membranes. The following method will reproduce flows to better than 0.5 percent. The absolute accuracy depends on the method used to calibrate the measurements. By using volumetric gas meters, absolute errors are limited to less than about one percent. The method depends on the Hagen-Poiseuille law:

$$Q = \frac{(\pi)(d^4)(\gamma)(h_L)}{(128)(\mu)(l)}$$

Q is the volume rate of flow (cm$^3$/min)
d is the diameter (cm)
$\gamma$ is the specific weight (g/cm$^3$)
h$_L$ is head loss in tube (cm of fluid flowing)
$\mu$ is the gas viscosity (g sec/cm$^2$)
l is length of tube (cm)

For convenience of the method, more than 350 capillary 24 gauge tubes having an inside diameter of 0.012 inches (0.0305 cm) and a length of 2.605 inches (6.617 cm) were assembled in parallel in a larger aluminum tube. The spaces between the tubes were sealed with epoxy so that only the inner bore could conduct flow. These systems were then calibrated by sealing off some of the tubes resulting in a device that produced a pressure drop of 249 Pa (1.0 inches of water) for each liter per minute of air flow. The initial calibration was done with air and subsequent calibrations were done with oxygen, nitrogen, and any other gases used. This calibration is necessary because the method depends on the properties of the specific gases used. The assembly of smaller tubes sealed into a larger tube is called an HP tube.

The diffusional gas transfer test cell has upper and lower portions each capable of receiving and discharging flows. For future reference, at a nominal flow rate of 5 Lpm through either the upper or a lower portion, the pressure drop of the cell is 8.0 Pa (0.032 inches of water).

To calibrate the HP tubes, each was supplied with the gas being tested (air, O$_2$, N$_2$) and the output of the tube was connected to a Singer Model DTM 115 volumetric flow meter available from American Meter Co., Horsham, Pa. It was found that the pressure needed to operate the Singer flow meter was between 4.98 to 37.4 Pa (0.02 and 0.15 inches of water) and averaged over time about 19.93 Pa (0.08 inches of water). By connecting the HP tube to the Singer Flow meter for calibration, and by replacing the flow meter with the diffusional coefficient test cell, we are certain that the flows at a given calibration point are equal within the accuracy limits required by the study. Flows reported in the present invention are volumetric flows.

Determination of Particle Blocking and Loading Characteristics of Membranes

It has been discovered that membranes vary widely in their performance with respect to the needs of the present invention. One of the more important requirements is the membrane's ability to substantially block the passage of particles through its microporous structure. The present invention requires substantially complete blockage of particles along with a second major requirement of a high gas transfer rates by diffusion under real world conditions when potentially fouling particles are present. A third requirement is mechanical integrity. Regarding interrelationships of these requirements, microporous membranes are useful in the present invention when combinations of the following conditions are met:

1. The selected membranes completely block the passage of particles when there is substantially zero difference in total pressure (the sum of static and velocity pressure) across the membrane. These membranes have the minimum useful particle blocking abilities.

2. The selected membranes completely block the passage of particles when the total pressure across the membrane is below the maximum pressure encountered across the membrane during any phase of the life cycle in a defined operating system.

3. The selected membranes permit diffusional transfer of gas and vapor molecules through a microporous structure.

4. The selected membranes completely block the passage of particles when the total pressure across the membrane is below a maximum defined pressure that is capable of destroying the integrity of the membrane by tearing or rupturing the selected membrane.

5. The selected membranes maintain high levels of diffusional gas transfer when significantly loaded with particles in the particular conditions of use.

Minimum Useful Particle Blocking Characteristics

The combination of conditions (1), (3), and (5) is useful to systems where the membranes are used to completely block the passage of particles while allowing the transfer of gases as follows. Consider an enclosed space separated from an external particulate contaminated environment. Further consider conditions whereby there is an equalization of pressure between the enclosed space and the external particulate contaminated environment. Support of life processes or gas consuming or generating processes within the enclosed space with substantially complete blockage of particles can be accomplished using membranes of the invention disposed between the enclosed space and the external environment under conditions of free or natural convection processes that impose no substantial pressures across the membrane. Membranes having minimum particle blocking characteristics are useful in the above system.

Low Pressure Particle Blocking Characteristics

The combination of conditions (2), (3), and (5) is useful to systems where the membranes are used to completely block particle passage while allowing the transfer of gases as follows. Consider an enclosed space having a) a membrane module system, b) a fan and duct system to circulate air through the membrane module system, and c) a second fan and duct system to circulate air from the external particulate contaminated environment to and through the membrane module and back to the external environment. Successful performance is achieved when the pressure differences between the contaminated and uncontaminated portions of the membrane module are within the specified range of complete particle blocking capability of the membrane.

High Pressure Particle Blocking Characteristics

The combination of conditions (3), (4), and (5) is useful to systems where the membranes are used to completely block particle passage while allowing the transfer of gases as follows. Consider an enclosed space having a) a high pressure capable membrane module system, b) a high pressure fan and duct system to circulate air through the membrane module system, and c) a second high pressure fan and duct system to circulate air from the external particulate contaminated environment to and through the membrane module and back to the external environment. High pressures across the membrane module are useful to develop turbulent flow conditions inside the membrane module and are also useful for membrane modules having restrictive narrow flow paths to maximize the diffusional gas transfer rates.

High pressures across a membrane introduce convection as a second important gas transfer mechanism. Depending on the arrangement of the connections between the membrane module system and the first and second high pressure fan and duct systems, there can be a slight benefit to the total gas transfer of a given gas such as $CO_2$.

A pressure gradient across the membrane may be introduced by any suitable means. Such means include restricting the outlet flow (e.g., outlet 44 in FIG. 1, outlet port 208 in FIG. 6). A damper in the flow downstream from a fan is a preferred means of restricting the outlet flow. The first gas domain can be maintained at a pressure higher than the second gas domain. The second gas domain can in turn be maintained at a pressure higher than the exterior of the system, which means the first gas domain is at a pressure higher than both the exterior of the system and the second gas domain. The pressure gradient across the membrane between the first gas domain and the second gas domain preferably ranges from about 1 to 50,000 Pascals (0.004 to 200 inches of water). The pressure gradient across the membrane more preferably ranges from about 10 to 5,000 Pascals (0.04 to 20 inches of water). The pressure gradient across the membrane most preferably ranges from about 20 to 50 Pascals (0.08 to 0.20 inches of water).

A filtering means may be provided to control the composition of gases entering an enclosed space. One example includes removing at least some organic vapors. Placing such a filtering means in the outlet of the second gas domain (e.g., outlet 46 in FIG. 1) increases the life of such a filtering means by filtering only air from which particulate has been removed. This placement provides another advantage of refiltering the air within the enclosed space which can remove particulate generated within the enclosed space.

Several advantages are provided with the present invention, beyond those mentioned above. Only a portion of the total air input from the first gas domain is filtered, increasing the useful life of the system between required filter or membrane exchanges. An enclosed space may be pressurized to control air flows such that any flow provided to the enclosed space must come through the gas transfer system, and may also allow air to exit the enclosed space beyond the gas transfer system. Thus, the gas transfer system can isolate an enclosed space, such as a building, from infiltration due to external air currents while accommodating air leakage, such as around the doors and windows, with the air loss being replaced through the gas transfer system.

EXAMPLES

Experimental Procedures

Two different experimental systems were used to determine the particle blocking characteristics of membranes. The first system was used to perform the following:

1. Zero Differential Pressure Condition

Figure 14:
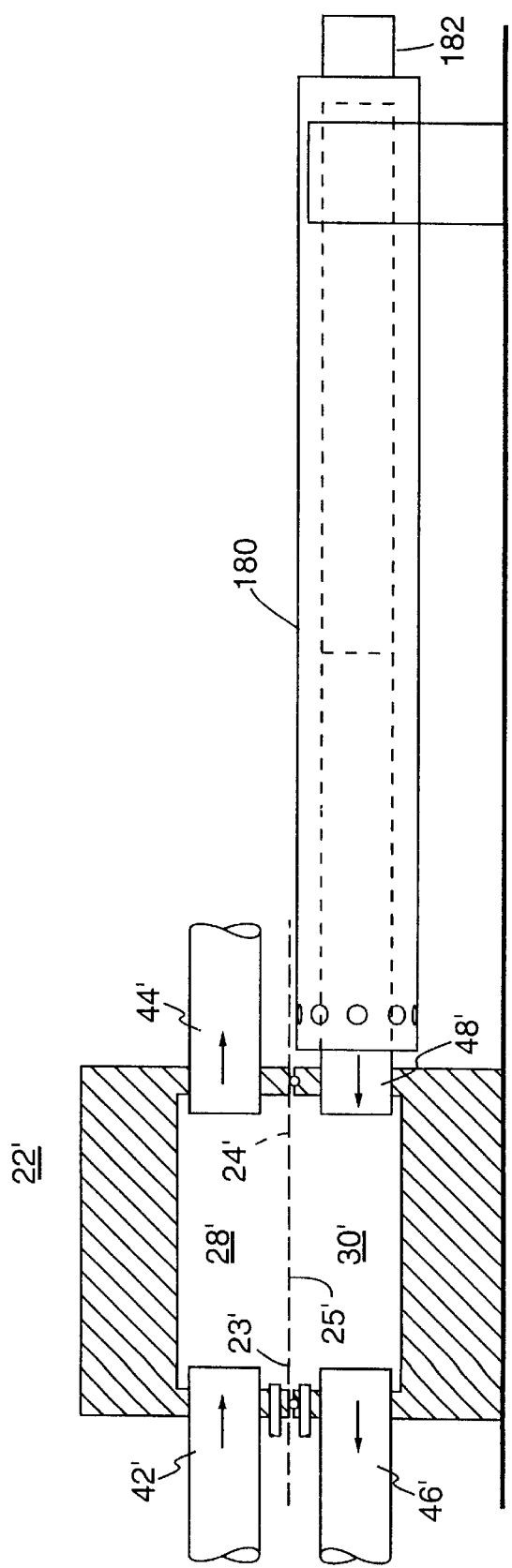
FIG. 14 is a sectional view of a test apparatus for determining particle penetration at low pressures for various microporous membranes.

FIG. 14 shows an experimental system generally according to FIG. 1 to place a subject membrane 24' between two opposing chambers 28', 30' to provide a zero or very near zero pressure differential across the membrane. Corresponding components are identified with similar reference numeral. The lower chamber is kept particle free by flowing ultra-clean air through it at about 0.7 Lpm. A purified air supply is generated by passing compressed air through a multistage filter, through a flow meter, and through a shrouded inlet pipe system 182 as shown. The shrouded flow over inlet pipe 182 of 4–5 Lpm avoids imposing a pressure on the lower chamber 30' and minimized the chance of ambient particles entering the inlet pipe 182 by bathing it in ultra-clean air. There is a clearance between the inlet pipe 182 and the shroud 180 results in an annular flow space around the inlet pipe 182. The flow through the lower cell 30' is governed at 0.7 Lpm by the sampling pump in the Portacount Plus particle measuring instrument available from TSI, Inc., of St. Paul, Minn.

Particles are supplied to the upper chamber 28' by passing a 4–5 Lpm flow of air through a smoke generator. The smoke was generated from one smoldering end of a piece of cotton rope, product No. 10196 Southgate (™) sash cord available from Wellington Leisure Products Inc. of Madison, Ga. The polymeric core of the rope was removed leaving only the outer cotton braid, which was placed on an insulating and fire proof ceramic surface at the bottom of an inverted 5 gallon pail. The majority of the smoke contaminated air was bypassed to a fume hood. A smaller stream of about 0.7 Lpm of the smoke contaminated air was passed through a first valve, to a diaphragm pump, and through a second valve.

The first valve controlled pump inlet flow and the second valve controlled pump outlet flow. The flow was next passed through a 3 liter surge tank, a flow meter and into the upper chamber 28' of the test system. It was determined that a zero pressure condition could be achieved by limiting the restrictions on the flow exiting the upper chamber 28' and by balancing of the flows to 0.7 Lpm to create insofar as was possible, identical fluid mechanical conditions in the upper and lower chambers 28', 30' of the test cell.

The smoke particle diameter distribution was measured using a TSI Scanning Mobility Particle measuring system available from Thermo Systems Inc. St. Paul, Minn. The particle size distribution was found to be symmetrical about a mean particle diameter of 0.12 µm and extending to no larger than 0.60 µm and no smaller than 0.03 µm in diameter.

To conduct a test of a selected membrane, the membrane was placed between the upper and lower chambers and the flows were balanced. The flow stream from the lower particle free chamber may at first contain particles because of being open to the ambient particles (usually about 2000–5000 particles per cm$^3$) during installation of the membrane. If the flow stream gradually became clean during a time period when there is a zero pressure differential across the membrane, it was concluded that the membrane was an effective zero pressure barrier. If the lower cell flow stream did not come to zero or if it increased in particle concentration, it was concluded that the membrane was ineffective as a particle barrier under the zero pressure condition. In the above experiment the object is to determine whether or not particles may be transferred across the membrane by diffusion processes alone.

2. Low Differential Pressure Condition

The experimental system of FIG. 1 used for the Zero Pressure Condition was modified to allow subjecting membranes to low positive pressures of particulate contaminated air. The lower chamber and system was as used for the Zero Pressure Condition. To the upper chamber and system were added course and fine adjustment outlet valves to restrict the flow exiting the upper chamber. This configuration in turn allowed the pressure in the upper chamber to be raised and controlled over a range of low pressures as set forth in FIG. 13.

Figure 13:
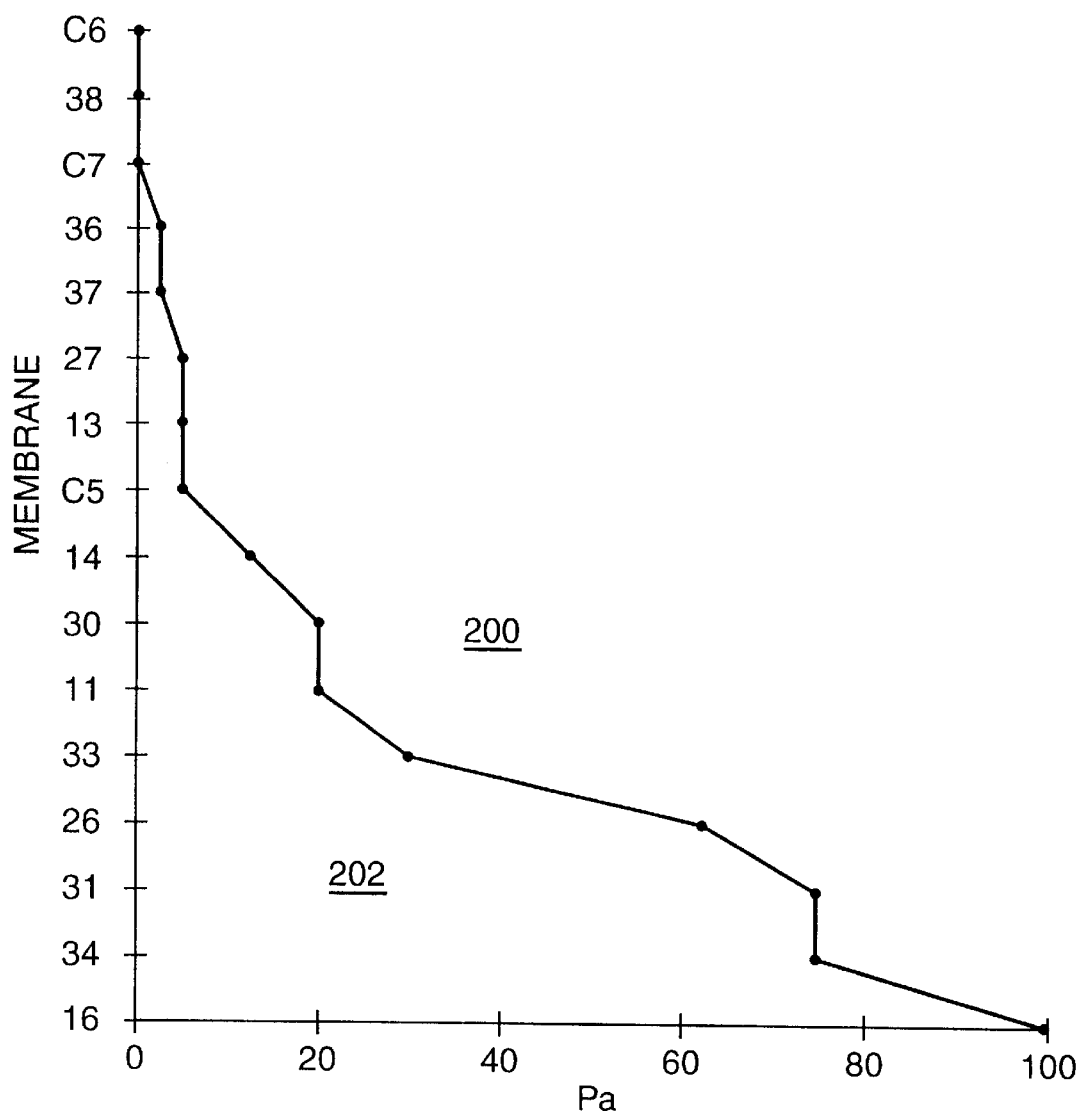
FIG. 13 graphically illustrates pressures at which particle penetration begins to occur for various microporous membranes.

FIG. 13 graphically illustrates the particle barrier performance of various membranes as a function of low pressure differentials across the membrane. Membranes are listed along the left axis of the Figure. As you move up along the y-axis, the membranes tend to have larger pores, larger fibers, lower surface areas and a lower mass. Region 200 represents particle penetration and region 202 represents no particle penetration. As is clear from FIG. 13, membranes C6, 38, and C7 do not block particles, even at essentially zero pressure differential. Membranes at the lower portions of FIG. 13 generally block particles at higher measured pressure differentials. On the other hand, some of the particle-blocking membranes listed on the y-axis may not offer an optimum diffusion rate. Consequently, for all applications, it is important to examine both diffusion rate and particle barrier properties. FIG. 13 notes the pressure at which the first particles are coming through. If particles are coming through at zero pressure such as in the first three instances, the particle transfer is by diffusion alone. By subjecting membranes to this test, it is possible to screen and eliminate membranes from further consideration in the practice of the present invention because the test membranes transfer particles by diffusion alone.

3. High Differential Pressure Condition

In order to determine the particle blocking characteristics of membranes under higher pressure conditions up to pressures which may cause the membrane to burst when it is unsupported across a reasonable and useful span such as may occur in a membrane module, the following tests were devised and conducted. The output of a reciprocating air compressor was connected to a 48 cm long by 31 cm diameter air tank having a capacity of about 55 liters. Pressurized air was conducted from the tank outlet through a pressure regulator to a test cell containing the membrane supported on a frit. The frit had a face diameter of 2.85 cm and approximately 50 micron pores so as to allow free passage of the air while giving complete support beneath the membrane. The frit surface was smooth and flush with an aluminum surface used in conjunction with an "O" ring seal just beyond the frit perimeter. The flow coming from the membrane filter was sampled with the Porta-count instrument to determine membrane particle breakthrough. The test was conducted by first filling the tank with compressed air taken from the room and then discharging the flow through the membrane by gradually raising the pressure using the pressure regulator. The pressure and flow at which the first particles were observed was noted.

If no particles were observed up to the maximum pressure of 50 psi (344.7 kPa), the membrane was tested under a more severe test using the source of cotton rope smoke described above in the Low Differential Pressure Test. The smoke was compressed into the tank and the test was repeated as above. If no particles were detected in the flow exiting the membrane, the maximum pressure was recorded. If particles were detected, the pressure at which this occurred was noted.

Table 5 gives the performance of membranes subjected to high differential pressure using both room and higher concentration smoke particles as challenges. Membranes of Examples C4, 18, and 25 developed particle breakthrough in the first test even with relatively low concentrations of room particles making it irrelevant to test these under more severe conditions. The membrane of Example 1 passed the room particle test but showed a penetration at a smoke particle concentration of 570,000 particles per cm$^3$. The membranes of Examples 15 and C1 could not be tested because they both have a high pressure drop so that it was not possible to develop sufficient flow to supply the Portacount instrument properly. As is clear from Table 5, the remaining membranes exhibit substantially complete particle blocking even at pressures in the range of 45–50 psi (310–345 kPa).

TABLE 5

| Example Number | Membrane Sample I.D. | Breakthrough with room Particles | Maximum Pressure Used (psi) | Maximum Pressure (kPA) | Particle Count Upstream (#/cc) | Breakthrough with smoke particles | Maximum Pressure Used (psi) | Maximum Pressure (kPa) | Particle Count Upstream (#/cc) |
|---|---|---|---|---|---|---|---|---|---|
| 1 | 3M 839-3B | no | 50 | 344.8 | 50,000 | no* | 50 | 344.8 | 570,000 |
| 2 | 3M 1069-1X1 | no | 50 | 344.8 | 36,000 | no | 50 | 344.8 | 900,000 |
| 3 | 3M KN-9400 | no | 50 | 344.8 | 45,000 | no | 50 | 344.8 | 240,000 |
| 4 | 3M 817-8 | no | 50 | 344.8 | 48,000 | no | 50 | 344.8 | 280,000 |
| 5 | 3M 826-4 | no | 50 | 344.8 | 30,000 | no | 50 | 344.8 | 900,000 |
| 6 | 3M 826-8 | no | 50 | 344.8 | 30,000 | no | 50 | 344.8 | 250,000 |
| 7 | 3M 930-2C | no | 50 | 344.8 | 48,000 | no | 50 | 344.8 | 180,000 |
| 8 | 3M 1030-1B | no | 48 | 331.0 | 18,000 | no | 50 | 344.8 | 480,000 |
| 9 | 3M 1213-2D | no | 45 | 310.3 | 10,000 | no | 50 | 344.8 | 115,000 |

TABLE 5-continued

| Example Number | Membrane Sample I.D. | Break-through with room Particles | Maximum Pressure Used (psi) | Maximum Pressure (kPA) | Particle Count Upstream (#/cc) | Break-through with smoke particles | Maximum Pressure Used (psi) | Maximum Pressure (kPA) | Particle Count Upstream (#/cc) |
|---|---|---|---|---|---|---|---|---|---|
| 10 | 3M 1216-9 | no | 50 | 344.8 | 50,000 | no | 50 | 344.8 | 140,000 |
| 12 | CELGARD 2400 | no | 50 | 344.8 | 50,000 | no | 50 | 344.8 | 900,000 |
| 15 | TYVEK 10-1079 | ins. flow | | | | | | | |
| 17 | COSTAR MF 0.1 μm | no | 50 | 344.8 | 45,000 | no | 50 | 344.8 | 900,000 |
| 19 | GELMAN GN-6 0.45 μm | no | 45 | 310.3 | 65,000 | no | 50 | 344.8 | 900,000 |
| 20 | GELMAN TF 200 0.2 μm | no | 50 | 344.8 | 17,000 | no | 50 | 344.8 | 900,000 |
| 21 | GELMAN TF 450 0.45 μm | no | 50 | 344.8 | 80,000 | no | 50 | 344.8 | 140,000 |
| 22 | GELMAN TF-1000 1.0 μm | no | 48 | 331.0 | 40,000 | no | 48 | 331.0 | 340,000 |
| 23 | GELMAN SUPOR 1000.1 μm | no | 50 | 344.8 | 30,000 | no | 50 | 344.8 | 435,000 |
| 24 | GELMAN SUPOR 4500.45 μm | no | 50 | 344.8 | 50,000 | no | 50 | 344.8 | 100,000 |
| 25 | GELMAN SUPOR 800 0.8 μm | yes | 10 | 69.0 | 15,000 | | | | |
| 28 | GELMAN HT-450 0.45 μm | no | 50 | 344.8 | 15,000 | no | 50 | 344.8 | 250,000 |
| 29 | GELMAN NYLAFLOW 0.45 μm | no | 50 | 344.8 | 60,000 | no | 50 | 344.8 | 200,000 |
| 35 | MILLIPORE DURAPORE 0.45 μm | no | 50 | 344.8 | 45,000 | no | 50 | 344.8 | 390,000 |
| 39 | AKZO PORETICS 0.1 μm | no | 50 | 344.8 | 30,000 | no | 50 | 344.8 | 670,000 |
| 40 | AKZO PORETICS 0.2 μm | no | 50 | 344.8 | 40,000 | no | 50 | 344.8 | 250,000 |
| C1 | COSTAR PC 0.015 μm | ins. flow | | | | | | | |
| C2 | COSTAR PC 0.05 μm | no | 50 | 344.8 | 24,000 | no | 50 | 344.8 | 100,000 |
| C3 | COSTAR PC 0.10 μm | no | 50 | 344.8 | 55,000 | no | 50 | 344.8 | 640,000 |
| C4 | COSTAR PC 0.20 μm | yes | 5 | 34.5 | 45,000 | | | | |
| 18 | COSTAR MF 0.2 μm | yes | 10 | 69.0 | 20,000 | | | | |

*Some particle break-through was noted, but later determined to be due to ruptures in the membrane caused during handling.

TABLE 6

| Example Number | Membrane Sample I.D. | Burst Pressure (kPa) |
|---|---|---|
| 1 | 3M 839-3B | 55.20 |
| 2 | 3M 1069-1X1 | 151.7 |
| 3 | 3M KN-9400 | 186.2 |
| 4 | 3M 817-8 | 358.6 |
| 5 | 3M 826-4 | 234.5 |
| 6 | 3M 826-8 | 144.8 |
| 7 | 3M 930-2C | 89.6 |
| 8 | 3M 1030-1B | 124.1 |
| 9 | 3M 1213-2D | 55.2 |
| 10 | 3M 1216-9 | 620.6 |
| 12 | CELGARD 2400 | 379.2 |
| 15 | TYVEK 10-1079 | NO BREAK |
| 17 | COSTAR MF 0.1 μm | 110.3 |
| 18 | COSTAR MF 0.2 μm | 82.8 |
| 19 | GELMAN GN-6 0.45 μm | 220.7 |
| 20 | GELMAN TF 200 0.2 μm | 213.8 |
| 21 | GELMAN TF 450 0.45 μm | 206.9 |
| 22 | GELMAN TF 1000 1.0 μm | 193.1 |
| 23 | GELMAN SUPOR 100 0.1 μm | 248.3 |
| 24 | GELMAN SUPOR 450 0.45 μm | 75.9 |
| 25 | GELMAN SUPOR 800 0.8 μm | 241.4 |
| 28 | GELMAN HT-450 0.45 pm | 289.6 |
| 29 | GELMAN NYLAFLOW 0.45 μm | 310.3 |
| 32 | MILLIPORE MF 0.22 μm | 137.9 |
| 35 | MILLIPORE DURAPORE 0.45 μm | 193.1 |
| 39 | AKZO PORETICS 0.1 μm | 103.4 |
| 40 | AKZO PORETICS 0.2 μm | 103.4 |
| C1 | COSTAR PC 0.015 μm | 324.1 |
| C2 | COSTAR PC 0.05 μm | 117.2 |

4. Rupture Test

The frit in the above test is replaced by an open aluminum ring having a 2.85 cm outside diameter, a 2.40 cm inside diameter and a 0.70 cm height. Two circular steel rods each having a diameter of 0.23 cm were inlaid, parallel to each other, into the face edge of the ring at a spacing of 0.90 cm with each rod displaced from the ring diameter by 0.45 cm. The rods, flush with the top of the ring, thereby formed a support for the membrane sample that caused the sample to span 0.9 cm in the narrow dimension and 2.4 cm in the wider dimension. To determine membrane rupture properties, the pressure was raised until the membrane broke and the maximum pressure was recorded as is reported in Table 6. In cases where multiple testing was done at differing sample rotational angles on the same membrane, the smaller value is reported.

5. Particle Loading Test

This test determines the ability of selected membranes to maintain acceptably high levels of diffusional transfer under real world conditions of particulate loading and potential fouling. Under these conditions the amount of convective flow driven by pressure across the membrane is dependent on the air flow permeability and this flow governs the particle loading process. The loading test results of FIGS. 12a and 12b (side by side test) are applicable to membranes falling under this combination of conditions.

A test system was constructed to expose two membrane samples to the same source of air containing particulate in aerosol or solid form. Each membrane was supported on a gas porous frit having a pore size of about 50 microns. The frit was mounted in a frame so that the frit edges were flush with the top surface of the frame. Exposure area for each membrane was 2.5 by 2.5 inches (6.35 by 6.35 cm) for a total of 6.25 square in. (40.32 square cm.). A 0.6 cm thick RTV rubber blanket having two square openings defining the membrane exposure area and having sufficient length and width to cover slightly beyond the perimeter of each frit was placed over the membrane. The blanket was shown to provide an air tight seal by substituting a piece of non porous plastic film for each membrane to observe a non flow condition. The porous frit spanned a plenum and the plenum had an exit port for connection to tubing allowing connection of a pressure gauge to measure the pressure drop across the membrane and frit. The exit tubing was connected to an air pump and the output of the pump was connected to a one gallon surge tank to even out pulsations. The output of the surge tank was connected to a flow meter.

The membranes of Examples 8 and C3 were exposed side by side to room air on a continuous basis except for the time needed to measure changes in the characteristics of the membranes. The particulate levels in the room were measured with a Portacount Plus Model 8020 Quantitative Respirator Fit Tester available from TSI, Inc., St. Paul, Minn. Particle counts were found to range from about 1000 to 8000 particles per cc of air.

Figure 12A:
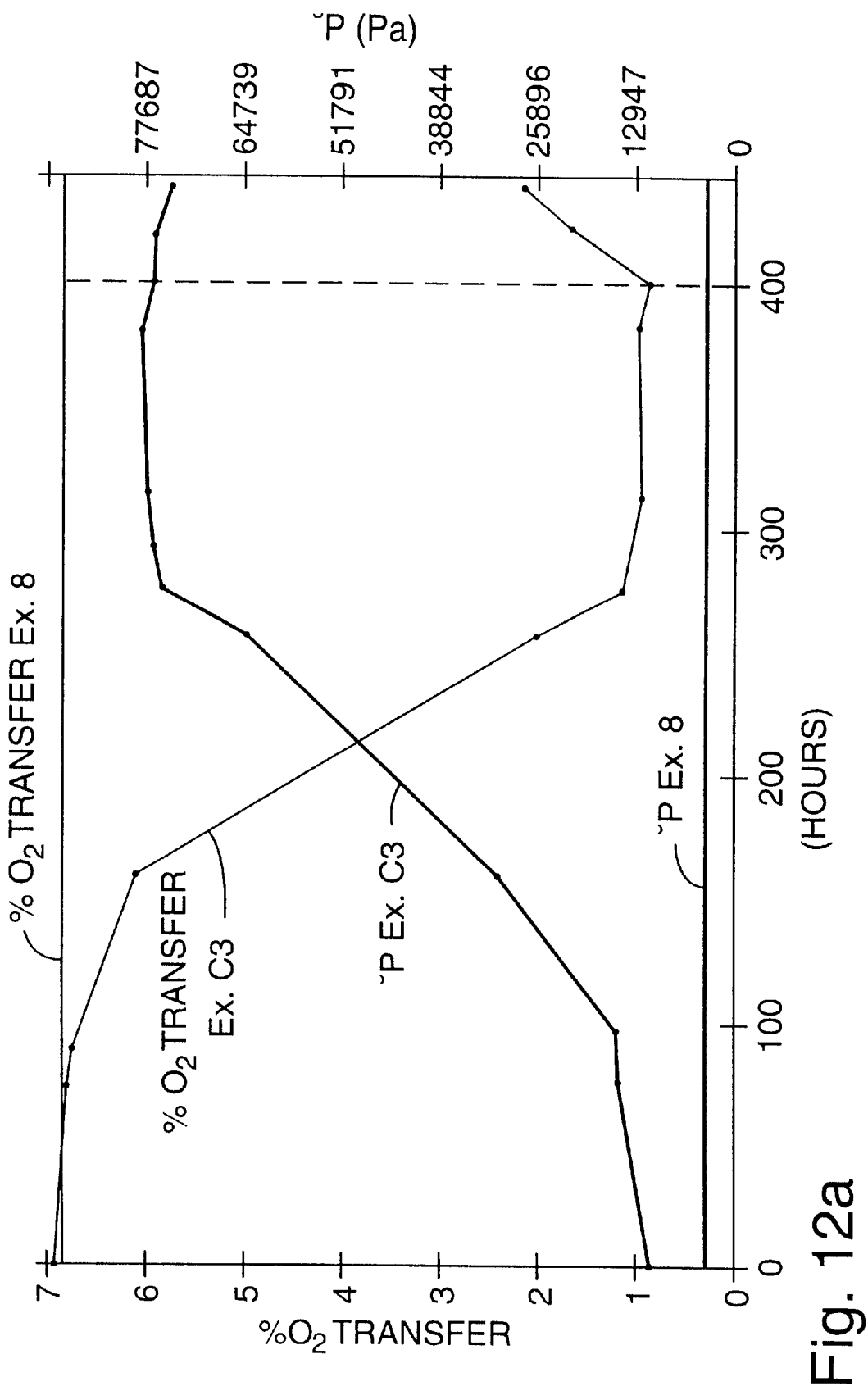
FIG. 12a graphically illustrates accelerated particle loading performance of a microporous membrane and a nuclear membrane.

As illustrated in FIG. 12a, the flow through the Example C3 membrane was 9.4 liters per minute (Lpm) for more than 400 hour duration of the test. The percentage of $O_2$ transfer is set forth on the left vertical axis and the pressure drop across the membrane is set forth on the right vertical axis. Time is set forth on the horizontal axis. The flow through the Example C3 membrane was initially 9.4 liters/minute and was held at 9.4 Lpm for the first 95 hours after which the pressure drop through the membrane was too high to maintain the initial flow. The Single Layer Diffusion Test was conducted at intervals to follow changes in the gas transfer properties. Note that even though the amount of loading in the Example C3 membrane was lower than that of the Example 8 membrane, the gas transfer properties of the Example 8 membrane were unchanged or only very slightly changed throughout the test while the gas transfer properties of the Example C3 membrane were reduced to about one tenth of the original value.

Figure 12B:
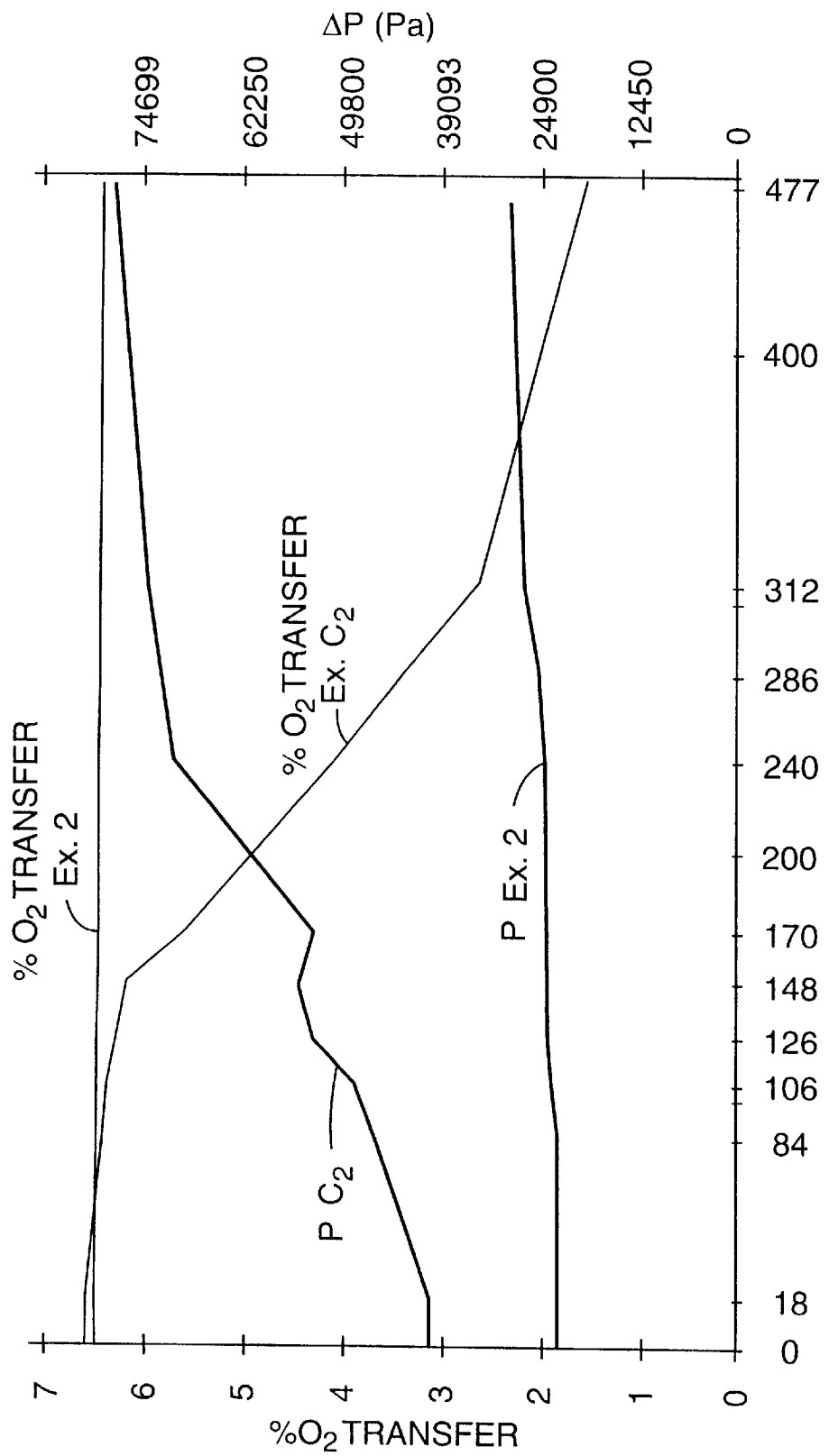
FIG. 12b graphically illustrates particle loading performance of a microporous membrane and another nuclear membrane.

FIG. 12b presents results comparing the Example 2 membrane with the Example C2 membrane. The Example 2 membrane exhibits either no change or only a very slight change in diffusional properties after 477 hours of testing at a flow rate of 9.4 Lpm. Interestingly, the diffusional transfer properties change very little while the pressure drop properties increase noticeably. In the case of the C2 membrane, diffusional transfer properties are markedly reduced and pressure drop properties increase significantly in less than 200 hours. It was not possible to maintain the flow through the C2 membrane at the full 9.4 Lpm level for the full duration of the test. Therefore, the C2 membrane was tested less severely compared to the Example 2 membrane.

6. Post Particle Challenge Gas Transfer Rate Test

For this test, an initial value of the gas transfer rate of oxygen through the selected membrane is determined by the described "Single Membrane Layer Test". The still air film boundary layer thickness is constrained to be a fixed value within the range of 0.17 and 0.18 cm. The selected membrane is subsequently challenged to particles utilizing the "Particle Loading Test" such that the change in pressure drop at a selected flow rate per unit area of the particle containing air rises by 25% or more. The selected membrane is then reevaluated utilizing the "Single Membrane Layer Test" to determine the resultant gas transfer rate of oxygen after the prescribed particle loading. The still air film boundary layer must be held to the same value as prescribed in the initial "Single Membrane Layer Test". The subsequent percentage diminishment of the oxygen gas transfer rate through the membrane is determined from the ratio of the oxygen gas transfer before and after the "Particle Loading Test".

Sample Preparation

A patent relating to the preparation of microporous materials for Examples 1–3 is assignee's U.S. Pat. No. 4,539,256 (Shipman) issued Sep. 3, 1985, discloses a method of making a microporous material comprising the steps of melt blending a crystallizable thermoplastic polymer with a compound which is miscible with the thermoplastic polymer at the melting temperature of the polymer but phase separates on cooling at or below the crystallization temperature of the polymer, forming a shaped article of the melt blend, cooling the shaped article to a temperature at which the thermoplastic polymer crystallizes to cause phase separation to occur between the thermoplastic polymer and the compound, thereby providing an article comprising an aggregate of a first phase comprising particles of crystallized thermoplastic polymer in a second phase of the compound, and orienting the article in at least one direction to provide a network of interconnected micropores throughout.

A second patent relating to the preparation of microporous materials specifically for Examples 4–9 is assignee's U.S. Pat. No. 4,726,989 (Mrozinski) issued Feb. 23, 1988 which discloses a method of making a microporous material comprising the steps of melt blending a crystallizable thermoplastic polymer with a miscible compound and a nucleating agent, forming a shaped article of the melt blend, cooling the shaped article to a temperature at which the nucleating agent induces the thermoplastic polymer to crystallize so as to cause phase separation to occur between the thermoplastic polymer and the compound, thereby providing an article comprising an aggregate of a first phase comprising particles of crystallized thermoplastic polymer in a second phase of the compound, the compound is optionally removed, and the article is biaxially stretched in the machine and traverse directions to provide a network of interconnected pores throughout the membrane.

Examples 1 and 2

In these examples, the method as described in U.S. Pat. No. 4,539,256 (Shipman), issued Sep. 3, 1985 was utilized to form the membranes. In Example 1 (839-3B), a 35:65 melt blend of high density polyethylene having a melt flow index of 5.0 (ASTM D 1238-82) available under the trade designation "FINA 9255" from Fina Oil and Chemical Company of LaPorte, Tex. and mineral oil available under the trade designation Amoco White Mineral oil #31 USP grade was extruded at the rate of 6.8 kg/hr (15 lbs/hr) using a twin screw extruder fitted with a film die having a gap of 0.76 mm at 199° C. (390° F.) onto a quenched patterned casting wheel having pyramidal-like projections having diamond-shaped peaks 0.02 mm$^2$, to provide about 10% contact area maintained at 32° C. (90° F.). Thereafter, the film was solvent extracted with 1,1,1-trichloroethane to remove the oil and biaxially stretched 4.0×4.0 (or 400% in the machine direction and 400% the transverse direction) at a temperature of 70° C. (158° F.) in the machine direction and a temperature of 77° C. (170° F.) in the traverse direction.

Example 2 (1069-1X) was prepared similarly to Example 1 with the following exceptions. The polyethylene to mineral oil weight ratio was 36:64. The resultant film was extracted using HCFC-1,2,3 (available under the trade designation Vertrel 423 from Dupont Company) for about 8.1 minutes in an additive removal bath to remove the mineral oil. The film was then dried at a temperature of 28° C. (83° F.) and biaxially stretched 2.7×2.7 (or 270% in the machine direction and 270% in the transverse direction) at a temperature of 35° C. (95° F.) in a machine direction and 93° C. (200° F.) in the traverse direction. The physical characterization of the film thickness, weight per unit area, solid polymer density, flow resistance (Gurley), and bubble point porosity is reported in Table 2. From the test results, the void volume decimal fraction, the Benaire pore diameter, the Rubow effective fiber diameter and the solidity were each calculated and reported in Table 3.

Example 3

A microporous polypropylene membrane prepared by extruding a blended melt and casting onto a quenching roll followed by extraction and biaxially stretching the film is available by the trade designation "KN 9400" from the Personal Care and Related Products Division, 3M Company, St. Paul, Minn. The physical properties of the membrane were measured or calculated and set forth in Tables 2 and 3.

Example 4

Specifically in Example 4 (817-8), crystallizable polypropylene (available under the trade designation "Profax" type 6723 from Hercules, Inc.) having a density of 0.903g/cc, a melt flow index (ASTM D 1238, Condition I) of 0.8 and a melting point of about 176° C. was dry blended with about 0.30% by weight of a dibenzylidine sorbitol nucleating agent (available from Milliken Chemical under the designation Millad 3905) before introducing the polymer into the extruder.

The polymer was extruded at a melt temperature of about 189° C. (372° F.) in a Berstorff 40 mm twin screw extruder fitted with a slit gap sheeting die positioned above a quenching wheel. The extruder was operated at about a 312 cc/min. throughput rate to produce a film collected at a rate of about 6.1 meters per minute. Mineral oil (available under the trade designation Amoco White Mineral Oil #31 USP Grade from Amoco Oil Co.), having a boiling point of about 200° C. and a standard Saybolt viscosity of 360–390 at 38° C. (about 80 centistokes) was simultaneously introduced into the twin screw extruder through an injection port at a rate to provide a blend of 55% by weight polypropylene polymer and 45% by weight mineral oil. The polypropylene/mineral oil melt was extruded in film form and the melt quenched on a smooth casting wheel (drum) maintained at about 60° C. (140° F.). Then the film was soaked in 1,1,1-trichloroethane for 3.6 minutes in an additive removal bath to remove the mineral oil and the film was dried at room temperature. The microporous film was subsequently biaxially stretched 2.5× 2.5 (or 250% in both the machine direction and the transverse direction) at 80° C. in the machine direction and 121° C. in the traverse direction. Properties of the membranes are set forth in Table 2 and 3.

Examples 5 and 6

For examples 5 and 6, the procedure for preparation of the microporous material identical to that of Example 4 was followed with the following exceptions: In Example 5 (826-4) and Example 6 (826-8), the Profax 6723 polypropylene polymer:mineral oil ratio was 40:60 by weight. This polymer melt was extruded onto a quenched patterned casting wheel having pyramidal-like projections having diamond-shaped peaks 0.02 mm$^2$ to provide about 10% contact area maintained at 140° C. The films were biaxially stretched 2.7×2.7 (or 270% in both the machine and cross directions). The results of each of the measurements and calculations are shown in Tables 2 and 3 as examples 5 and 6 respectively.

Examples 7 and 8

Following the conditions for preparing a microporous membrane of Example 4 with following exceptions: In Example 7 (930-2C), about 0.40% (based on the polymer weight) of a dibenzylidine sorbitol (Millad 3905) nucleating agent was dry blended with the polypropylene polymer prior to introduction of the polymer into the extruder. The polypropylene: mineral oil compound ratio was 35:65. After casting on the truncated pyramidal casting wheel described above, the polypropylene/mineral oil/Millad 3905 film was solvent washed in HCFC-1,2,3 (available under the trade designation Vertrel 423 from Dupont Company) for about 5.7 minutes in an additive removal bath to remove the mineral oil.

Each film was then dried and biaxially stretched 2.7×2.7 (or 270% in both the machine and transverse directions) at a temperature of 80° C. in the machine direction and 121° C. in the traverse direction. In Example 8 (1030-1B), about 0.20% ((based on the polymer weight) of a dibenzylidine sorbitol (Millad 3905) nucleating agent was dry blended with the polypropylene polymer prior to introduction of the polymer into the extruder.

The polypropylene: mineral oil compound ratio was 33:67. After casting on the truncated pyramidal casting wheel described above, the polypropylene/ mineral oil/ Millad 3905 film was solvent washed in HCFC-1,2,3 (available under the trade designation Vertrel 423 from Dupont Company) for about 6.6 minutes in an additive removal bath to remove the mineral oil. Each film was then dried at 60° C. and biaxially stretched 2.5×2.8 (or 250% in the machine direction and 280% in the transverse direction) at a temperature of 110° C. in the machine direction and 132° C. in the traverse direction. The physical properties of the resultant membranes were measured and summarized in Tables 2 and 3.

Example 9

Following the conditions for preparing microporous membranes of Example 4 with following exceptions: In Example 9 (1213-2D) about 0.06% (based on the polymer weight) of a dibenzylidine sorbitol (Millad 3905) nucleating agent was dry blended with crystallizable polypropylene (available under the trade designation Shell 5D45 from Shell Chemical Co.) having a melt flow index (ASTM D 1238, Condition I) of 0.65 and a melting point of about 176° C.

The polymer/nucleating agent mixture was melt mixed with mineral oil at a polymer:mineral oil ratio of about 31:69. After casting on casting wheel having a diamond cross hatch pattern with a surface width of each land area about 0.12 mm which provided about 40% land contact area and maintained at 66° C., the polypropylene/mineral oil/Millad 3905 film was solvent washed in HCFC-1,2,3 (available under the trade designation Vertrel 423 from Dupont Company) for about 6.8 minutes in an additive removal bath to remove the mineral oil. Each film was then dried at 60° C. and biaxially stretched 2.23×3.3 (or 223% in the machine direction and 330% in the transverse direction) at 87° C. in the machine direction and 132° C. in the traverse direction. The properties of the membrane are summarized in Tables 2 and 3.

Example 10

In this example (1216-9 EVAL), the procedure of Example 5 of PCT Application No. WO 97/20,885 which is incorporated herein by reference, was followed with the following exceptions: 58.7 weight percent ethylene-vinyl alcohol copolymer (available as EVAL F-100B™ from Eval Corp. of America), 24.5 weight percent polyethylene glycol (available as PEG 200 from Dow Chemical Co.) and 16.8 weight percent glycerin (USP 99.7% natural, available from Proctor and Gamble Co.) were melt blended and extruded onto a patterned casting wheel having pyramidal-like projections having diamond-shaped peaks 0.02 mm2, to provide about 10% contact area maintained at 77° C.

The resulting sheet material was washed in a water bath. The resulting sheet was washed in a water bath for approximately 7.6 minutes. The sheet was biaxially stretched in the wet state 1.9×1.9 (or 190% in the machine direction and 190% in the transverse direction) at ambient temperature. At the end of the tentering process, the water was removed through evaporation at a temperature of 182° C. in order to dry and anneal the membrane. Properties of the membrane are set forth in Table 2 and 3.

Example 11

A polypropylene blown-microfiber (BMF) web sheet prepared according to the process described in Wente, Van A., "Superfine Thermoplastic Fibers," Industrial Engineering Chemistry, Vol. 48 pp. 1342–1346 and in Wente, Van A. et al., "Manufacture of Superfine Organic Fibers," Report No. 4364 of the Naval Research Laboratory, published May 25, 1954 was obtained from the filtering fabric portion through the disassembly of a high capacity liquid filter cartridge known by the trade designation "743B" available from 3M Filtration Products, 3M Company, St. Paul, Minn. The filtering fabric portion has a calendared four layer construction of the polypropylene BMF, each layer having a basis weight of 20 gm/$M^2$ resulting in a total basis weight for the filtering sheet of 80 grams/$M^2$. The physical properties of the blown-microfiber (BMF) web sheet were measured and set forth in Tables 2 and 3.

Example 12

A sheet of Celgard (™) 2400 polypropylene film available from Hoechst Celanese Corp., Separations Products Division, Charlotte, N.C. was tested and the results are presented in Table 2.

Examples 13 through 16

A sheet of Dupont Tyvek™ high density polyethylene Type 10-1056-D membrane available from Dupont of Wilmington, Del. was tested as in Example 1 and the results are presented in Table 2. Sheets of Type 10-1073-D, 10-1079, and 10-1085-D, each also made from high density polyethylene, were so tested and are presented as Examples 14, 15, and 16 respectively in Table 2.

Examples 17 and 18

A sheet of Costar MF MB 0.1 micron pore size membrane made from a mixture of cellulose nitrate and cellulose diacetate and available from Corning Costar Corporation, Cambridge, Mass. was tested according to Example 1 and results are presented as Example 17. A sheet of Costar MF MB 0.2 micron nominal pore size membrane was similarly tested as Example 18 and all results are presented in Table 2.

Examples 19 through 31

In Example 19, a sheet of Gelman GN-6 Metricel 0.45 micron nominal pore size mixed cellulose ester membrane available from Gelman Sciences, Ann Arbor, Mich. was tested according to Example 1. Twelve additional varieties of Gelman membrane were similarly tested and consecutively presented as Examples 20 through 31. Results and membrane designations are noted in Table 2. For Examples 20 through 22 the polymer type was polytetrafluoroethylene on a support of polypropylene. For Examples 23 through 25 and 28, the polymer was polysulfone. For Examples 26 and 27, the polymer was acrylic copolymer cast on a nylon non-woven substrate. For Example 29, the polymer was nylon. For Example 30, the polymer was polyvinyl chloride and for Example 31 the material was glass fiber with an acrylic binder.

Example 32 through 38

In Example 32, a sheet of Millipore MF 0.22 micron pore size mixed cellulose ester membrane available from Millipore Corporation, Bedford, Mass. was tested as in Example 1. Two additional mixed cellulose ester membranes having nominal pore sizes of 3.0 and 8.0 microns were tested and results are noted in Examples 33 and 34. For Examples 35 and 36 the polymer type was polyvinylidene fluoride and for Examples 37 and 38, polytetrafluoroethylene.

Examples 39 and 40

A sheet of Akzo Nobel Faser polypropylene 0.1 micron pore size membrane available from Akzo Nobe Faser AG Membrana of Wuppertal, Germany was tested as in Example 1 and results are presented in Table 2 as Example 39. A second sheet, similar except having a 0.2 micron pore size, was also tested as is presented as Example 40.

Comparative Examples C1 through C7

A sheet of Costar PC MB 0.015 micron nominal pore size polycarbonate membrane available from Corning Costar Corporation, Cambridge, Mass. was tested according to Example 1 and presented as Example C1. Additional sheets of Costar polycarbonate membranes were similarly tested and results are presented as Examples C2 through C7 in Table 2.

Comparative Example C8

A sheet of 0.001 in. (25.4 micron) silicone rubber membrane available from Membrane Products Corp., Albany, N.Y., was tested for thickness. The sample contracted when cut making weight per unit area and solid polymer density impractical to determine. The membrane is non porous making the other determinations of Table 2 inapplicable.

Example 41

A personal diffusional gas transfer respirator system was made by combining the crossflow diffusional gas transfer module (DGTM) of FIG. 5 with a modified version of the Easi-Air (™) respirator facepiece No. 7300 medium/large (available from 3M, St. Paul, Minn.). The DGTM and the respirator facepiece were further combined into a personal respirator system using flexible tubing, a flexible gas impermeable bag, and standard valving.

FIGS. 8a and 8b shows the completed personal respirator system. The inhalation valve on the right side of the respirator was sealed off to allow all inhaled air to be supplied from one tube. The center exhalation valve was left operational and sealed to a tube leading to a supply plenum at the entrance to the DGTM.

The DGTM was made using Celenese Celgard membrane No. 2400 of Example 12. In the orientation shown in FIG. 5, the 128 vertical rectangular slots for receiving the exhaled breath are 1.9 mm wide, 1.0 mm thick, and 20.8 mm long. The structure is defined by a combination of membrane walls and spacing layers. The 129 crossflow ducts for contacting the ambient air are subdivided by cross spacers into 16 portions each for a total of 2064 individual ducts each 1.0 cm wide, 1.0 mm thick and 2.54 cm long. The spacing layers are formed by lamination of 0.040 in. (1 mm) general purpose polystyrene sheeting with 3M No. 1522 double coated adhesive tape which is supplied including release liner. The spacer layers for both longitudinal and crosswise support of the membrane were made by first laminating the polystyrene sheet with the tape and then water jet cutting patterns to form spacers.

The release liner is stripped away during assembly to allow complete sealing of the membrane to the spacer. Each of the 128 vertical passages contain 105.7 cm$^2$ of membrane of which 46.9 cm$^2$ are blocked by spacers leaving 58.8 cm$^2$ of active membrane divided into two sheets one on each side of the slot. The total amount of active membrane in the system is 7531 cm$^2$ or about 0.75 m$^2$.

As is clear from the structure of the DGTM shown in FIG. 6, portions of the membrane forming the walls of each slot also form the walls of the crossflow ducts. Additional spacers running horizontally when the slots are vertical keep the breathing slots spaced apart and define the size of the crossflow ducts.

The flexible bag sealed and connected to the bottom of the DGTM can be made from a variety of flexible nonporous materials. The inlet to the flexible bag is the output of the DGTM on exhalation of the subject. The outlet of the flexible bag connects and is sealed to the tube that leads to the inhalation valve port of the respirator facepiece.

In operation, the exhaled breath is conveyed through the DGTM upon every exhalation of the user. Upon inhalation, the exhalation valve closes keeping the previously exhaled breath from reentering the facepiece. The exhaled breath flows freely through the vertical slots and into the flexible bag. As the breath flows, excess $CO_2$ is transferred into the environment and $O_2$ in transferred into the breathing slot. Thus the air entering the flexible bag is diminished in $CO_2$ and replenished in $O_2$ when compared to air that is exhaled by the user. Water vapor from the exhaled breath is also transferred into the environment. The flexible bag inflates on exhalation and deflates on inhalation to provide a continually recycling air mass that is free of particulate contamination except for amounts of particulate matter that may enter via face seal leakage. Complete sealing of the face seal results in complete isolation of the user from the particles in the outside air.

To test the performance of the device a male subject donned the complete system and performed exercise at two levels. In level walking trials for extended periods of up to one hour duration the device provided sufficient gas exchange including $O_2$, $CO_2$, and $H_2O$ for comfort without noticeable adverse effects. In a second level of exercise the subject walked at normal pace up three flights of stairs and then continued walking on level ground. Under both of these test conditions, the motion of the subject was allowing atmospheric air to impinge upon and pass through the crossflow ducts to remove $CO_2$ and $H_2O$ and to supply $O_2$. Under the second test conditions, there was a slightly noticeable increase of $CO_2$ as evidenced by a slight acidic taste in the mouth. The increased $CO_2$ went away as the subject continued on level ground.

It is concluded that the device is useful for light workloads and could be improved for heavier workloads by incorporation of a fan in the atmospheric portion of the system to convey air through the ducts at a steady velocity. As is, the system was useful for exchanging gases between the user and the environment because of the free exchange of ambient air on the outside of the DGTM and the forced convection on the inside due to the breathing cycle.

Example 42

The enclosure shown in FIG. 9 was used to determine diffusional gas transfer capabilities for a DGTM having the configuration shown in FIG. 9. The enclosure was 194 cm high, 77 cm wide, and 139 cm long. At the rear of the enclosure, the width was increased to 194 cm to accommodate the shoulders and arms of the test subject. The frame was constructed of 2.54 cm square aluminum tubing welded at all joints, with clear polycarbonate sheeting forming the walls and ceiling. Silicone sealant was liberally applied between the frame and the sheeting to seal the enclosure. Foam tape seals were used on the floor. Entry to the enclosure was facilitated by lifting the entire enclosure for entry from the front. The internal volume of the enclosure was estimated by physical measurements and concentration changes during gas addition to be about 2 m$^3$. The free gas volume inside the chamber was the enclosure volume minus the volume occupied by the subject and minus any equipment volume.

To test the degree of sealing of the enclosure from ambient, a mixture of 0.50% carbon dioxide gas in nitrogen was allowed to fill the chamber. After four days, the concentration of carbon dioxide in the enclosure had not diminished to any measurable extent. This allowed the conclusion that human subject testing of one or two hours duration could be done with confidence that gas exchanges between the test subject and the external ambient would be through the DGTM alone with no seepage or wall transfer.

The DGTM was positioned on the slanted panel ahead of the test subject as is shown in FIG. 9 and consisted of 131 active layers of the membrane of Example 5 combined with spacers made to the configuration of FIG. 4 and, except for shape, made according to the procedure used for the cross-flow personal DGTM. The 131 layers of membrane transfer gases between 132 flow containing layers each layer divided into 10 flow channels as is clear from FIG. 4. The inside and outside airflow circuits each communicated with 66 of the flow layers for a total of 660 flow channels each. To construct the DGTM, the spacers forming the layers are rotated 180 degrees for alternating layers so that, as is shown in FIG. 4, the spacers in entry and exit positions cross at 90 degrees providing a cross flow arrangement with adjacent layers with each center portion providing either co-current flow or counter-current flow as a matter of choice. Counter-current flow was used in the tests. At the top and bottom of the membrane stacks, the flow spaces were in communication with membrane on one side and with a non gas transferring wall on the other. All other flow spaces communicated with gas transferring membrane on each side. Each of the 131 active membrane layers has a total area of about 157 $cm^2$ of membrane of which about 42 $cm^2$ were blocked off by spacers leaving 115 $cm^2$ gas transferring surface area per active membrane layer. The total membrane active in the DGTM was about 1.5 $m^2$.

To control the airflow to the DGTM, two plenum/orifice systems were constructed of plexiglass sheeting and brass orifice plates. Each brass orifice plate had 64 holes and each hole had a diameter of 0.653 cm. The orifice diameter was selected such that a flow of 1 cubic foot per minute (28.32 Lpm) would result from a plenum pressure of one inch of water or 249 Pascals. A total of 8 shut off valves constructed of plexiglass sheeting faced with 0.5 mm rubber sheeting were arranged in each of the plenum/orifice systems. The valves were operated by push-pull rods 110 and the first six valves could close or open one, one, two, four, eight, or 16 orifices respectively. The remaining two each operated 16 orifices. Thus it was possible to control airflow between one and 64 CFM (28.32 and 1812.5 Lpm) in any desired integer level of CFM.

The enclosure housed a Schwinn Air-dyne Total Body Ergometer exercise machine. The machine allowed input of body weight and output of the subject's calories per hour, watts generated, and horsepower.

Correlation between exercise level, consumption of oxygen, and production of carbon dioxide are available in "Principles of Exercise Testing and Interpretation" 1987, by Karlman Wasserman, published by Lea & Febiger, Philadelphia. The rate of generation of the subject's carbon dioxide was also determined by exercise at a constant level with no flow through the DGTM resulting in a steadily increasing carbon dioxide concentration in the enclosure from which the rate of carbon dioxide generation could be determined.

Example 43

Consider 250 people inside a critical enclosure, such as second gas domain 26 of FIG. 1. Circulate 3000 cubic feet per minute (CFM) (85,000 Lpm) from the critical enclosure through inlet 48. Circulate 4000 CFM (113,300 Lpm) to second gas domain 26 from outlet 46 and allow 1000 CFM (28,300 Lpm) to flow outward through cracks and crevices in the walls of the critical enclosure. At a maximum specified gauge pressure of 50 Pa (0.2 inches of water) in second gas domain 26, and considering the aggregate of all openings to be represented by one opening having an area that is the sum of the effective areas of all the openings, the opening size may be approximated by Bernoulli's Law to be about 516 $cm^2$ (80 square inches).

Further, consider an active membrane area in the system of 500 $m^2$. For this membrane area, and considering a membrane Gurley Number of 5 Gurley seconds, the pressure needed to result in a flow of (1000 CFM) is 72 Pa (0.29 inches of water).

To accomplish this embodiment of the invention, the external air flow circuit (first gas domain 22 of FIG. 1) carrying contaminated air would be restricted at outlet 44 of the system to develop an excess pressure of 72 Pa (0.29 inches of water). Inlet 42 supplies 4000 CFM ( 13,300 Lpm) and outlet 44 passes 3000 CFM (85,000 Lpm). This results in a combination of flow and diffusion across the membrane, with a net flow of 1000 CFM (28,300 Lpm) to replace that lost through cracks and crevices in the walls of the critical enclosure and maintain the pressure.

Additionally, one can provide a filtering means in outlet 46, that can remove undesirable gases from the flow stream. Only 1000 CFM (28,300 Lpm) need be filtered through the membrane, and no particulate-laden air need pass through the filtering means. This filtering means can also remove particles generated within the critical enclosure from the flow stream.

One can contrast the present invention with a comparative system whereby for 250 people, 4000 CFM ( 13,300 Lpm) flowing through a filter may supply 3000 CFM (85,000 Lpm) for the metabolic process of the 250 people and 1000 CFM (28,300 Lpm) to maintain the pressure in the enclosure. In the case of the present invention, the 1000 CFM (28,300 Lpm) flow is only 25% of the 4000 CFM (113,300 Lpm) flow and filter or membrane contamination and cleaning is very significantly reduced. In the present invention, the 3000 CFM (85,000 Lpm) of recirculation flow supplies the metabolic needs of the enclosure inhabitants without filtration through the membrane.

Example 44

It is within the scope of the present invention to provide, for example, a 3000 CFM (85,000 Lpm) recirculation loop for enclosure inhabitants while providing a second airstream of 1000 CFM (28,300 Lpm) that is filtered, the difference being that the diffusional membrane and the second filter are separate entities. The advantage of this embodiment is that the membrane becomes contaminated much less quickly by filtering only 25% of the comparative volume of air and thereby lasts longer, while the 1000 CFM (28,300 Lpm) flow filter can be changed out or cleaned as needed.

Patent and patent applications disclosed herein are hereby incorporated by reference. The present invention has now been described with reference to several embodiments described herein, particularly with respect to articles having surface features. It will be apparent to those skilled in the art that many changes can be made in the embodiments without departing from the scope of the invention. Thus, the scope of the present invention should not be limited to the structures described herein, but only to structures described by the language of the claims and the equivalents to those structures.

What is claimed is:
1. A diffusional gas transfer system that comprises:
a membrane disposed between a first gas domain and a second gas domain, the first gas domain comprising a first mechanism that is capable of directing a first environmental gas flow transversely over and in contact with a first surface of the membrane, the second gas domain comprising a second mechanism that is capable of directing a second environmental gas flow transversely over and in contact with a second surface of the membrane, wherein at least one of the first or second gas flows contains suspended particles;
the membrane comprising a multiplicity of tortuous pathways extending from the first surface of the membrane to the second surface of the membrane, the tortuous pathways defining a maximum pore size and defining a void volume fraction that is at least 0.2, the membrane being capable of blocking the transfer of substantially all particles smaller than the maximum pore size between the first and second gas domains while permitting the diffusion of gases between the first and second gas domains, and the first gas domain maintained at a pressure higher than the second gas domain.

2. The diffusional gas transfer system of claim 1 wherein the maximum pressure difference between the first gas domain and a second gas domain is about 1 to 50,000 Pa.

3. The diffusional gas transfer system of claim 1 wherein the maximum pressure difference between the first gas domain and a second gas domain is about 10 to 5,000 Pa.

4. The diffusional gas transfer system of claim 1 wherein the maximum pressure difference between the first gas domain and a second gas domain is about 20 to 500 Pa.

5. The diffusional gas transfer system of claim 1 wherein the membrane is configured to be capable of blocking the transfer of substantially all particles about 0.1 µm to 0.5 µm in diameter.

6. The diffusional gas transfer system of claim 1 wherein the membrane is configured to be capable of blocking the transfer of all particles between the first and second gas domains.

7. The diffusional gas transfer system of claim 1 wherein the membrane is a polymeric membrane.

8. The diffusional gas transfer system of claim 1 wherein the membrane is a fibrous, microporous polymeric membrane.

9. The diffusional gas transfer system of claim 1, wherein the membrane is a nonhollow fiber membrane.

10. The diffusional gas transfer system of claim 1 wherein the membrane comprises a multiplicity of randomly dispersed, irregularly shaped thermoplastic particles, a portion of the thermoplastic particles being spaced from one another to provide a network of pathways therebetween, a portion of the spaced thermoplastic particles being connected to each other by fibrils.

11. The diffusional gas transfer system of claim 1 wherein the first and second mechanisms that direct the environmental gases each include a plenum.

12. The diffusional gas transfer system of claim 1 wherein the void volume fraction of the membrane is at least 0.50.

13. The diffusional gas transfer system of claim 1 wherein the void volume fraction of the membrane is at least 0.70.

14. The diffusional gas transfer system of claim 1 wherein the void volume fraction is less than 0.9.

15. The diffusional gas transfer system of claim 1 wherein the tortuous pathways comprise a maximum pore size of about 3 to 5 micrometers.

16. The diffusional gas transfer system of claim 1 wherein the tortuous pathways comprise a maximum pore size of about 0.05 to 2.0 micrometers.

17. The diffusional gas transfer system of claim 1 wherein the membrane is supported between the first and second gas domains and is capable of substantially blocking the transfer of particles when exposed to a pressure differential across the membrane that is greater than a burst pressure of the membrane.

18. The diffusional gas transfer system of claim 1 wherein the membrane is supported between the first and second gas domains and is capable of substantially blocking the transfer of particles when exposed to a pressure differential across the membrane that is approximately at the burst pressure of the membrane.

19. The diffusional gas transfer system of claim 1 wherein the membrane is configured to be capable of substantially blocking the transfer of particles when exposed to a pressure differential across the membrane that is 50 kilopascals or greater.

20. The diffusional gas transfer system of claim 1 wherein the membrane is configured to be capable of maintaining a gas transfer rate diminished by no more than 2% when tested in accordance with the Post Particle Challenge Gas Transfer Rate Test.

21. The diffusional gas transfer system of claim 1 wherein a ratio of a diffusion coefficient of a selected gas at a selected temperature and pressure in still air to an effective diffusion coefficient of the same gas under the same temperature and pressure inside the void tortuous pathways of the membrane is 1.03 to 500.

22. The diffusional gas transfer system of claim 1, wherein the membrane is configured to be capable of blocking the transfer of particles that are 1.0 mm or less in diameter.

23. The diffusional gas transfer system of claim 1 being configured such that a portion of the first environmental gas flow flows in an that is orientation that is perpendicular to the second environmental gas flow.

24. The diffusional gas transfer system of claim 1 being configured such that a portion of the first environmental gas flow flows in an orientation that is parallel to the second environmental gas flow.

25. The diffusional gas transfer system of claim 1 being configured such that a portion of the first environmental gas flow flows in an orientation that is angled with respect to the second environmental gas flow.

26. The diffusional gas transfer system of claim 1 being configured such that at least one of the environmental gas flows exhibits laminar flow with respect to the membrane.

27. The diffusional gas transfer system of claim 1 being configured such that at least one of the environmental gas flows exhibits turbulent flow with respect to the diffusional gas transfer medium.

28. The diffusional gas transfer system of claim 1 being configured such that a portion of the first environmental gas flow flows in an orientation that is antiparallel to the second environmental gas flow.

29. The diffusional gas transfer system of claim 1 wherein the diffusional gas transfer system is configured such that first gas domain comprises air external to an enclosed space.

30. The diffusional gas transfer system of claim 29 wherein the diffusional gas transfer system is configured such that this second gas domain comprises air within an enclosed space.

31. The diffusional gas transfer system of claim 30 being configured such that the second gas domain is in the form of an interior of a building.

32. The diffusional gas transfer system of claim 30 wherein the second gas domain is a clean room.

33. The diffusional gas transfer system of claim 30 wherein the second gas domain is a personal respirator.

34. The diffusional gas transfer system of claim 30 wherein the air within the enclosed space is maintained at a pressure higher than the air pressure outside of the first and second gas domains.

35. The diffusional gas transfer system of claim 30 further comprising a filtering means for air to enter the second gas domain.

36. The diffusional gas transfer system of claim 30 further comprising a means for air to exit the enclosed space beyond the gas transfer system.

37. An air treatment system that comprises:
(a) a first gaseous flow path that extends from an inlet to an outlet, the first gaseous flow path having an upstream portion and a downstream portion and allowing a first gaseous stream to pass from the inlet to the outlet;
(b) a second gaseous flow path through which a second gaseous stream can travel, maintained at lower pressure than the first gas domain;
(c) a membrane having first and second sides and being disposed between the first and second gaseous fluid flow paths, the membrane being capable of blocking the transfer of particles between the first and second flow paths while permitting the diffusion of gases between the first gaseous stream and the second gaseous stream; and
(d) a gas impermeable thermal transfer region that allows thermal energy to be transferred between the downstream portion of the first gaseous stream and its upstream portion.

38. The air treatment system of claim 37 wherein the air treatment system is configured such that the first gaseous flow path comprises air external to an enclosed space.

39. The air treatment system of claim 38 wherein the air treatment system is configured such that the second gaseous flow path comprises air within an enclosed space.

40. The air treatment system of claim 39 wherein the air within the enclosed space is maintained at a pressure higher than the air pressure outside of the first and second gaseous flow paths.

41. The air treatment system of claim 39 further comprising a filtering means for air to enter the enclosed space.

42. The air treatment system of claim 39 further comprising a means for air to exit the enclosed space beyond the gas transfer system.

43. A method of blocking particle transfer while permitting gas transfer, the method comprising the steps of:
blocking the transfer of substantially all particles between the first and second gas domains while permitting gases to be diffused between the first and the second gas domains through a membrane, where the first gas domain contains particles and where the first gas domain comprises a first mechanism that directs a first environmental gas flow transversely over and in contact with a first surface of the membrane and the first gas domain is maintained at higher pressure than the second gas domain, and the second gas domain comprises a second mechanism that directs a second environmental gas flow in transversely over and in contact with a second surface of the membrane, the membrane comprising a diffusional gas transfer medium having a multiplicity of tortuous pathways extending from the first surface of the membrane to a second surface of the membrane such that void volume fraction of the membrane is at least 0.2.

44. The method of claim 43 wherein the gases comprise respiratory gases.

45. The method of claim 43 wherein the membrane blocks the transfer of essentially all particles between the first and second gas domains.

46. The method of claim 43 wherein the membrane blocks the transfer of all particles between the first and second gas domains.

47. The method of claim 43 wherein membrane is a fibrous, microporous polymeric membrane.

48. The method of claim 43 wherein the membrane has a multiplicity of randomly dispersed, irregularly shaped thermoplastic particles, a portion of the thermoplastic particles being spaced from one another to provide a network of pathways therebetween, a portion of the spaced thermoplastic particles being connected to each other by fibrils.

49. The method of claim 43 wherein the membrane has a void volume fraction comprising at least 0.50.

50. The method of claim 43 wherein the membrane has a void volume fraction comprising at least 0.70.

51. The method of claim 43 wherein the tortuous pathways define a maximum pore size, the membrane being capable of blocking the transfer of particles smaller than the maximum pore size.

52. The method of claim 43 wherein the tortuous pathways comprise a maximum pore size of about 3 to 5 micrometers.

53. The method of claim 43 wherein the tortuous pathways comprise a maximum pore size of about 0.05 to 2.0 micrometers.

54. The method of claim 43 further comprising:
supporting the membrane; and
substantially blocking the transfer of particles when a pressure differential across the membrane comprises a pressure greater than a burst pressure of the membrane.

55. The method of claim 43 further comprising:
supporting the membrane; and
substantially blocking the transfer of particles when a pressure differential across the membrane is about a burst pressure of the membrane.

56. The method of claim 43 wherein the membrane substantially blocks the transfer of particles when the membrane is exposed to a pressure differential across the membrane of 300 kilopascals or greater.

57. The method of claim 43 wherein the membrane is capable of maintaining a gas transfer rate diminished by no more than 2% when tested in accordance with the Post Particle Challenge Gas Transfer Rate Test.

58. The method of claim 43 wherein a ratio of a diffusion coefficient of a selected gas at a selected temperature and pressure in still air to a diffusion coefficient of the same gas under the same temperature and pressure inside the void tortuous pathways of the membrane, is 1.03 to 500.

59. The method of claim 43 comprising the step of maintaining at least one of the environmental gas flows in turbulent flow with respect to the diffusional gas transfer medium.

60. The method of claim 43 comprising the step of maintaining a portion of the first environmental gas flow perpendicular to the second environmental gas flow.

61. The method of claim 43 comprising the step of maintaining a portion of the first environmental gas flow parallel to the second environmental gas flow.

62. The method of claim 43 comprising the step of maintaining a portion of the first environmental gas flow angled with respect to the second environmental gas flow.

63. The method of claim 43 comprising maintaining at least one of the environmental gas flows in laminar flow with respect to the diffusional gas transfer medium.

64. The method of claim 43, wherein first and second environmental gas flows are directed through a plenum.

65. The method of claim 43, further comprising the step of maintaining a portion of the first environmental gas flow anti-parallel to the second environmental gas flow.

66. A diffusional gas transfer system that comprises a membrane disposed between first and second gas domains, the first gas domain comprising a first mechanism that is capable of directing a first environmental gas flow transversely over and in contact with a first surface of the membrane, the second gas domain comprising second mechanism that is capable of directing a second environmental gas flow transversely over and in contact with a second surface of the membrane, wherein the membrane is structured to be capable of maintaining a gas transfer rate diminished by no more than 2 percent under the Post Particle Challenge Gas Transfer Rate Test.

67. A method of permitting transfer of gaseous components from a first gas domain to a second gas domain without allowing significant particle transfer, which method comprises:
 (a) directing a first environmental gas flow of a first gas domain transversely over and in contact with a first surface of a non-liquid membrane that comprises a multiplicity of tortuous pathways, the pathways extending from the first surface of the membrane to a second surface of the membrane, the membrane having a void volume fraction of at least 0.2 and being capable of blocking the transfer particles; and
 (b) directing a second environmental gas flow of a second gas domain transversely over and in contact with the second surface of the membrane;
 wherein at least one of the environmental gas flows contains particles, the gas in the first and/or second gas domains diffuses therefrom through the membrane into the other gas domain but the particles do not transfer therethrough, and the first gas domain is maintained at a pressure higher than the second gas domain.

68. The method of claim 67 wherein the membrane is in the form of a solid matrix.

69. The method of claim 68, wherein the membrane is a polymeric membrane.

70. The method of claim 69, wherein the membrane is a fibrous, microporous polymeric membrane.

71. The method of claim 70, wherein the membrane has a void volume fraction of at least 0.5 and wherein the tortuous pathways define a maximum pore size, the membrane being capable of blocking the transfer of particles smaller than the maximum pore size.

72. The method of claim 67, wherein the tortuous pathways have a maximum pore size of about 3 to 5 micrometers.

73. The method of claim 67, wherein the membrane is supported and separates the first gas domain from the second gas domain.

74. The method of claim 67, wherein the first environmental gas flow flows in a direction antiparallel to the second environmental gas flow.

75. A method of supplying reduced particulate air to an interior of an enclosed space, which method comprises:
 (a) directing a first environmental gas flow, which contains particles suspended in air from the outside the building, transversely over and in contact with a first surface of a membrane that has a maximum pore size of less than 5 micrometers and having a void volume fraction of at least 0.2, the first environmental gas flow containing air and having particles suspended therein; and
 (b) directing a second environmental gas flow, which contains air located in the interior of the building, transversely over and in contact with a second surface of the membrane;
 wherein gas in at least one of the first and second environmental gas flows diffuses therefrom through the membrane into the other gas flow regime, the particles in the first environmental gas flow do not transfer through the membrane, and the first gas domain is maintained at higher pressure than the second gas domain.

76. The method of claim 75 further comprising the step of filtering air entering the building.

77. The method of claim 75 further comprising the step directing the second environmental gas flow through a filtering means.

\* \* \* \* \*

UNITED STATES PATENT AND TRADEMARK OFFICE
CERTIFICATE OF CORRECTION

PATENT NO.   : 6,248,153 B1
DATED        : June 19, 2001
INVENTOR(S)  : David Lloyd Braun and Ricardo Lira It is certified that error appears in the above-identified patent and that said Letters Patent is hereby corrected as shown below:

Column 17/18,
Table 2, Example No. 13, under column EFD (Rubow)(microns), "0.50O" should read -- 0.500 --

Column 19/20,
Table 2, under column Example Number, "CS" should read -- C5 --
Table 2, Example No. C7, under column Void Volume Fraction, "0.10O" should read -- 0.100 --

Column 22,
Line 53, before "Diffused" insert -- Amount --

Column 31/32,
Table 5, Example No. 23, under column Membrane Sample I.D., "1000.1 µm" should read -- 100 0.1 µm --
Table 5, Example No. 24, under column Membrane Sample I.D., "4500.45 µm" should read -- 450 0.45 --

Column 34,
Line 42, before "discloses" insert -- which --
Line 45, "0.02 mm2" should read -- 0.02 $mm^2$ --

Column 38,
Line 3, "20 gm/$M^2$" should read -- 20 grams/$m^2$ --
Line 4, "80 grams/$M^2$" should read -- 80 grams/$m^2$ --

Column 42,
Line 20, "( 13,300 Lpm)" should read -- (113,300 Lpm) --
Line 34, "( 13,300 Lpm)" should read -- (113,300 Lpm) --

Column 44,
Line 35, after "an" delete "that is"

UNITED STATES PATENT AND TRADEMARK OFFICE
CERTIFICATE OF CORRECTION

PATENT NO.    : 6,248,153 B1
DATED         : June 19, 2001
INVENTOR(S)   : David Lloyd Braun and Ricardo Lira It is certified that error appears in the above-identified patent and that said Letters Patent is hereby corrected as shown below:

<u>Column 48,</u>
Line 19, after "outside" insert -- of --

Signed and Sealed this

Thirtieth Day of July, 2002

*Attest:*

*Attesting Officer*

JAMES E. ROGAN
*Director of the United States Patent and Trademark Office*